(12) United States Patent
Sharma et al.

(10) Patent No.: US 12,422,618 B2
(45) Date of Patent: Sep. 23, 2025

(54) BURIED TAPER WITH REFLECTING SURFACE

(71) Applicant: SiLC Technologies, Inc., Monrovia, CA (US)

(72) Inventors: Monish Sharma, Artesia, CA (US); Mehdi Asghari, La Canada Flintridge, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 422 days.

(21) Appl. No.: 17/965,749

(22) Filed: Oct. 13, 2022

(65) Prior Publication Data

US 2024/0126011 A1 Apr. 18, 2024

(51) Int. Cl.
*G02B 6/122* (2006.01)
*G01S 7/481* (2006.01)
*G02B 6/136* (2006.01)

(52) U.S. Cl.
CPC ............ *G02B 6/1228* (2013.01); *G01S 7/481* (2013.01); *G02B 6/136* (2013.01)

(58) Field of Classification Search
CPC ....... G02B 6/1228; G02B 6/481; G02B 6/136
See application file for complete search history.

(56) References Cited

U.S. PATENT DOCUMENTS 4,262,993 A 4/1981 Burns et al.
4,523,803 A 6/1985 Arao et al.
(Continued)

FOREIGN PATENT DOCUMENTS

CN 1668939 A 9/2005
CN 101356450 A 1/2009
(Continued)

OTHER PUBLICATIONS

Aalto, Timo eta l., "VTT's Micron-Scale Silicon Rib+Strip Waveguide Platform", pp. 1-8, May 13, 2016, Conference Proceedings of SPIE Photonics Europe Conference, Proc. SPIE 9891, Silicon Photonics and Photonic Integrated Circuits V, 98911G, doi: 10.1117/12.2234588.

(Continued)

*Primary Examiner* — Eric Wong
(74) *Attorney, Agent, or Firm* — Gavrilovich, Dodd & Lindsey LLP

(57) ABSTRACT

An optical device has a semiconductor chip with a photonic circuit. The photonic circuit includes a waveguide with a first portion and a second portion. A cross sectional area of the second portion of the waveguide is larger than a cross sectional area of the first portion of the waveguide. The first portion of the waveguide is positioned over a device platform. The waveguide includes a taper that provides a transition between the first portion of the waveguide and the second portion of the waveguide. The taper is an inverted taper that extends below the first portion of the waveguide into the device platform. The second portion of the waveguide terminates at a facet. A recess extends into the chip. The recess has lateral sides. A first one of the lateral sides serving as the facet. A second one of the lateral sides is positioned such that light signals that exit the waveguide through the facet travel across the recess to be received at the second lateral side. The second lateral side is configured to reflect the light signals such that after reflection by the second lateral side the light signals travel away from the second lateral side and toward a location that is above the chip or below the chip.

16 Claims, 35 Drawing Sheets

(56) References Cited

U.S. PATENT DOCUMENTS

| | | | |
|---|---|---|---|
| 4,786,132 A | 11/1988 | Gordon | |
| 4,845,703 A | 7/1989 | Suzuki | |
| 4,914,665 A | 4/1990 | Sorin | |
| 4,955,028 A | 9/1990 | Alferness et al. | |
| 4,987,832 A | 1/1991 | Klink et al. | |
| 4,995,720 A | 2/1991 | Amzajerdian | |
| 5,041,832 A | 8/1991 | Gulczynski | |
| 5,194,906 A | 3/1993 | Kimura et al. | |
| 5,289,252 A | 2/1994 | Nourrcier | |
| 5,305,412 A | 4/1994 | Paoli | |
| 5,323,223 A | 6/1994 | Hayes | |
| 5,396,328 A | 3/1995 | Jestel et al. | |
| 5,847,816 A | 12/1998 | Zediker et al. | |
| 5,889,490 A | 3/1999 | Wachter et al. | |
| 5,953,468 A | 9/1999 | Finnila et al. | |
| 5,977,538 A | 11/1999 | Unger et al. | |
| 5,995,810 A | 11/1999 | Karasawa | |
| 6,035,083 A | 3/2000 | Brennan, III et al. | |
| 6,040,898 A | 3/2000 | Mrosik et al. | |
| 6,108,472 A | 8/2000 | Rickman et al. | |
| 6,400,500 B1 | 6/2002 | Tidmarsh et al. | |
| 6,480,513 B1 | 11/2002 | Kapany et al. | |
| 6,556,759 B2 | 4/2003 | Roberts et al. | |
| 6,567,573 B1 | 5/2003 | Domash et al. | |
| 6,687,010 B1 | 2/2004 | Horii et al. | |
| 6,921,490 B1 | 7/2005 | Qian et al. | |
| 6,970,621 B1 | 11/2005 | Fried | |
| 6,977,502 B1 | 12/2005 | Hertz | |
| 7,345,744 B2 | 3/2008 | Halmos et al. | |
| 7,375,877 B1 | 5/2008 | Di Teodoro et al. | |
| 7,535,390 B2 | 5/2009 | Hsu | |
| 7,907,333 B2 | 3/2011 | Coyle | |
| 8,165,433 B2 | 4/2012 | Jenkins et al. | |
| 8,213,751 B1 | 7/2012 | Ho et al. | |
| 8,311,374 B2 | 11/2012 | Hochberg et al. | |
| 8,326,100 B2 * | 12/2012 | Chen | G02B 6/1228 385/124 |
| 8,410,566 B2 | 4/2013 | Qian et al. | |
| 8,541,744 B1 | 9/2013 | Liu | |
| 8,558,993 B2 | 10/2013 | Newbury et al. | |
| 8,885,678 B1 | 11/2014 | Kupershmidt | |
| 9,157,790 B2 | 10/2015 | Shpunt et al. | |
| 9,176,282 B2 | 11/2015 | Pottier et al. | |
| 9,217,831 B1 | 12/2015 | Asghari | |
| 9,235,097 B2 | 1/2016 | Meade et al. | |
| 9,310,471 B2 | 4/2016 | Sayyah et al. | |
| 9,310,487 B2 | 4/2016 | Sakimura et al. | |
| 9,519,052 B2 | 12/2016 | Gusev | |
| 9,575,341 B2 | 2/2017 | Heck et al. | |
| 9,606,234 B2 | 3/2017 | Major, Jr. et al. | |
| 9,625,580 B2 | 4/2017 | Kotelnikov et al. | |
| 9,735,885 B1 | 8/2017 | Sayyah et al. | |
| 9,740,079 B1 | 8/2017 | Davids et al. | |
| 9,748,726 B1 | 8/2017 | Morton et al. | |
| 9,753,351 B2 | 9/2017 | Eldada | |
| 9,778,363 B2 | 10/2017 | Kadambi et al. | |
| 9,798,166 B1 | 10/2017 | Sharma et al. | |
| 9,823,118 B2 | 11/2017 | Doylend et al. | |
| 9,841,495 B2 | 12/2017 | Campbell et al. | |
| 9,851,443 B2 | 12/2017 | Chen | |
| 9,857,468 B1 | 1/2018 | Eichenholz et al. | |
| 9,893,737 B1 | 2/2018 | Keramat et al. | |
| 10,003,168 B1 | 6/2018 | Villeneuve | |
| 10,007,060 B1 * | 6/2018 | Qian | G02B 6/136 |
| 10,094,916 B1 | 10/2018 | Droz et al. | |
| 10,137,903 B2 | 11/2018 | Tascione et al. | |
| 10,222,474 B1 | 3/2019 | Raring et al. | |
| 10,274,599 B2 | 4/2019 | Schmalenberg | |
| 10,281,322 B2 | 5/2019 | Doylend et al. | |
| 10,345,447 B1 | 7/2019 | Hicks | |
| 10,397,019 B2 | 8/2019 | Hartung et al. | |
| 10,564,268 B2 | 2/2020 | Turbide et al. | |
| 10,605,901 B2 | 3/2020 | Lee et al. | |
| 10,627,496 B2 | 4/2020 | Schmalenberg et al. | |
| 10,739,256 B1 | 8/2020 | Rickman et al. | |
| 10,761,195 B2 | 9/2020 | Donovan | |
| 10,782,782 B1 | 9/2020 | DeSalvo et al. | |
| 10,788,582 B2 | 9/2020 | Feng et al. | |
| 10,816,649 B1 | 10/2020 | Keyser et al. | |
| 10,845,480 B1 | 11/2020 | Shah et al. | |
| 10,901,074 B1 | 1/2021 | Pan et al. | |
| 11,022,683 B1 | 6/2021 | Rezk | |
| 11,067,668 B1 | 7/2021 | Bravo | |
| 11,114,815 B1 | 9/2021 | Chen et al. | |
| 11,119,219 B1 | 9/2021 | LaChapelle et al. | |
| 11,162,789 B2 | 11/2021 | Lodin et al. | |
| 11,170,476 B1 | 11/2021 | Toshiwal et al. | |
| 11,175,388 B1 | 11/2021 | Wood et al. | |
| 11,221,404 B1 | 1/2022 | DeSalvo et al. | |
| 11,300,683 B2 | 4/2022 | Bao et al. | |
| 11,378,691 B2 | 7/2022 | Boloorian et al. | |
| 11,448,729 B2 | 9/2022 | Baba et al. | |
| 11,454,724 B2 | 9/2022 | Michaels et al. | |
| 11,486,975 B1 | 11/2022 | Xiao | |
| 11,493,753 B1 | 11/2022 | Wood et al. | |
| 11,525,916 B2 | 12/2022 | Avci et al. | |
| 11,536,805 B2 | 12/2022 | Asghari et al. | |
| 11,579,300 B1 | 2/2023 | Li | |
| 11,635,491 B2 | 4/2023 | Asghari et al. | |
| 11,714,167 B2 | 8/2023 | Feng et al. | |
| 11,815,720 B1 | 11/2023 | Tavallaee et al. | |
| 11,908,075 B2 | 2/2024 | Gorantla | |
| 2002/0031304 A1 | 3/2002 | Roberts et al. | |
| 2002/0105632 A1 | 8/2002 | Holton | |
| 2002/0122398 A1 | 9/2002 | Jou | |
| 2002/0159700 A1 | 10/2002 | Coroy et al. | |
| 2003/0030582 A1 | 2/2003 | Vickers | |
| 2003/0031407 A1 | 2/2003 | Weisberg et al. | |
| 2003/0142943 A1 | 7/2003 | Yegnanarayanan et al. | |
| 2003/0212520 A1 | 11/2003 | Campos et al. | |
| 2003/0231686 A1 | 12/2003 | Liu | |
| 2004/0081388 A1 | 4/2004 | Koyama | |
| 2004/0085612 A1 | 5/2004 | Livingston et al. | |
| 2004/0233964 A1 | 11/2004 | Yamanaka et al. | |
| 2004/0249561 A1 | 12/2004 | Capozzi et al. | |
| 2005/0123227 A1 | 6/2005 | Vonsovici et al. | |
| 2005/0135730 A1 | 6/2005 | Welch et al. | |
| 2005/0219068 A1 | 10/2005 | Jones et al. | |
| 2005/0237617 A1 | 10/2005 | Carr et al. | |
| 2005/0244103 A1 | 11/2005 | Kwakernaak | |
| 2006/0114447 A1 | 6/2006 | Harris et al. | |
| 2007/0024849 A1 | 2/2007 | Carrig et al. | |
| 2007/0024956 A1 | 2/2007 | Coyle | |
| 2007/0036486 A1 | 2/2007 | Miyadera et al. | |
| 2007/0103362 A1 | 5/2007 | Arikan et al. | |
| 2007/0171407 A1 | 7/2007 | Cole et al. | |
| 2007/0223856 A1 | 9/2007 | Nunoya et al. | |
| 2008/0088184 A1 | 4/2008 | Tung et al. | |
| 2008/0123170 A1 | 5/2008 | Reichert et al. | |
| 2008/0174461 A1 | 7/2008 | Hsu | |
| 2008/0176681 A1 | 7/2008 | Donahoe | |
| 2008/0181550 A1 | 7/2008 | Earnshaw | |
| 2008/0205461 A1 | 8/2008 | Henrichs | |
| 2009/0046746 A1 | 2/2009 | Munroe et al. | |
| 2009/0128797 A1 | 5/2009 | Walsh | |
| 2009/0195769 A1 | 8/2009 | Luo et al. | |
| 2009/0279070 A1 | 11/2009 | Ueno | |
| 2010/0027379 A1 | 2/2010 | Saulnier et al. | |
| 2010/0085992 A1 | 4/2010 | Rakuljic et al. | |
| 2010/0159858 A1 | 6/2010 | Dent et al. | |
| 2010/0187442 A1 | 7/2010 | Hochberg et al. | |
| 2010/0271614 A1 | 10/2010 | Albuquerque et al. | |
| 2010/0277714 A1 | 11/2010 | Pedersen et al. | |
| 2010/0280765 A1 | 11/2010 | Marquardt et al. | |
| 2010/0296077 A1 | 11/2010 | Scott et al. | |
| 2010/0309391 A1 | 12/2010 | Plut | |
| 2011/0026643 A1 | 2/2011 | Ruelke et al. | |
| 2011/0068425 A1 | 3/2011 | Liao et al. | |
| 2011/0068426 A1 | 3/2011 | Zheng et al. | |
| 2011/0091155 A1 | 4/2011 | Yilmaz et al. | |
| 2011/0095167 A1 | 4/2011 | Feng et al. | |
| 2011/0141471 A1 | 6/2011 | Schlotterbeck et al. | |
| 2011/0164845 A1 | 7/2011 | Jenkins et al. | |
| 2011/0241895 A1 | 10/2011 | Griffin | |

(56) References Cited

U.S. PATENT DOCUMENTS

| | | |
|---|---|---|
| 2012/0038506 A1 | 2/2012 | Kanamoto et al. |
| 2012/0062230 A1 | 3/2012 | Vaughan, Jr. et al. |
| 2012/0081786 A1 | 4/2012 | Mizuyama et al. |
| 2012/0098935 A1 | 4/2012 | Schmidt et al. |
| 2012/0120382 A1 | 5/2012 | Silny et al. |
| 2012/0182544 A1 | 7/2012 | Asahara et al. |
| 2012/0206712 A1 | 8/2012 | Chang et al. |
| 2013/0044309 A1 | 2/2013 | Dakin et al. |
| 2013/0044311 A1 | 2/2013 | Rakuljic |
| 2013/0051655 A1 | 2/2013 | Collard et al. |
| 2013/0056623 A1 | 3/2013 | Lipson et al. |
| 2013/0083389 A1 | 4/2013 | Dakin et al. |
| 2013/0094074 A1 | 4/2013 | Asghari et al. |
| 2013/0162976 A1 | 6/2013 | Dakin et al. |
| 2013/0206967 A1 | 8/2013 | Shpunt et al. |
| 2013/0242400 A1 | 9/2013 | Chen |
| 2013/0321791 A1 | 12/2013 | Feldkhun et al. |
| 2014/0035776 A1 | 2/2014 | Sochen et al. |
| 2014/0036252 A1 | 2/2014 | Amzajerdian et al. |
| 2014/0054451 A1 | 2/2014 | Abedin et al. |
| 2014/0112357 A1 | 4/2014 | Abedin et al. |
| 2014/0133864 A1 | 5/2014 | Asghari et al. |
| 2014/0153931 A1 | 6/2014 | Doerr |
| 2014/0169392 A1 | 6/2014 | Kim |
| 2014/0211298 A1 | 7/2014 | Sayyah et al. |
| 2014/0269790 A1 | 9/2014 | Sebastian et al. |
| 2014/0332918 A1 | 11/2014 | Li et al. |
| 2014/0376000 A1 | 12/2014 | Swanson et al. |
| 2014/0376001 A1 | 12/2014 | Swanson |
| 2015/0055115 A1 | 2/2015 | Pedersen et al. |
| 2015/0056740 A1 | 2/2015 | Menezo |
| 2015/0109603 A1 | 4/2015 | Kim et al. |
| 2015/0171593 A1 | 6/2015 | Duan et al. |
| 2015/0177367 A1 | 6/2015 | Sebastian et al. |
| 2015/0177383 A1 | 6/2015 | Ruff et al. |
| 2015/0185244 A1 | 7/2015 | Inoue et al. |
| 2015/0207296 A1* | 7/2015 | Rickman ............... H01S 5/021 372/20 |
| 2015/0333480 A1 | 11/2015 | Santis et al. |
| 2015/0346340 A1 | 12/2015 | Yaacobi et al. |
| 2015/0378012 A1 | 12/2015 | Sayyah et al. |
| 2015/0378187 A1 | 12/2015 | Heck et al. |
| 2016/0084945 A1 | 3/2016 | Rodrigo et al. |
| 2016/0161600 A1 | 6/2016 | Eldada et al. |
| 2016/0170141 A1 | 6/2016 | Luo et al. |
| 2016/0209594 A1 | 7/2016 | Bahl |
| 2016/0223663 A1 | 8/2016 | Schmalenberg et al. |
| 2016/0261091 A1 | 9/2016 | Santis et al. |
| 2016/0274226 A1 | 9/2016 | Lewis |
| 2016/0290891 A1 | 10/2016 | Feng et al. |
| 2016/0291135 A1 | 10/2016 | Ando et al. |
| 2016/0299228 A1 | 10/2016 | Maleki et al. |
| 2016/0306043 A1 | 10/2016 | Moss et al. |
| 2016/0324438 A1 | 11/2016 | Halpern et al. |
| 2016/0341818 A1 | 11/2016 | Gilliland et al. |
| 2016/0373191 A1 | 12/2016 | Fathololoumi et al. |
| 2016/0377721 A1 | 12/2016 | Lardin et al. |
| 2017/0003451 A1 | 1/2017 | Ma et al. |
| 2017/0040775 A1 | 2/2017 | Takabayashi et al. |
| 2017/0059779 A1 | 3/2017 | Okayama |
| 2017/0067985 A1 | 3/2017 | Schwarz et al. |
| 2017/0098917 A1 | 4/2017 | Popovic et al. |
| 2017/0108649 A1 | 4/2017 | Dallesasse et al. |
| 2017/0139411 A1 | 5/2017 | Hartung et al. |
| 2017/0146639 A1 | 5/2017 | Carothers |
| 2017/0146641 A1 | 5/2017 | Walsh et al. |
| 2017/0153319 A1 | 6/2017 | Villeneuve et al. |
| 2017/0155225 A1 | 6/2017 | Villeneuve et al. |
| 2017/0184450 A1 | 6/2017 | Doylend et al. |
| 2017/0207600 A1 | 7/2017 | Klamkin et al. |
| 2017/0268866 A1 | 9/2017 | Berz |
| 2017/0269198 A1 | 9/2017 | Hall et al. |
| 2017/0269215 A1 | 9/2017 | Hall et al. |
| 2017/0299697 A1 | 10/2017 | Swanson |
| 2017/0307648 A1 | 10/2017 | Kotake et al. |
| 2017/0307736 A1 | 10/2017 | Donovan |
| 2017/0328988 A1 | 11/2017 | Magee et al. |
| 2017/0343652 A1 | 11/2017 | de Mersseman et al. |
| 2017/0343791 A1 | 11/2017 | Swanson |
| 2017/0350965 A1 | 12/2017 | Schmalenberg |
| 2017/0350983 A1 | 12/2017 | Hall et al. |
| 2017/0356983 A1 | 12/2017 | Jeong et al. |
| 2017/0371227 A1 | 12/2017 | Skirlo et al. |
| 2017/0372602 A1 | 12/2017 | Gilliland et al. |
| 2018/0003805 A1 | 1/2018 | Popovich et al. |
| 2018/0024232 A1 | 1/2018 | Gilliland et al. |
| 2018/0024246 A1 | 1/2018 | Jeong et al. |
| 2018/0031680 A1 | 2/2018 | Lee et al. |
| 2018/0039154 A1 | 2/2018 | Hashemi et al. |
| 2018/0050704 A1 | 2/2018 | Tascione et al. |
| 2018/0073932 A1 | 3/2018 | Minet et al. |
| 2018/0088211 A1 | 3/2018 | Gill et al. |
| 2018/0095284 A1 | 4/2018 | Welch et al. |
| 2018/0102442 A1 | 4/2018 | Wang et al. |
| 2018/0103431 A1 | 4/2018 | Suh et al. |
| 2018/0113216 A1 | 4/2018 | Kremer et al. |
| 2018/0120433 A1 | 5/2018 | Eichenholz et al. |
| 2018/0120436 A1 | 5/2018 | Smits |
| 2018/0136321 A1 | 5/2018 | Verghese et al. |
| 2018/0143322 A1 | 5/2018 | Rosenzweig et al. |
| 2018/0143374 A1 | 5/2018 | Coolbaugh et al. |
| 2018/0149752 A1 | 5/2018 | Tadano |
| 2018/0164408 A1 | 6/2018 | Hall et al. |
| 2018/0172918 A1 | 6/2018 | Lane et al. |
| 2018/0188371 A1 | 7/2018 | Bao et al. |
| 2018/0217471 A1 | 8/2018 | Lee et al. |
| 2018/0224547 A1 | 8/2018 | Crouch et al. |
| 2018/0231643 A1 | 8/2018 | Lee et al. |
| 2018/0269890 A1 | 9/2018 | Ojeda |
| 2018/0287343 A1 | 10/2018 | Morrison et al. |
| 2018/0306925 A1 | 10/2018 | Hosseini et al. |
| 2018/0329037 A1 | 11/2018 | Bozchalooi et al. |
| 2018/0351317 A1 | 12/2018 | Vermeulen |
| 2018/0356344 A1 | 12/2018 | Yi |
| 2018/0356522 A1 | 12/2018 | Kikuchi et al. |
| 2018/0359033 A1 | 12/2018 | Xu et al. |
| 2018/0364334 A1 | 12/2018 | Xiang et al. |
| 2018/0364336 A1 | 12/2018 | Hosseini et al. |
| 2018/0372517 A1 | 12/2018 | Yao et al. |
| 2018/0372530 A1 | 12/2018 | Welle et al. |
| 2018/0372870 A1 | 12/2018 | Puglia |
| 2018/0375284 A1 | 12/2018 | Permogorov |
| 2019/0004151 A1 | 1/2019 | Abediasl et al. |
| 2019/0011558 A1 | 1/2019 | Crouch et al. |
| 2019/0011559 A1 | 1/2019 | Desai et al. |
| 2019/0018110 A1 | 1/2019 | Kremer et al. |
| 2019/0018121 A1 | 1/2019 | Sayyah et al. |
| 2019/0018139 A1 | 1/2019 | Sayyah et al. |
| 2019/0018140 A1 | 1/2019 | Sarkissian et al. |
| 2019/0018197 A1 | 1/2019 | Boutami et al. |
| 2019/0025094 A1 | 1/2019 | Lewis et al. |
| 2019/0025426 A1 | 1/2019 | Satyan et al. |
| 2019/0025431 A1 | 1/2019 | Satyan et al. |
| 2019/0027897 A1 | 1/2019 | Wei et al. |
| 2019/0033453 A1 | 1/2019 | Crouch et al. |
| 2019/0049569 A1 | 2/2019 | Kim et al. |
| 2019/0064329 A1 | 2/2019 | Liu et al. |
| 2019/0064332 A1 | 2/2019 | Schmalenberg et al. |
| 2019/0064358 A1 | 2/2019 | Desai et al. |
| 2019/0072651 A1 | 3/2019 | Halmos et al. |
| 2019/0072672 A1 | 3/2019 | Yao |
| 2019/0086514 A1 | 3/2019 | Dussan et al. |
| 2019/0086518 A1 | 3/2019 | Halstig et al. |
| 2019/0086550 A1 | 3/2019 | Dussan et al. |
| 2019/0096259 A1 | 3/2019 | McQuillen et al. |
| 2019/0101647 A1 | 4/2019 | Feshali et al. |
| 2019/0107623 A1 | 4/2019 | Campbell et al. |
| 2019/0120939 A1 | 4/2019 | O'Keeffe |
| 2019/0146074 A1 | 5/2019 | Hjelmstad |
| 2019/0154816 A1 | 5/2019 | Hughes et al. |
| 2019/0154832 A1 | 5/2019 | Maleki et al. |
| 2019/0154835 A1 | 5/2019 | Maleki et al. |
| 2019/0179012 A1 | 6/2019 | Heo |
| 2019/0187269 A1 | 6/2019 | Tong et al. |

(56) References Cited

U.S. PATENT DOCUMENTS

| | | |
|---|---|---|
| 2019/0204419 A1 | 7/2019 | Baba et al. |
| 2019/0204441 A1 | 7/2019 | Feneyrou et al. |
| 2019/0204443 A1 | 7/2019 | Yao et al. |
| 2019/0250253 A1 | 8/2019 | Hung et al. |
| 2019/0250396 A1 | 8/2019 | Blanche et al. |
| 2019/0257924 A1 | 8/2019 | Li et al. |
| 2019/0257927 A1 | 8/2019 | Yao |
| 2019/0280453 A1 | 9/2019 | Gopinath et al. |
| 2019/0293794 A1 | 9/2019 | Zhang et al. |
| 2019/0302262 A1 | 10/2019 | Singer |
| 2019/0302268 A1 | 10/2019 | Singer et al. |
| 2019/0310372 A1 | 10/2019 | Crouch et al. |
| 2019/0310377 A1 | 10/2019 | Lodin et al. |
| 2019/0317195 A1 | 10/2019 | Sun et al. |
| 2019/0331797 A1 | 10/2019 | Singer et al. |
| 2019/0339388 A1 | 11/2019 | Crouch et al. |
| 2019/0339389 A1 | 11/2019 | Russo et al. |
| 2019/0341739 A1 | 11/2019 | Loh et al. |
| 2019/0346056 A1 | 11/2019 | Staiger et al. |
| 2019/0346568 A1 | 11/2019 | Feng et al. |
| 2019/0353787 A1 | 11/2019 | Petit |
| 2019/0353789 A1 | 11/2019 | Boloorian et al. |
| 2019/0353977 A1 | 11/2019 | Hung |
| 2019/0361122 A1 | 11/2019 | Crouch et al. |
| 2019/0369244 A1 | 12/2019 | Asghari et al. |
| 2019/0369251 A1 | 12/2019 | Feng et al. |
| 2019/0372307 A1 | 12/2019 | Morton |
| 2019/0383907 A1 | 12/2019 | Belsley et al. |
| 2019/0391242 A1 | 12/2019 | Asghari et al. |
| 2019/0391243 A1 | 12/2019 | Nicolaescu |
| 2020/0018857 A1 | 1/2020 | Feng et al. |
| 2020/0021082 A1 | 1/2020 | Rakuljic |
| 2020/0025898 A1 | 1/2020 | Ain-Kedem et al. |
| 2020/0025926 A1 | 1/2020 | Asghari et al. |
| 2020/0043176 A1 | 2/2020 | Maila et al. |
| 2020/0049799 A1 | 2/2020 | Ando et al. |
| 2020/0057143 A1 | 2/2020 | Asghari et al. |
| 2020/0064116 A1 | 2/2020 | Salvade et al. |
| 2020/0072978 A1 | 3/2020 | Boloorian et al. |
| 2020/0072979 A1 | 3/2020 | Boloorian et al. |
| 2020/0076152 A1 | 3/2020 | Eichenholz et al. |
| 2020/0088876 A1 | 3/2020 | Tanemura et al. |
| 2020/0103501 A1 | 4/2020 | Kotelnikov et al. |
| 2020/0104647 A1 | 4/2020 | Pirim |
| 2020/0110179 A1 | 4/2020 | Talty et al. |
| 2020/0116837 A1 | 4/2020 | Aghari et al. |
| 2020/0116842 A1 | 4/2020 | Aghari et al. |
| 2020/0142065 A1 | 5/2020 | Boloorian et al. |
| 2020/0142066 A1 | 5/2020 | Sandborn et al. |
| 2020/0142068 A1 | 5/2020 | Crouch et al. |
| 2020/0150241 A1 | 5/2020 | Byrnes et al. |
| 2020/0158830 A1 | 5/2020 | Asghari et al. |
| 2020/0158833 A1 | 5/2020 | Baba et al. |
| 2020/0158839 A1 | 5/2020 | Lin et al. |
| 2020/0166617 A1 | 5/2020 | Crouch et al. |
| 2020/0166647 A1 | 5/2020 | Crouch et al. |
| 2020/0174095 A1 | 6/2020 | Altintas et al. |
| 2020/0182973 A1 | 6/2020 | Luff et al. |
| 2020/0182978 A1 | 6/2020 | Maleki et al. |
| 2020/0200879 A1 | 6/2020 | Halstig et al. |
| 2020/0209366 A1 | 7/2020 | Maleki |
| 2020/0225332 A1 | 7/2020 | Wagner et al. |
| 2020/0241119 A1 | 7/2020 | Asghari et al. |
| 2020/0249324 A1 | 8/2020 | Steinberg et al. |
| 2020/0249350 A1 | 8/2020 | Schmalenberg |
| 2020/0256956 A1 | 8/2020 | Luff et al. |
| 2020/0278432 A1 | 9/2020 | Thorpe et al. |
| 2020/0284879 A1 | 9/2020 | Asghari et al. |
| 2020/0284883 A1 | 9/2020 | Ferreira et al. |
| 2020/0284913 A1 | 9/2020 | Amelot et al. |
| 2020/0292706 A1 | 9/2020 | Hexsel et al. |
| 2020/0300980 A1 | 9/2020 | Behzadi et al. |
| 2020/0300993 A1 | 9/2020 | Behzadi et al. |
| 2020/0301070 A1 | 9/2020 | Nagarajan |
| 2020/0309949 A1 | 10/2020 | Feng et al. |
| 2020/0309952 A1 | 10/2020 | Imaki et al. |
| 2020/0319409 A1 | 10/2020 | Su et al. |
| 2020/0326476 A1* | 10/2020 | Hiratani ............ G02B 6/12002 |
| 2020/0333441 A1 | 10/2020 | Diaz |
| 2020/0333443 A1 | 10/2020 | Boloorian et al. |
| 2020/0333533 A1 | 10/2020 | Rogers et al. |
| 2020/0363515 A1 | 11/2020 | Luff et al. |
| 2020/0400821 A1 | 12/2020 | Baker et al. |
| 2020/0400822 A1 | 12/2020 | Ando et al. |
| 2020/0408911 A1 | 12/2020 | Boloorian et al. |
| 2020/0408912 A1 | 12/2020 | Boloorian et al. |
| 2021/0010802 A1 | 1/2021 | Onohara et al. |
| 2021/0033732 A1 | 2/2021 | Boloorian et al. |
| 2021/0055388 A1 | 2/2021 | Feng et al. |
| 2021/0063541 A1 | 3/2021 | Zheng et al. |
| 2021/0063542 A1 | 3/2021 | Zheng et al. |
| 2021/0072385 A1 | 3/2021 | Sandborn et al. |
| 2021/0072389 A1 | 3/2021 | Boloorian et al. |
| 2021/0072445 A1 | 3/2021 | Kurokawa et al. |
| 2021/0096228 A1 | 4/2021 | Behzadi et al. |
| 2021/0109195 A1 | 4/2021 | Feng et al. |
| 2021/0116778 A1 | 4/2021 | Zhang et al. |
| 2021/0132232 A1 | 5/2021 | Asghari et al. |
| 2021/0141058 A1 | 5/2021 | Piggott et al. |
| 2021/0149056 A1 | 5/2021 | Luff et al. |
| 2021/0156999 A1 | 5/2021 | Nishino et al. |
| 2021/0159659 A1 | 5/2021 | Bandyopadhyay et al. |
| 2021/0159664 A1 | 5/2021 | Liu et al. |
| 2021/0165102 A1 | 6/2021 | Crouch et al. |
| 2021/0173058 A1 | 6/2021 | Viswanatha et al. |
| 2021/0181320 A1 | 6/2021 | Oza et al. |
| 2021/0190907 A1 | 6/2021 | Sahara |
| 2021/0190925 A1 | 6/2021 | Asghari et al. |
| 2021/0199797 A1 | 7/2021 | Choi et al. |
| 2021/0239811 A1 | 8/2021 | Asghari et al. |
| 2021/0255324 A1 | 8/2021 | Dunn et al. |
| 2021/0278540 A1 | 9/2021 | Maayan et al. |
| 2021/0293923 A1 | 9/2021 | Arkind et al. |
| 2021/0318436 A1 | 10/2021 | Boloorian et al. |
| 2021/0325520 A1 | 10/2021 | Cai et al. |
| 2021/0333386 A1 | 10/2021 | Park et al. |
| 2021/0349196 A1 | 11/2021 | Wang et al. |
| 2021/0349216 A1 | 11/2021 | Behroozpour et al. |
| 2021/0356592 A1 | 11/2021 | Behroozpour |
| 2021/0373162 A1 | 12/2021 | Wu et al. |
| 2021/0389244 A1 | 12/2021 | Bowman et al. |
| 2021/0396879 A1 | 12/2021 | Sun et al. |
| 2021/0405194 A1 | 12/2021 | Tsuchida |
| 2022/0003842 A1 | 1/2022 | Wang et al. |
| 2022/0050187 A1 | 2/2022 | Yao |
| 2022/0065999 A1 | 3/2022 | Phare et al. |
| 2022/0075121 A1 | 3/2022 | Lowder et al. |
| 2022/0085567 A1 | 3/2022 | Lowder et al. |
| 2022/0099837 A1 | 3/2022 | Crouch et al. |
| 2022/0107411 A1 | 4/2022 | Koonath et al. |
| 2022/0113422 A1 | 4/2022 | Hillard et al. |
| 2022/0121080 A1 | 4/2022 | Yao |
| 2022/0179055 A1 | 6/2022 | Ferrara et al. |
| 2022/0187457 A1 | 6/2022 | Daami et al. |
| 2022/0187458 A1 | 6/2022 | Piggott et al. |
| 2022/0187463 A1 | 6/2022 | Maheshwari et al. |
| 2022/0196814 A1 | 6/2022 | Lin et al. |
| 2022/0206164 A1 | 6/2022 | Takada |
| 2022/0244360 A1 | 8/2022 | Phare et al. |
| 2022/0291361 A1 | 9/2022 | Asghari et al. |
| 2022/0308192 A1 | 9/2022 | John et al. |
| 2022/0334225 A1 | 10/2022 | Davydenko et al. |
| 2022/0342048 A1 | 10/2022 | Asghari et al. |
| 2022/0365214 A1 | 11/2022 | Sandborn et al. |
| 2022/0373667 A1 | 11/2022 | Khatana et al. |
| 2022/0404470 A1 | 12/2022 | Asghari et al. |
| 2022/0413100 A1 | 12/2022 | Jain |
| 2022/0413143 A1 | 12/2022 | Parsa et al. |
| 2023/0027271 A1 | 1/2023 | Jin et al. |
| 2023/0069201 A1 | 3/2023 | Asghari et al. |
| 2023/0104453 A1 | 4/2023 | Asghari et al. |
| 2023/0194952 A1 | 6/2023 | Muranaka et al. |
| 2023/0228878 A1 | 7/2023 | Asghari et al. |
| 2023/0258861 A1 | 8/2023 | Vercruysse et al. |

(56) References Cited

U.S. PATENT DOCUMENTS

| | | | |
|---|---|---|---|
| 2023/0288566 A1 | 9/2023 | Nadkarni et al. | |
| 2023/0296732 A1 | 9/2023 | Xiao | |
| 2025/0085401 A1 | 3/2025 | Zhou et al. | |
| 2025/0094380 A1 | 3/2025 | Mazed | |

FOREIGN PATENT DOCUMENTS

| | | |
|---|---|---|
| CN | 103874945 A | 6/2014 |
| CN | 104459881 A | 3/2015 |
| CN | 204479750 U | 7/2015 |
| CN | 105589074 A | 5/2016 |
| CN | 105680320 A | 6/2016 |
| CN | 105917257 A | 8/2016 |
| CN | 106154248 A | 11/2016 |
| CN | 106410607 A | 2/2017 |
| CN | 106773028 A | 5/2017 |
| CN | 106842232 A | 6/2017 |
| CN | 106959439 A | 7/2017 |
| CN | 107144847 A | 9/2017 |
| CN | 107305184 A | 10/2017 |
| CN | 107367734 A | 11/2017 |
| CN | 107976666 A | 5/2018 |
| CN | 108139465 A | 6/2018 |
| CN | 108291970 A | 7/2018 |
| CN | 108603758 A | 9/2018 |
| CN | 109642952 A | 4/2019 |
| CN | 110036276 A | 7/2019 |
| CN | 107192355 B | 8/2019 |
| CN | 110161516 A | 8/2019 |
| CN | 110187350 A | 8/2019 |
| CN | 110412685 A | 11/2019 |
| CN | 111338025 A | 6/2020 |
| CN | 112241014 A | 1/2021 |
| CN | 114419152 A | 4/2022 |
| DE | 10 2015 222061 A1 | 5/2017 |
| DE | 10 2017 200795 A1 | 7/2018 |
| DE | 10 2017 106 226 A1 | 9/2018 |
| DE | 102019124598 A1 | 3/2020 |
| EP | 0 523 921 A1 | 1/1993 |
| EP | 2796890 A1 | 10/2014 |
| EP | 2955542 B1 | 4/2017 |
| EP | 3276371 A1 | 1/2018 |
| EP | 3339924 A1 | 6/2018 |
| EP | 3259615 B1 | 11/2019 |
| EP | 3889644 A1 | 10/2021 |
| GB | 1 585 053 A | 2/1981 |
| GB | 2173664 A | 10/1986 |
| JP | H1010227 A | 1/1998 |
| JP | 2003224321 A | 8/2003 |
| JP | 2004-151022 A | 5/2004 |
| JP | 2007184511 A | 7/2007 |
| JP | 2008160130 A | 7/2008 |
| JP | 2008292370 A | 12/2008 |
| JP | 2009-115696 A | 5/2009 |
| JP | 2010151806 A | 7/2010 |
| JP | 2010271624 A | 12/2010 |
| JP | 2012146787 A | 8/2012 |
| JP | 2013165407 A | 8/2013 |
| JP | 2014202716 A | 10/2014 |
| JP | 2015-018640 A | 1/2015 |
| JP | 2015092184 A | 5/2015 |
| JP | 2015172540 A | 10/2015 |
| JP | 2015180735 A | 10/2015 |
| JP | 2015230259 A | 12/2015 |
| JP | 2016111087 A | 6/2016 |
| JP | 2016-525209 A | 8/2016 |
| JP | 5975203 B2 | 8/2016 |
| JP | 2017502315 A | 1/2017 |
| JP | 2017097340 A | 6/2017 |
| JP | 2017106897 A | 6/2017 |
| JP | 2017524918 A | 8/2017 |
| JP | 2017161484 A | 9/2017 |
| JP | 2017-198514 A | 11/2017 |
| JP | 2017-211348 A | 11/2017 |
| JP | 2018511054 A | 4/2018 |
| JP | 2018-512600 A | 5/2018 |
| JP | 2018520346 A | 7/2018 |
| JP | 2018529955 A | 10/2018 |
| JP | 2018188284 A | 11/2018 |
| JP | 2018200273 A | 12/2018 |
| JP | 2019502925 A | 1/2019 |
| JP | 2019095218 A | 6/2019 |
| JP | 2019525195 A | 9/2019 |
| JP | 2019-537012 A | 12/2019 |
| JP | 2020-16639 A | 1/2020 |
| JP | 2020-34546 A | 3/2020 |
| JP | 2002090457 A | 3/2020 |
| JP | 2020085723 A | 6/2020 |
| JP | 2021004800 A | 1/2021 |
| JP | 2021032848 A | 3/2021 |
| JP | 7397009 A | 12/2023 |
| KR | 20060086182 A | 7/2006 |
| KR | 10-2015-0045735 A | 4/2015 |
| KR | 20180013598 A | 2/2018 |
| KR | 101 931 022 B1 | 12/2018 |
| WO | 97/11396 A1 | 3/1997 |
| WO | 2010123182 A1 | 10/2010 |
| WO | 2010127151 A1 | 11/2010 |
| WO | 2012123668 A1 | 9/2012 |
| WO | 2012153309 A2 | 11/2012 |
| WO | 2013/049579 A1 | 4/2013 |
| WO | 2014/203654 A1 | 12/2014 |
| WO | 2014/206630 A1 | 12/2014 |
| WO | 2015/044370 A1 | 4/2015 |
| WO | 2015/058209 A1 | 4/2015 |
| WO | 2015/098027 A1 | 7/2015 |
| WO | 2015/200800 A1 | 12/2015 |
| WO | 2016/097409 A2 | 6/2016 |
| WO | 2017/023107 A1 | 2/2017 |
| WO | 2017/083597 A1 | 5/2017 |
| WO | 2017/095817 A1 | 6/2017 |
| WO | 2017/102156 A1 | 6/2017 |
| WO | 2017/187510 A1 | 11/2017 |
| WO | 2017/216581 A1 | 12/2017 |
| WO | 2018/003852 A1 | 1/2018 |
| WO | 2018/036946 A1 | 3/2018 |
| WO | 2018/060318 A1 | 4/2018 |
| WO | 2018/116412 A1 | 6/2018 |
| WO | 2018/160240 A2 | 9/2018 |
| WO | 2018/230474 A1 | 12/2018 |
| WO | 2019/010320 A1 | 1/2019 |
| WO | 2019/018894 A1 | 1/2019 |
| WO | 2019/121069 A1 | 6/2019 |
| WO | 2019/130472 A1 | 7/2019 |
| WO | 2019/149815 A1 | 8/2019 |
| WO | 2019/196135 A1 | 10/2019 |
| WO | 2019/217761 A1 | 11/2019 |
| WO | 2019/217857 A1 | 11/2019 |
| WO | 2019/236430 A1 | 12/2019 |
| WO | 2019/236464 A1 | 12/2019 |
| WO | 2020/005537 A1 | 1/2020 |
| WO | 2020/033161 A1 | 2/2020 |
| WO | 2020/046513 A1 | 3/2020 |
| WO | 2020/076566 A1 | 4/2020 |
| WO | 2020/110779 A1 | 6/2020 |
| WO | 2020/129284 A1 | 6/2020 |
| WO | 2020/234797 A1 | 11/2020 |
| WO | 2020/251633 A1 | 12/2020 |
| WO | 2021/024038 A1 | 2/2021 |
| WO | 2021/252894 A1 | 12/2021 |
| WO | 2022/013422 A1 | 1/2022 |
| WO | 2022/233503 A1 | 11/2022 |
| WO | 2023/118295 A1 | 6/2023 |

OTHER PUBLICATIONS

Anderson et al., "ladar: Frequency-Modulated Continuous Wave Laser Detection and Ranging", Photogrammetric Engineering & Remote Sensing, vol. 83, No. 11, Nov. 2017.

Baghmisheh, B. B., "Chip-scale Lidar", Jan. 19, 2017, Electrical Engineering and Computer Sciences University of California, Berkeley.

(56) References Cited

OTHER PUBLICATIONS

Behroozpour et al., "Electronic-Photonic Integrated Circulator 3D Microimaging", IEEE Journal of Solid-State Circuits, Jan. 2017, vol. 52, No. 1, pp. 161-172.
Behroozpour, B. et al., "Lidar System Architectures and Circuits," IEEE Communications Magazine, Oct. 2017, pp. 135-142.
Carter et al., "Lidar 101: An Introduction to Lidar Technology, Data, and Applications", Nov. 2012, NOAA Coastal Services Center, 76 pages.
Chan, M.K, "Atmospheric transmission windows for high energy short pulse lasers", Thesis, Naval Postgraduate School, Dec. 2003.
Conditional Euclidean Clustering, retrieved on Jul. 9, 2022 from https://pcl.readthedocs.io/projects/tutorials/en/latest/cluster_extraction.html#cluster-extraction.
Cooksey, Catherine C. et al., "Reflectance measurements of human skin from the ultraviolet to the shortwave infrared (250 nm to 2500 nm)", May 23, 2013, SPIE Defense, Security, and Sensing Conference Proceedings Apr. 29-May 3, 2013, Baltimore, Maryland, vol. 8734, Active and Passive Signatures, 9 pages.
Day, I.E., et al. "Solid state absorption attenuator in silicon-on-insulator with MHz bandwidth.", Integrated Photonics Research 2002, Vancouver, Canada, Jul. 17-19, 2002 (Optica Publishing Group, 2002), paper IFA5, 3 pages.
Doylend, J. K., "Two-dimensional free-space beam steering with an optical phased array on silicon-on-insulator", Oct. 1, 2011, Optics Express, 19(22), 21595-2160.
Euclidean Cluster Extraction, retrieved on Jul. 9, 2022 from https://pcl.readthedocs.io/projects/tutorials/en/latest/conditional_euclidean_clustering.html.
Gao, S. and Hui, R., "4. Frequency-modulated continuous-wave lidar using I/Q modulator for simplified heterodyne detection", Optics Letter, vol. 37, No. 11, Jun. 1, 2012, pp. 2022-2024.
Gemfire Corporation, "8-Channel Cyclic (Colorless) Arrayed Waveguide Grating (AWG)", (2018). Retrieved from AMS Technologies: http://www.amstechnologies.com/products/optical-technologies/components/fiberoptics/multiplexers/awg-multiplexers/view/8-channel-cyclic-arrayed-waveguide-grating-awg/.
Goodman, J., "Speckle Phenomena in Optics Theory and Applications", Roberts and Company, Sep. 28, 2007, 130(2), pp. 413-414.
Gulati, et al., "A Low-Power Reconfigurable Analog-to-Digital Converter", IEEE Journal of Solid-State Circuits, Dec. 2001, vol. 36, No. 12, pp. 1900-1911.
Guo et al., "Beat-frequency adjustable Er3+-doped DBR fiber laser for ultrasound detection", Optics Express, Jan. 31, 2011, vol. 19, No. 3, pp. 2485-2492.
Haran, T., "Short-wave infrared diffuse reflectance of Textile Materials", Thesis, Georgia State University, 2008.
Heck et al., "Hybrid Silicon Photonic Integrated Circuit Technology", IEEE Journal of Selected Topics in Quantum Electronics, IEEE, USA, vol. 19, No. 4, Jul. 1, 2013, p. 6100117, 17 pages.
Hsu et al., "Free-Space Applications of Silicon Photonics: A Review, Micromachines 2022", 13, 990, Jun. 24, 2022 [Retrieved from: <URL: https://mdpi.com/2072-66X/13/7/990>.
Issakov, V. "Radar Systems, Ch. 2. In Microwave Circuits for 24GHz Automotive Radar in Silicon-based Technologies", Jan. 1, 2010, Berlin Heidelberg: Springer-Verlag, pp. 5-18.
Kaasalainen, S., "The multispectral journey of Lidar", Retrieved from GIM International: https://www.gim-international.com/content/article/the-multispectral-journey-of-lidar, Jan. 24, 2019.
Kelly et al., "Discrete mode laser diodes with ultra narrow linewidthe emission" Feb. 2007, Electronics Letters, vol. 43, 2 pgs.
Klumperink, Eric A.M. et al., "N-path filters and Mixer-First Receivers: A review", 2017 IEEE Custom Integrated Circuits Conference (CICC), Austin, TX, USA, Apr. 30, 2017, pp. 1-8.
Komljenovic et al., "Widely-Tunable Ring-Resonator Semiconductor Lasers", Review, Jul. 17, 2017, 21 pages.
Kotthaus, S., et al., "Derivation of an urban materials spectral library through emittance and reflectance spectroscopy", ISPRS Journal of Photogrammetry and Remote Sensing, Aug. 2014, vol. 94, 194-212.
Kumar et al., "Intra-data center interconnects, networking, and architectures", Coherent Detection, Optical Fiber Telecommunications VII, Oct. 25, 2019, Science Direct, pp. 627-672.
Li, L., "Time-of-Flight Camera—An Introduction", 2014, TI Technical White Paper, SLOA190B.
Li et al., "Photon-Counting Chirped Amplitude Modulation Lidar with 1.5-GHz Gated InGaAs/InP APD", IEEE Photonics Technology Letters, Mar. 15, 2015, vol. 27, No. 6, pp. 616-719.
Lu, Z., "Silicon Photonic Switches for Optical Communication Applications", PhD Thesis. University of British Columbia, Sep. 29, 2017, 165 pages.
PDB450C—Switchable Gain Balanced Amp. Photodetector, InGaAs. (n.d.). Retrieved from Thorlabs: https://www.thorlabs.com/thorproduct.cfm?partnumber=PDB450C.
Pfennigbauer, M. et al., "Multi-Wavelength Airborne Laser Scanning", ILMF 2011. New Orleans, Feb. 7-9, 2011.
PI Motion/Positioning, 2018, Retrieved from Pi USA: http://www.pi-usa.us/products/PDF_Data/Q-522_Mini_Positioning_Stage_20150203.pdf.
PI USA: Fast Tip/Tilt Platform, 2018, Retrieved from PI USA Active Optics: http://www.pi-usa.us/products/PDF_Data/S335_Fast_Tip-Tilt_Platform.pdf.
Pierrottet et al., "Linear FMCW Laser Radar for Precision Range and Vector Velocity Measurements", MRS Online Proceeding Library Archive, Jan. 2008, pp. 1-9.
Pilot Photonics, Lyra OCS 1000, Optical comb laser module, Retrieved on Nov. 20, 2019 from Pilot Photonics: http://www.pilotphotonics.com/optical-frequency-comb-source/.
Poulton, C. V. MSC Thesis, "Integrated LIDAR with Optical Phased Arrays in Silicon Photonics", Massachusetts Institute of Technology, Sep. 2016, pp. 95-101.
Poulton, Christopher V. et al., "Coherent Solid-State LIDAR with Silicon Photonic Optical Phased Arrays", pp. 4091-4094, Oct. 15, 2017, Optics Letters, vol. 42, No. 20.
Rablau, "LIDAR—A new (self-driving) vehicle for introducing optics to broader engineering and non-engineering audiences", in Fifteenth Conference on Education and Training in Optics and Photonics 2019, May 21-24, 2019, Quebec City, Quebec, Optica Publishing Group 2019, Paper 11143_138 (14 pages).
Royo et al., "An Overview of LIDAR Imaging Systems for Autonomous Vehicles", Appl. Sci., Sep. 30, 2019, 9 (19):4093, 37 pages. https://doi.org/10.3390/app9194093.
Rusu, Radu Bogdan Dissertation, Semantic 3D Object Maps for Everyday Manipulation in Human Living Environments, retrieved on Jul. 9, 2022 from http://mediatum.ub.tum.de/doc/800632/941254.pdf.
Sandborn, Phillip Alan McGinnis, "FMCW Lidar: Scaling to the Chip-Level and Improving Phase-Noise-Limited Performance", Fall 2017, 18 pages.
Satyan, N. et al, "Precise control of broadband frequency chirps using optoelectronic feedback," Optics Express, Aug. 31, 2009, vol. 17, No. 18, pp. 15991-15999.
Schulmeister, Karl, "White Paper The new edition of the international laser product safety standard", IEC 60825-1, 2014.
Self, "Focusing of spherical Gaussian beams", Applied Optics, Mar. 1, 1983, vol. 22, No. 5, pp. 658-661.
Singh, Jaswant, "Spectral Reflectance of Land Covers", Retrieved from Department of Geology, Aligharh Muslim University: http://www.geol-amu.org/notes/m1r-1-8.htm, Aug. 15, 2016, 11 pages.
Smit, Meint K. C. v., "Phasar-Based WDM-Devices: Principles, Design and Applications", IEEE Journal of Selected Topics in Quantum Electronics, Jan. 1, 1996, 2(2), 236-250.
Soref, Richard A. et al. "Electrooptical Effects in Silicon", IEEE Journal of Quantum Electronics, vol. QE-23, No. 1, Jan. 1987, pp. 123-129.
Stephens et al., "Demonstration of an Interferometric Laser Ranging System for a Follow-On Gravity Mission to Grace", IEEE International Symposium on Geoscience and Remote Sensing, Jul. 31, 2006 to Aug. 4, 2006, pp. 1115-1118.
Sun, J., et al., "Large-scale silicon photonic circuits for optical phased arrays," vol. 20, No. 4, Jul./Aug. 2014. IEEE Journal of Selected Topics in Quantum Electronics.

(56) References Cited

OTHER PUBLICATIONS

"The Demultiplexer" accessed from www.electronics-tutorials.ws/combination/comb_3.html with WayBack Machine dated Feb. 9, 2008, 2 pages.

Van Acoleyen et al., "Off-chip beam steering with a one-dimensional optical phased array on silicon-on-insulator", Apr. 2009, Opt. Lett., 34(9) 1477-1479.

Van Acoleyen et al., "Two-Dimensional Dispersive Off-Chip Beam Scanner Fabricated on Silicon-On-Insulator", Jun. 16, 2011, IEEE Photon. Technol. Lett., 23(17), 1270-1272.

Vasilyev, A. et al., "The Optoelectronic Swept-Frequency Laser and Its Applications in Ranging, Three-Dimensional Imaging, and Coherent Beam Combining of Chirped-Seed Amplifiers," CaltechThesis, May 20, 2013, 177 pages.

Velodyne, "HDL-64E S2 Datasheet. Retrieved from http://velodynelidar.com/lidar/products/brochure/HDL-64E%20S2%20datasheet_2010_lowres.pdf", 2017.

Wang et al., "Automotive FMCW Radar-enhanced Range Estimation via a Local Resampling Fourier Transform", International Journal of Advanced Robotic Systems, May 15, 2016, pp. 1-8.

Wikipedia, Optical Attenuator, 2022, 3 pages.

Wojtanowski, J. et al., "Comparison of 905 nm and 1550 nm semiconductor laser rangefinders' performance deterioration due to adverse environmental conditions", Opto-Electronics Review, 22(3), 183-190, Jun. 13, 2014.

Wojtkiewicz et al., "Two-dimensional signal processing in FMCW radars", National Conference on Circuit Theory and Electronic Networks, vol. 2, Oct. 1997, pp. 1-6.

Zhu et al., "Dual-Comb Ranging", Engineering, 4, Oct. 16, 2018, pp. 772-778.

\* cited by examiner

BURIED TAPER WITH REFLECTING SURFACE

FIELD

The invention relates to optical devices. In particular, the invention relates to construction of ports in optical devices.

BACKGROUND

The performance demands placed on optical imaging systems is increasing as these systems support an increasing number of applications. Optical imaging systems generally generate data for a series of sample regions that are each sequentially illuminated by a system output signal. The data for a sample region indicates the radial velocity and/or distance between the imaging system and one or more objects located in the sample region. The imaging system can scan the system output signal to multiple different sample regions. The sample regions can be stitched together to form a field of view for the imaging system. As a result, the data from the different sample regions provides the data for objects within the field of view.

Semiconductor chips can have photonic circuits with optical waveguides that guide the light signals that are used in these imaging system. The light signals frequently exit the semiconductor chip traveling toward a location that is above or below the chip. As a result, the waveguides on these chips often guide the light signals to a port that reflects the light signal such that the light signal exits the chip traveling toward a location that is above or below the chip.

Because of the small cross-sectional dimensions of the waveguides on these chips, light signals that exit a chip can have an undesirably high level of spread as the light signal travels away from the chip. The spread of the light signal can decrease as the cross sectional dimensions of the waveguide increases. As a result, it can be desirable to expand the dimensions of a waveguide before a light signal carried by the waveguide exits the chip.

Once the dimensions of a waveguide are expanded to the desired level, it becomes difficult to align the waveguide with a reflecting surface in a port. As a result, the fabrication of an interface between a portion of a waveguide having expanded dimensions and the port has proven to be challenging. There is a need for an improved interface between a waveguide located on a chip and having expanded cross-sectional dimensions and a port through which light signals guided by that waveguide exit the chip.

SUMMARY

An optical device has a semiconductor chip with a photonic circuit. The photonic circuit includes a waveguide with a first portion and a second portion. A cross sectional area of the second portion of the waveguide is larger than a cross sectional area of the first portion of the waveguide. The first portion of the waveguide is positioned over a device platform. The waveguide includes a taper that provides a transition between the first portion of the waveguide and the second portion of the waveguide. The taper is an inverted taper that extends below the first portion of the waveguide into the device platform. The second portion of the waveguide terminates at a facet. A recess extends into the chip. The recess has lateral sides. A first one of the lateral sides serving as the facet. A second one of the lateral sides is positioned such that light signals that exit the waveguide through the facet travel across the recess to be received at the second lateral side. The second lateral side is configured to reflect the light signals such that after reflection by the second lateral side the light signals travel away from the second lateral side and toward a location that is above the chip or below the chip.

Another embodiment of an optical device has a semiconductor chip with a photonic circuit. The photonic circuit includes a waveguide with a first portion and a second portion. A cross sectional area of the second portion of the waveguide is larger than a cross sectional area of the first portion of the waveguide. The first portion of the waveguide being positioned over a device platform. The waveguide includes a taper that provides a transition between the first portion of the waveguide and the second portion of the waveguide. The taper is an inverted taper that extends below the first portion of the waveguide into the device platform. The second portion of the waveguide terminates at a facet. A recess extends into the chip. The recess has lateral sides. A first one of the lateral sides serving as the facet. A second one of the lateral sides is configured to reflect light signals that the second lateral side receives from a location that is above the chip or below the chip. The second lateral side is configured such that after reflection by the second lateral side the light signals travel across the recess to be received at the facet.

A method of forming an optical device includes forming a waveguide in a semiconductor chip such that the waveguide has a first portion and a second portion. A cross sectional area of the second portion of the waveguide is larger than a cross sectional area of the first portion of the waveguide. The waveguide includes a taper that provides a transition between the first portion of the waveguide and the second portion of the waveguide. The taper is an inverted taper that extends below the first portion of the waveguide into the device platform. The method also includes forming a recess that extends into the chip and has lateral sides. A first one of the lateral sides serves as a facet at which the second portion of the waveguide terminates. A second one of the lateral sides is positioned such that light signals that exit the waveguide through the facet travel across the recess to be received at the second lateral side. The recess is formed such that the second lateral side is configured to reflect the received light signals such that after reflection of the light signals at the second lateral side the light signals travel away from the second lateral side and toward a location that is above the chip or below the chip.

Another method of forming an optical device includes forming a waveguide in a semiconductor chip such that the waveguide has a first portion and a second portion. A cross sectional area of the second portion of the waveguide is larger than a cross sectional area of the first portion of the waveguide. The waveguide includes a taper that provides a transition between the first portion of the waveguide and the second portion of the waveguide. The taper is an inverted taper that extends below the first portion of the waveguide into the device platform. The method also includes forming a recess that extends into the chip and has lateral sides. A first one of the lateral sides serves as a facet at which the second portion of the waveguide terminates. A second one of the lateral sides is configured to reflect light signals that the second lateral side receives from a location that is above the chip or below the chip. The second lateral side is configured such that after reflection by the second lateral side the light signals travel across the recess to be received at the facet.

BRIEF DESCRIPTION OF THE FIGURES

FIG. 2A is schematic of a portion of a photonic circuit chip. The photonic circuit chip includes multiple alternate waveguides that exchange light signals with the port. The port includes a redirection component.

FIG. 2B is a cross section of FIG. 2A taken along the longitudinal axis of one of the alternate waveguides.

FIG. 2C is a cross section of the beam-directing component taken along the line labeled C in FIG. 2A.

FIG. 2D is schematic of a portion of a photonic circuit chip. The photonic circuit chip includes multiple alternate waveguides that exchange light signals with the port or includes multiple input waveguides that exchange light signals with the port.

FIG. 4A is a topview of the redirection component.

FIG. 4B is a cross-section of the redirection component of FIG. 4A taken along the line labeled B in FIG. 4A.

FIG. 5A is a topview of the portion of the waveguide that includes the taper.

FIG. 5B is a cross section of the portion of the photonic circuit chip illustrated in FIG. 5A taken along the line labeled B.

FIG. 6A is a topview of the optical switch.

FIG. 6B is a cross section of the optical switch shown in FIG. 6A taken along the line labeled B in FIG. 6A.

FIG. 8A illustrates a path of a light signal from a photonic circuit chip and through the adapter until the light signal exits the adapter.

FIG. 8B illustrates a path of a light signal from an object located outside of the LIDAR system, through the adapter, to the photonic circuit chip.

FIG. 8C compares the paths that light signals that carry different channels travel through the adapter of FIG. 8A.

FIG. 10B is a schematic of an example of a suitable optical-to-electrical assembly for use in the processing component of FIG. 10A.

FIG. 13A through FIG. 13F illustrate construction of a photonic circuit chip from a transfer chip and a beat signal generation chip. FIG. 13A is a topview of a beat signal generation chip.

FIG. 13B is a topview of a portion of a beat signal generation chip that includes multiple cores.

FIG. 13C is a topview of a transfer chip.

FIG. 13D is a perspective view of a portion of the beat signal generation chip shown in FIG. 13A or FIG. 13B.

FIG. 13E is a perspective view of a portion of a transfer chip.

FIG. 13F illustrates an interface between a transfer chip constructed according to FIG. 13E and a signal generation chip constructed according to FIG. 13D. FIG. 13F is a cross section of the system taken through an alternate waveguide on the beat signal generation chip and a second alternate waveguide on the transfer chip.

FIG. 16A is a perspective view of the portion of a semiconductor chip having the interface between a redirection component and a waveguide taper.

FIG. 16B is a cross section of the semiconductor chip shown in FIG. 16A taken along the line labeled B in FIG. 16A.

FIG. 16C is a cross section of the semiconductor chip shown in FIG. 16A taken along the line labeled C in FIG. 16A.

FIG. 16D is a perspective view of a portion of the semiconductor chip shown in FIG. 16A that includes an inverted waveguide taper. A portion of the chip is treated as transparent so the relationship between underlying features is visible.

FIG. 16E is the cross section of the semiconductor chip shown in FIG. 16A taken along a line extending between the brackets labeled E.

FIG. 17A is a perspective view of a portion of a device precursor where the platform taper and a port recess will be fabricated. Cladding trenches are formed in the device precursor.

FIG. 17O is a cross section of the device precursor shown in FIG. 17N after formation of a reflecting layer on the reflecting surface.

DESCRIPTION

An optical device has a semiconductor chip with a photonic circuit. The photonic circuit includes a waveguide with a first portion and a second portion. The first portion of the waveguide and the second portion of the waveguide have different cross sectional dimensions. The first portion of the waveguide is positioned over a device platform. The waveguide includes a taper that provides a transition between the first portion of the waveguide and the second portion of the waveguide. The taper is an inverted taper that extends downward from the first portion of the waveguide into the device platform. As a result, the second portion of the waveguide can also extend into the device platform and can terminate at a facet that extends into the device platform.

The optical device also has a reflecting side with a reflecting surface. The reflecting surface reflects light signals from above the optical device toward the facet and/or reflects light signals received from the facet toward a location above the optical device. The reflecting side can extend into the device platform. For instance, the device can include a port recess that has lateral sides that extend into the device platform. A first one of the lateral sides can include the facet and a second one of the lateral sides can serve as the reflecting side. The lateral sides of the port recess can be configured such that a light signal that exits the waveguide through the facet, travels across the port recess to be received at the second side, and is reflected toward a location above the optical device. Alternately, the light signals can travel in the reverse direction through the port recess. As a result, the use of the inverted taper allows the reflecting side to be aligned with the facet.

Figure 1A:
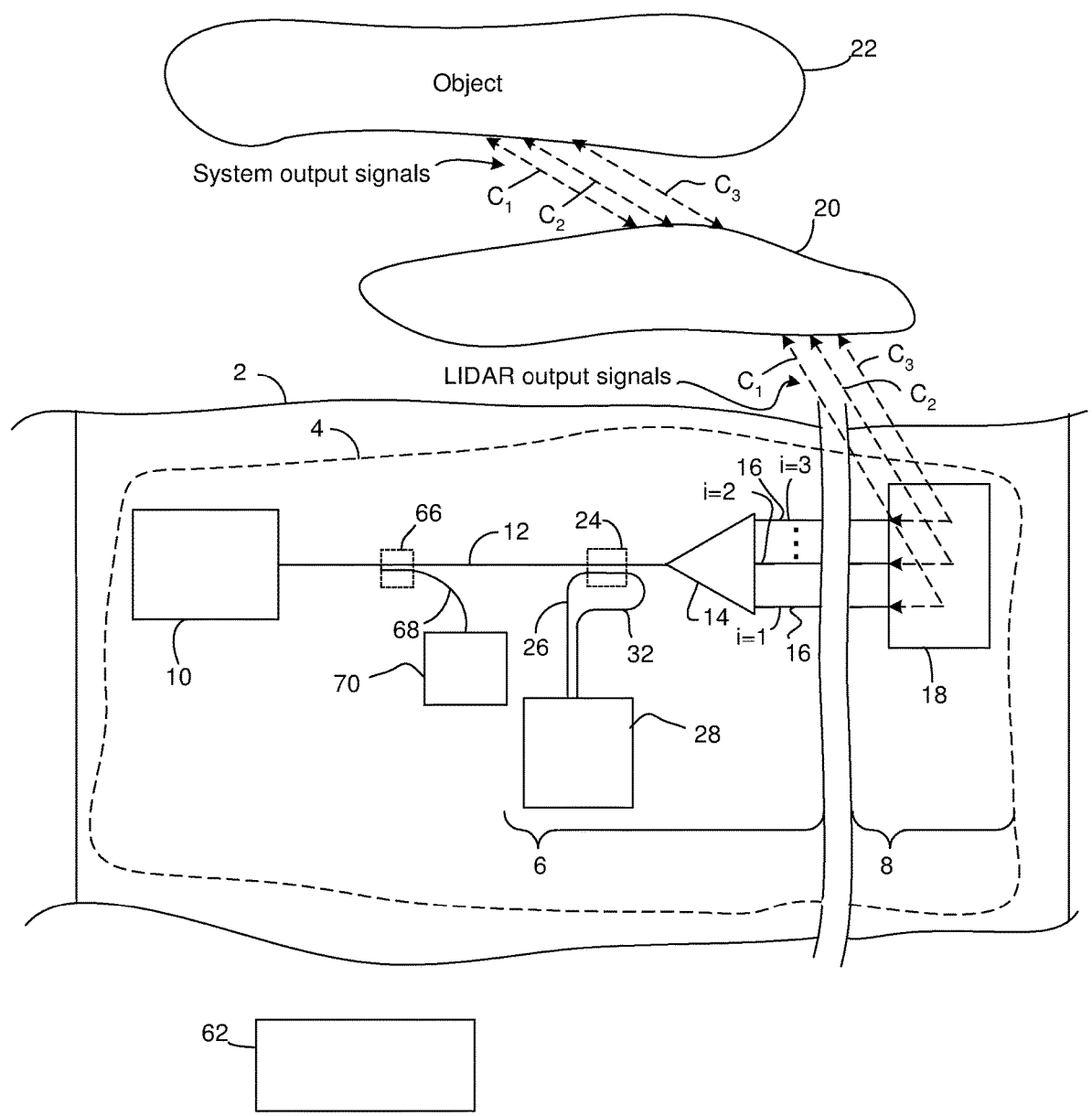
FIG. 1A illustrates an imaging system that includes a chip with a photonic circuit.

FIG. 1A is a schematic of a LIDAR system that includes a LIDAR chip 2. FIG. 1A includes a topview of a portion of the LIDAR chip 2. The LIDAR chip includes a LIDAR core 4. The LIDAR core 4 includes a photonic integrated circuit. The photonic circuit includes a beat signal generation section 6 and a transfer section 8. The beat signal generation section 6 includes components that generate a beating optical signal from which LIDAR data is generated. The transfer section 8 includes one or more components that manage the input of light signals to the LIDAR chip and/or output of light signals from the LIDAR chip.

The LIDAR core can include a light source 10 that outputs an outgoing LIDAR signal. The LIDAR core includes a utility waveguide 12 that receives the outgoing LIDAR signal from the light source 10. The utility waveguide 12 carries the outgoing LIDAR signal to a signal directing component 14. The signal directing component 14 can be operated by electronics so as direct light from the light source output signal to one of multiple different alternate waveguides 16. There are N alternate waveguides and each of the alternate waveguides 16 is associated with an alternate waveguide index i where i has a value from 1 to N. Suitable values of N include, but are not limited to, values less than 128, 64, or 32 and/or greater than 2, 8, or 16. In one example, N is between 2 and 128.

Each of the alternate waveguides 16 can receive the outgoing LIDAR signal from the signal directing component 14. When any of the alternate waveguides 16 receives the outgoing LIDAR signals, the alternate waveguides 16 carries the outgoing LIDAR signal to a port 18 through which the outgoing LIDAR signal can exit from the LIDAR chip and serve as a LIDAR output signal.

FIG. 1A has multiple arrows that each represents a LIDAR output signal traveling away from the LIDAR chip in a different direction. The port 18 is constructed such that the direction that a LIDAR output signal travels away from the LIDAR chip is a function of the alternate waveguide 16 to which the outgoing LIDAR signal is directed. Light signals that result from the outgoing LIDAR signal being directed to the alternate waveguide 16 with alternate waveguide index i are classified as light signals carrying channel ($C_i$). Accordingly, each of the LIDAR output signals is associated with a different one of the alternate waveguide indices channel index i=1 through N. For instance, the path of the LIDAR output signal that carries the channel with alternate waveguide index 2 is labeled $C_2$ in FIG. 1A. For the purposes of illustration, the LIDAR system is shown as generating three LIDAR output signals (N=3) labeled $C_1$ through $C_3$. Each of the different LIDAR output signals can carry a different channel, however, each of the different channels can carry the same selections of wavelength(s) or substantially the same selections of wavelength(s).

The LIDAR system includes one or more optical components 20 that receive the LIDAR output signal output from the LIDAR chip. The one or more optical components 20 output a system output signal that includes, consists of, or consists essentially of light from the LIDAR output signal. When the LIDAR system does not include the one or more optical components, the LIDAR output signal can serve as the system output signal. Example optical components that can be included in the one or more optical components 20 include, but are not limited to components selected from the group consisting of beam-shaping components such as lenses, beam directors such as mirrors, beam steering devices such as steerable mirrors, and combinations thereof.

The system output signal travels away from the LIDAR system and may be reflected by objects 22 in the path of the system output signal. The reflected signal travels away from the objects. When the LIDAR output signal is reflected, at least a portion of the light from the reflected light can return to the LIDAR system as a system return signal. The system return signal can travel from the object to the one or more optical components along the same or substantially the same pathway traveled by the system output signal. Accordingly, the one or more optical components 20 receive the system return signal.

The one or more optical components 20 can output a LIDAR input signal that includes, consists of, or consists essentially of light from the system return signal. The LIDAR input signal can travel from the one or more optical components 20 to the port 18 along the same or substantially the same pathway traveled by the LIDAR output signal. Accordingly, the port 18 receives the LIDAR input signal.

The LIDAR input signal can enter the utility waveguide 12 through the port 18. The portion of the LIDAR input signal that enters the port 18 can serve as an incoming LIDAR signal. The port directs the incoming LIDAR signal to one of the alternate waveguides. For instance, the port 18 directs the incoming LIDAR signal carrying channel $C_i$ to the alternate waveguide 16 associated with alternate waveguide index i. As a result, incoming LIDAR signals carrying different channels are directed to different alternate waveguides. The alternate waveguide that receives the incoming LIDAR signal carries the incoming LIDAR signal to the signal directing component 14. The signal directing component 14 outputs the incoming LIDAR signal on the utility waveguide 12.

The utility waveguide 12 carries the incoming LIDAR signal to a splitter 24 that moves a portion of the incoming LIDAR signal from the utility waveguide 12 onto a comparative waveguide 26 as a comparative signal. The comparative waveguide 26 carries the comparative signal to a processing component 28 for further processing. Suitable splitters 24 include, but are not limited to, optical couplers, y-junctions, and MMIs.

The utility waveguide 12 also carries the outgoing LIDAR signal to the splitter 24. The splitter 24 moves a portion of the outgoing LIDAR signal from the utility waveguide 12 onto a reference waveguide 32 as a reference signal. The reference waveguide 32 carries the reference signal to the processing component 28 for further processing.

As will be described in more detail below, the processing component 28 combines the comparative signal with the reference signal to form a composite signal that carries LIDAR data for a sample region on the field of view. Accordingly, the composite signal can be processed so as to extract LIDAR data (radial velocity and/or distance between a LIDAR system and an object external to the LIDAR system) for the sample region.

The LIDAR chip can include a control branch for controlling operation of the light source 10. The control branch includes a directional coupler 66 that moves a portion of the outgoing LIDAR signal from the utility waveguide 12 onto a control waveguide 68. The coupled portion of the outgoing LIDAR signal serves as a tapped signal. Although FIG. 1A illustrates a directional coupler 66 moving the portion of the outgoing LIDAR signal onto the control waveguide 68, other signal-tapping components can be used to move a portion of the outgoing LIDAR signal from the utility waveguide 12 onto the control waveguide 68. Examples of suitable signal tapping components include, but are not limited to, y-junctions, and MMIs.

The control waveguide 68 carries the tapped signal to control components 70. The control components can be in electrical communication with electronics 62. During operation, the electronics 62 can adjust the frequency of the outgoing LIDAR signal in response to output from the control components. An example of a suitable construction of control components is provided in U.S. patent application Ser. No. 15/977,957, filed on 11 May 2018, entitled "Optical Sensor Chip," and incorporated herein in its entirety.

Figure 1B:
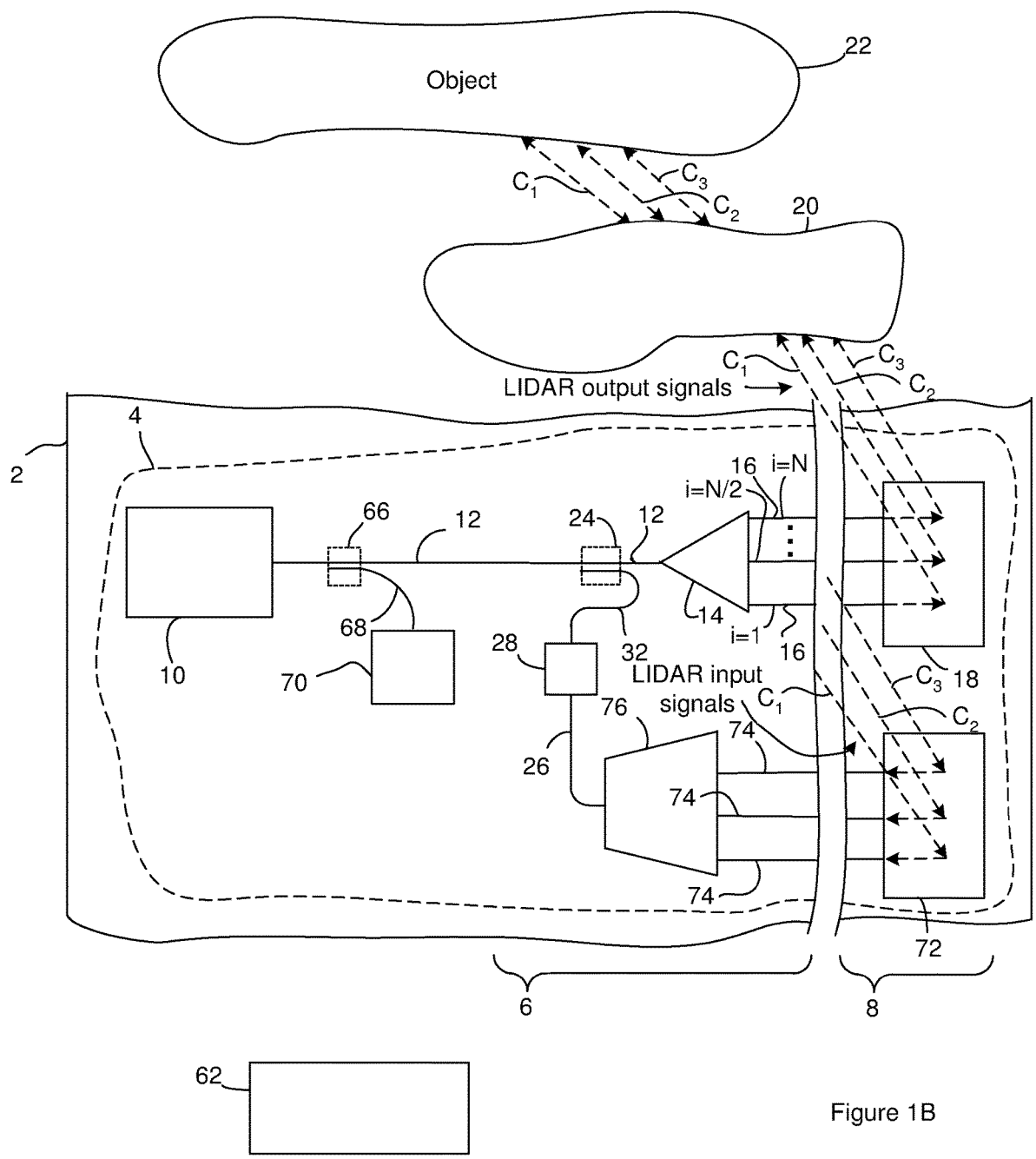
FIG. 1B illustrates another embodiment of an imaging system that includes a photonic circuit chip.

On the LIDAR chip of FIG. 1A, the LIDAR input signals are received at the same port 18 that outputs the LIDAR output signal. However, the LIDAR chip of FIG. 1A can be modified so the LIDAR input signals are received at a different port from the port that output the LIDAR output signals. As an example, FIG. 1B illustrates a LIDAR system having a LIDAR chip where LIDAR input signals are received at a different port from the port that output the LIDAR output signals. The LIDAR chip includes an input port 72 that receives the LIDAR input signals from the one or more optical components 20. The LIDAR input signals each carries one of the channels ($C_i$) depending on which alternate waveguide 16 received the light carried in the LIDAR input signal. The input port 72 directs each of the LIDAR input signals to one of several input waveguides 74. The input port directs the LIDAR input signals carrying different channels to different input waveguides 74. For instance, the LIDAR input signal that carries channel $C_1$ is labeled $FLIS_{C_1}$ and is directed to one of the input waveguides 74 and the LIDAR input signal that carries the channel $C_3$ is labeled $FLIS_{C_3}$ and is directed to a different one of the input waveguides 74.

Each of the LIDAR input signals enters one of the input waveguides 74 and serves as a first comparative signal. Each of the input waveguides 74 carries the comparative signal received by that input waveguide 74 to a second signal directing component 76. The second signal directing component 76 can be a signal combiner that directs the comparative signals carried on different input waveguides 74 to a comparative waveguide 26. The comparative waveguide 26 carries the received comparative signal to the processing component 28 for further processing. Suitable second signal directing components 76 include, but are not limited to, wavelength independent signal combiners such as an optical couplers, y-junctions, MMIs, cascaded evanescent optical couplers, and cascaded y-junctions.

Figure 1C:
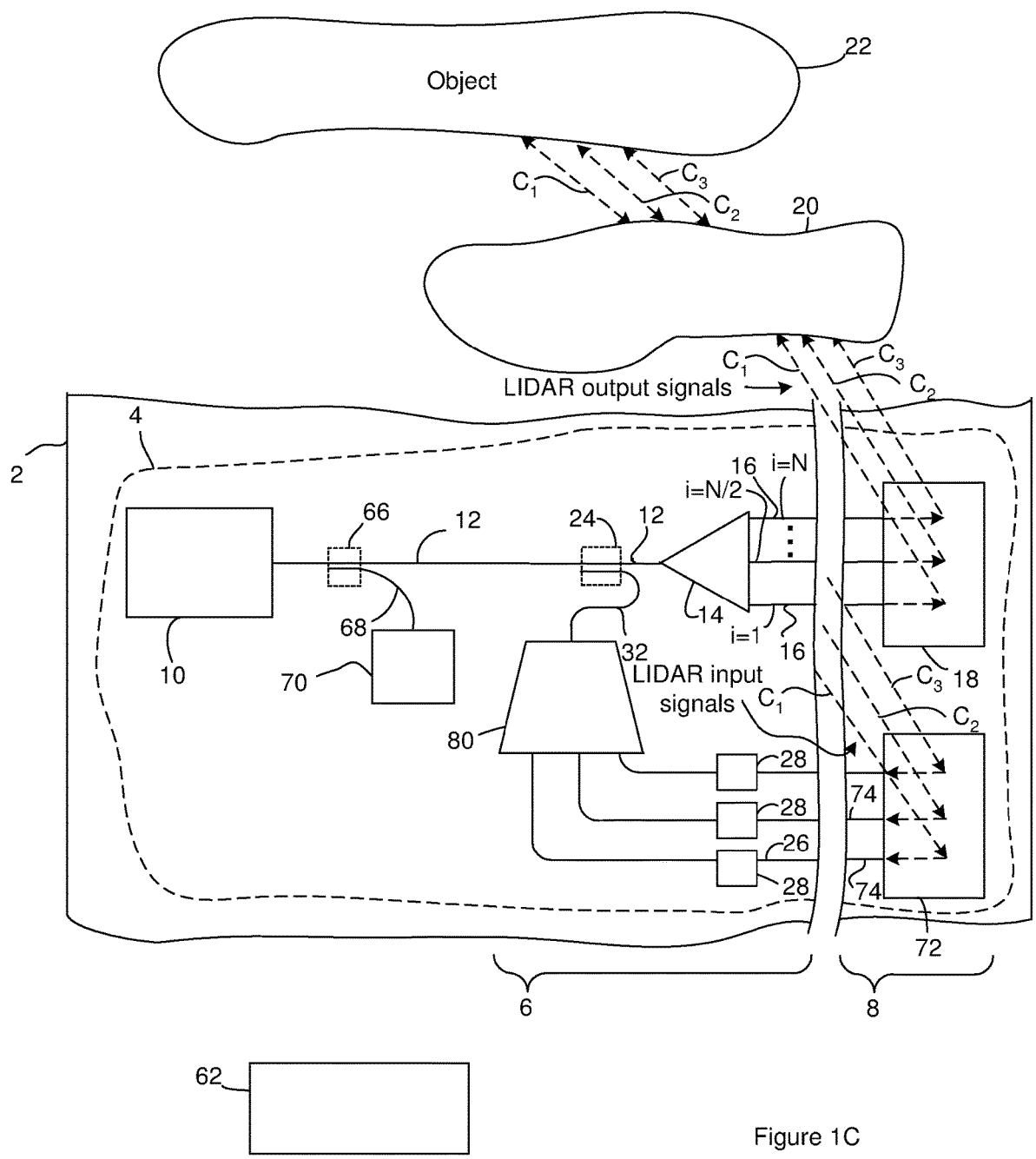
FIG. 1C illustrates another embodiment of an imaging system that includes a photonic circuit chip.

The LIDAR chip in the LIDAR system of FIG. 1B can be modified such that comparative signals carrying different channels are received at different processing components 28. FIG. 1C illustrates a LIDAR system having a LIDAR chip where comparative signals carrying different channels are received at different processing components 28. The input waveguides 74 each carries one of the comparative signals to a different one of the processing components 28. Additionally, the splitter 24 moves a portion of the outgoing LIDAR signal onto an intermediate waveguide 78 as a preliminary reference signal. The intermediate waveguide 44 carries the preliminary reference signal to a reference splitter 80. The reference splitter 80 is configured to divide the preliminary reference signal into reference signals that are each received at a different one of multiple reference waveguides 32. The reference splitter 80 can be a wavelength independent splitter such as an optical coupler, Y-junction, MMI, cascaded evanescent optical couplers, or cascaded y-junctions. As a result, the reference signals can each have the same, or about the same, distribution of wavelengths. For instance, the reference splitter 80 can be configured such that each of the first reference signals carries the same or substantially the same selection of wavelengths. Each of the reference waveguides 32 guides one of the reference signals to one of the processing components 28. The reference waveguide 32 and the input waveguides 74 are arranged such that each processing component 28 receives a reference signal and a comparative signal.

Figure 2A:
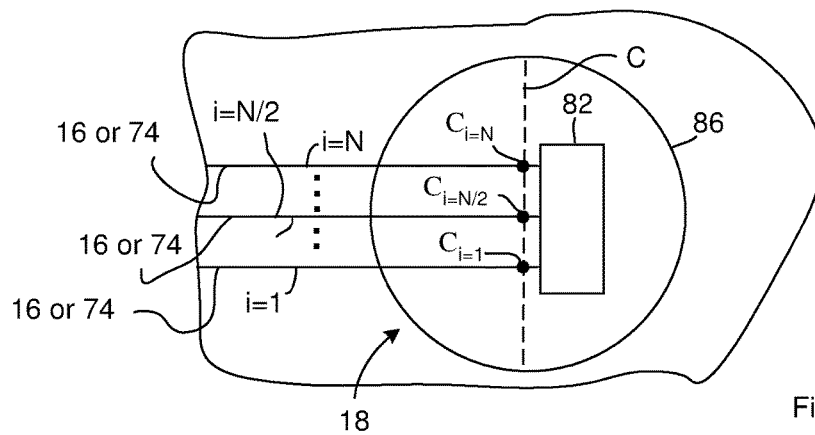
FIG. 2A through FIG. 2D illustrates an example of a suitable port for use with the photonic circuit chip of FIG. 1A through FIG. 1C.
Figure 2B:
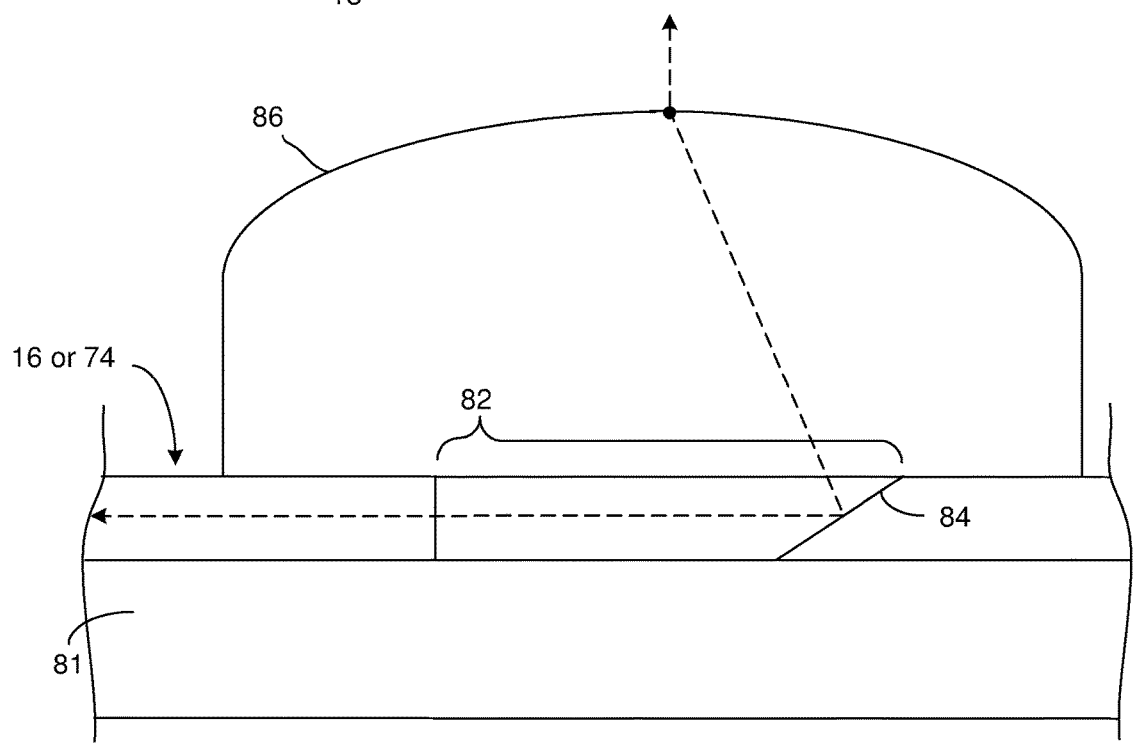
Figure 2C:
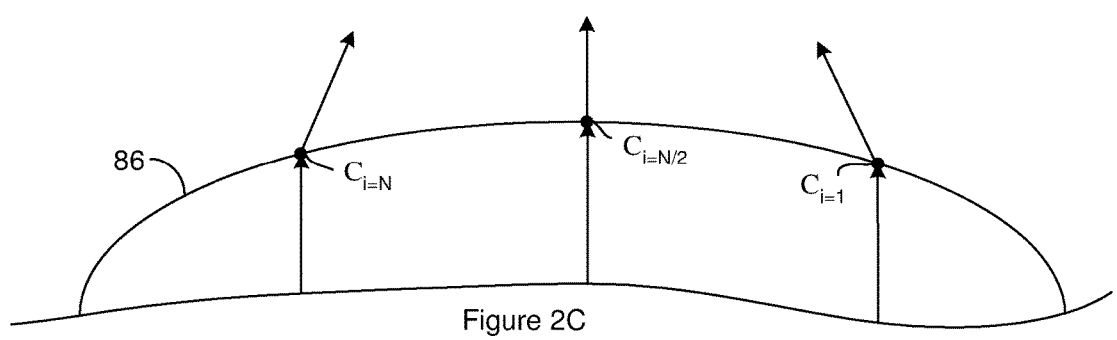

FIG. 2A through FIG. 2D illustrates an example of a suitable port 18 for use with the LIDAR chip of FIG. 1A through FIG. 1C. As will be described below, the port construction of FIG. 2A through FIG. 2C is also suitable for use as the input port 72 of FIG. 1B and FIG. 1C. FIG. 2A is schematic of a topview of the port 18. The port 18 includes a redirection component 82 that receives an outgoing LIDAR signal from any one of the alternate waveguides 16. The redirection component 82 redirects the received outgoing LIDAR signal such that the direction that the outgoing LIDAR signal travels away from the redirection component 82 changes in response to changes in the alternate waveguide 16 from which the redirection component 82 receives the outgoing LIDAR signal. The portion of the outgoing LIDAR signal traveling away from the redirection component 82 serves as an output signal.

FIG. 2B provides an example construction of a port constructed according to FIG. 2A. FIG. 2B is a cross section of FIG. 2A taken along the longitudinal axis of one of the alternate waveguides 16. The portion of the LIDAR chip shown in FIG. 2B shows the alternate waveguides 16 positioned on a base 81. The illustrated alternate waveguides 16 terminates at a redirection component 82 that includes a reflecting surface 84. The outgoing LIDAR signal exits from the alternate waveguides 16 and is received at the reflecting surface 84. The reflected portion of the outgoing LIDAR signal serves as the output signal.

The redirection component 82 can be configured such that the direction that the output signal travels away from the redirection component 82 causes the output signal to travel toward a beam-directing component 86. The beam-directing component 86 receives the output signal and outputs at least a portion of the light from the output signal as the LIDAR output signal. The beam-directing component 86 is configured such that the direction that the LIDAR output signal travels away from the beam-directing component 86 is different from the direction of the output signal.

Suitable beam-directing components 84 include, but are not directed to, lenses, mirrors and diffractive optical elements. The beam-directing component 86 illustrated in FIG. 2B is a lens. In some instances when the beam-directing component 86 is a lens, the lens can be configured to collimate the LIDAR output signal. When the beam-directing component 86 is a lens, suitable materials for the beam-directing component 86 include, but are not limited to, glass, plastic, and silicon. The beam-directing component 86 can be immobilized on the LIDAR chip using mechanisms including, but not limited to, epoxy bonding, and mechanical clamping.

The beam-directing component 86 is configured such that the direction that the LIDAR output signal travels away from the beam-directing component 86 is a function of the alternate waveguide 16 that receives the outgoing LIDAR signal. For instance, the direction that the LIDAR output signal travels away from the beam-directing component 86 changes in response to changes in the alternate waveguide 16 that receives the outgoing LIDAR signal that carries the light that is included in the LIDAR output signal.

To illustrate that the direction that the LIDAR output signal travels away from the beam-directing component 86 is a function of the alternate waveguide 16, the location where the LIDAR output signals exits from the beam-directing component 86 is labeled $C_{i=1}$ through $C_{i=N}$ in FIG. 2A. These labels indicate which of the alternate waveguide 16 received the LIDAR output signal in order to cause the LIDAR output signal to exit the beam-directing component 86 at the illustrated location. As an example, when the alternate waveguide 16 with the alternate waveguide index i=N receives the outgoing LIDAR signal, the LIDAR output signal exits the beam-directing component 86 at the location labeled $C_{i=N}$.

FIG. 2C is a cross section of the beam-directing component 86 taken along the line labeled C in FIG. 2A. As is evident from the labels $C_{i=1}$ through $C_{i=N}$, the path of the output signal through the beam-directing component 86 changes in response to changes in the alternate waveguide 16 that receives the outgoing LIDAR signal. As a result of the different paths that the output signal can travel through the beam-directing component 86, the LIDAR output signals travel away from the beam-directing component 86. In some instances, the directions that the different LIDAR output signals travel away from the beam-directing component 86 can be non-parallel as shown in FIG. 2C.

Since the direction that the LIDAR output signals travel away from the beam-directing component 86 changes in response to the alternate waveguide 16 that receives the outgoing LIDAR signal, the electronics can steer the direction of the LIDAR output signal by operating the signal directing component 14 so as to change the alternate waveguide 16 that receives the outgoing LIDAR signal. In instance where the LIDAR output signal serves as the system output signal, the electronics can steer the direction of the system output signal by operating the signal directing component 14 so as to change the alternate waveguide 16 that receives the outgoing LIDAR signal. As will be evident below, the one or more optical components 20 can be configured such that changing the direction that the LIDAR output signals travel away from the beam-directing component 86 changes the direction that the system output signal travels away from the LIDAR system. As a result, when the LIDAR system includes the one or more optical components 20, the electronics can steer the direction of the system output signal by operating the signal directing component 14 so as to change the alternate waveguide 16 that receives the outgoing LIDAR signal. Accordingly, the electronics can operate the signal directing component 14 as a signal-steering mechanism.

Figure 2D:
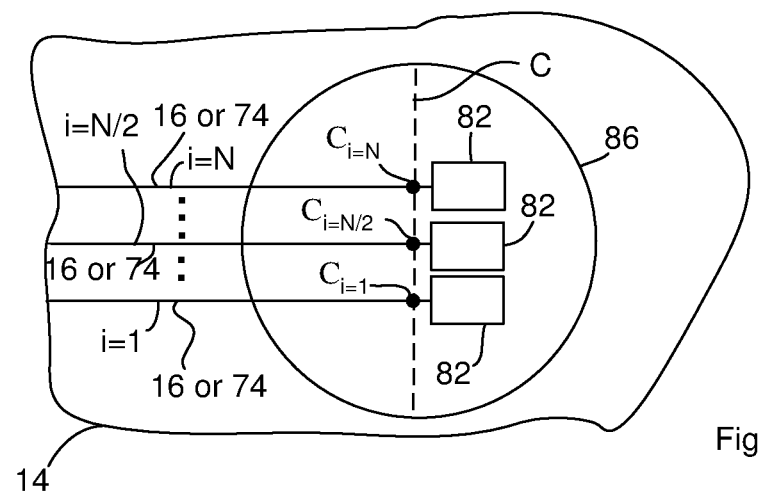

Although FIG. 2A through FIG. 2C illustrate a redirection component 82 that receives the LIDAR output signal output from different alternate waveguides 16, the port can include multiple redirection components 82 that each receives a LIDAR output signals output from a different alternate waveguide 16. As an example, FIG. 2D illustrates the port 18 of FIG. 2A modified to have multiple redirection components 82. Each of the redirection components 82 receives a LIDAR output signal output from a different one of the alternate waveguides 16.

The port 18 illustrated in FIG. 2A through FIG. 2D can be operated in reverse as disclosed in the context of FIG. 1A. For instance, the beam-directing component 86 receives the LIDAR input signal and outputs an input signal that includes, consists of, or consists essentially of light from the LIDAR input signal. The input signal is received by the redirection component 82. The redirection component 82 outputs the incoming LIDAR signal on one of the alternate waveguides 26. The incoming LIDAR signal includes, consists of, or consists essentially of light from the input signal. The alternate waveguides 16 carry the incoming LIDAR signal to the signal directing component disclosed in the context of FIG. 1A. The signal directing component 14 serves a signal combiner that directs the incoming LIDAR signal to the utility waveguide 12. Light from the LIDAR input signal carrying channel i travels substantially the same path through the port 18 as the output signal carrying channel i but in the reverse direction. As a result, the port 18 directs input signals carrying different channels to different alternate waveguides 16.

The port 18 illustrated in FIG. 2A through FIG. 2D can serve as an input port 72 disclosed in the context of FIG. 1B and FIG. 1C. For instance, the beam-directing component 86 receive a LIDAR input signal and outputs an input signal that includes, consists of, or consists essentially of light from the LIDAR input signal. The input signal is received by the redirection component 82. The redirection component 82 outputs the incoming LIDAR signal on one of the input waveguides 74. The incoming LIDAR signal includes, consists of, or consists essentially of light from the input signal. Light from the LIDAR input signal carrying channel i travels substantially the same path through the port 18 as the output signal carrying channel i but in the reverse direction. As a result, the port 18 directs input signals carrying different channels to different input waveguides 74.

Figure 3:
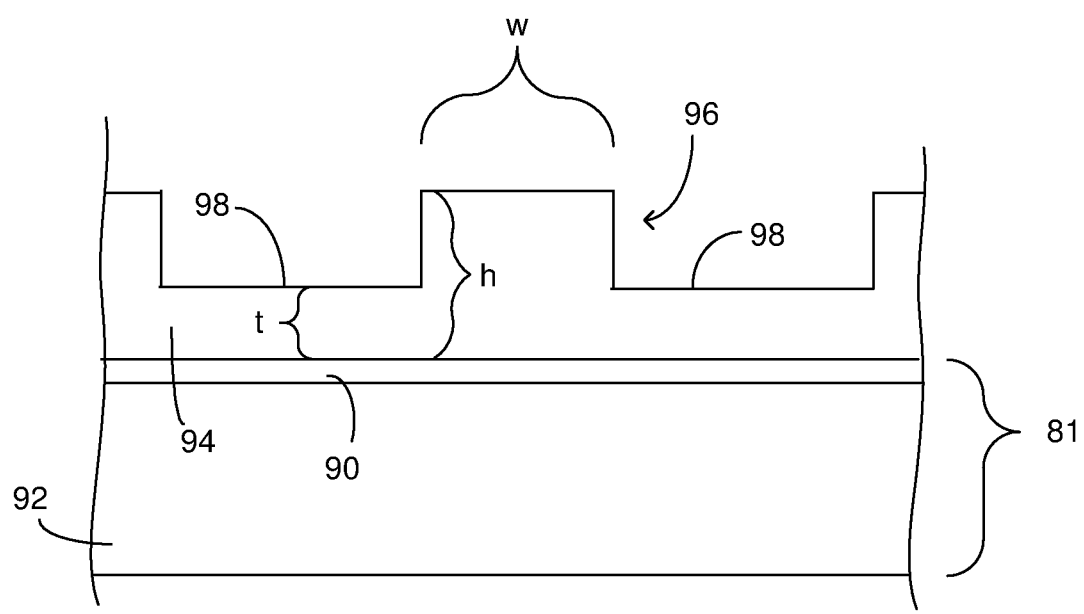
FIG. 3 is a cross section of a silicon-on-insulator wafer.

Suitable platforms for the LIDAR chip include, but are not limited to, silica, indium phosphide, and silicon-on-insulator wafers. FIG. 3 is a cross section of a silicon-on-insulator wafer. A silicon-on-insulator (SOI) wafer includes a buried layer 90 between a substrate 92 and a light-transmitting medium 94. In a silicon-on-insulator wafer, the buried layer 90 is silica while the substrate and the light-transmitting medium 94 are silicon. The substrate of an optical platform such as an SOI wafer can serve as the base for a LIDAR chip. For instance, in some instances, the optical components shown in FIG. 1A through FIG. 1C can be positioned on or over the top and/or lateral sides of the same substrate. As a result, the substrate of an optical platform such as an SOI wafer can serve as the base 81 shown in FIG. 2B.

The portion of the LIDAR chip illustrated in FIG. 3 includes a waveguide construction that is suitable for use with chips constructed from silicon-on-insulator wafers. A ridge 96 of the light-transmitting medium 94 extends away from slab regions 98 of the light-transmitting medium 94. The light signals are constrained between the top of the ridge and the buried layer 90. As a result, the ridge 96 at least partially defines the waveguide.

The dimensions of the ridge waveguide are labeled in FIG. 3. For instance, the ridge has a width labeled w and a height labeled h. A thickness of the slab regions is labeled t. For LIDAR applications, these dimensions can be more important than other applications because of the need to use higher levels of optical power than are used in other applications. The ridge width (labeled w) is greater than 1 μm and less than 4 μm, the ridge height (labeled h) is greater than 1 μm and less than 4 μm, the slab region thickness is greater than 0.5 μm and less than 3 μm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 μm and less than 0.5 μm. While the above dimensions will generally provide the straight or substantially straight portions of a waveguide with a single-mode construction, they can result in the tapered section(s) and/or curved section(s) that are multi-mode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction of FIG. 3 is suitable for all or a portion of the waveguides on a LIDAR chip constructed according to FIG. 1A through FIG. 2D.

Figure 4A:
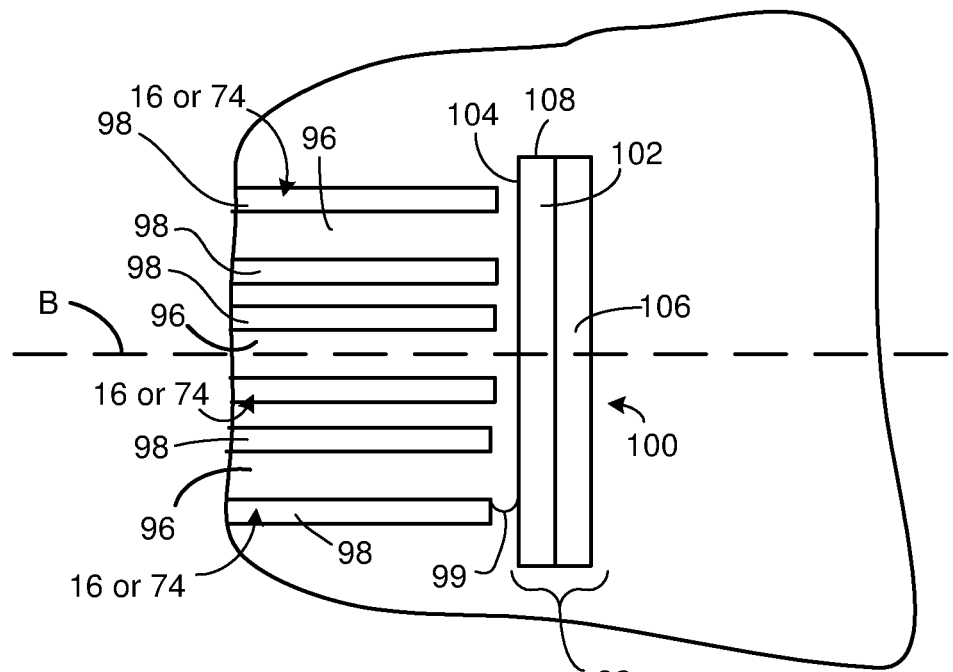
FIG. 4A through FIG. 4B illustrates a suitable construction for a redirection component on a silicon-on-insulator platform.
Figure 4B:
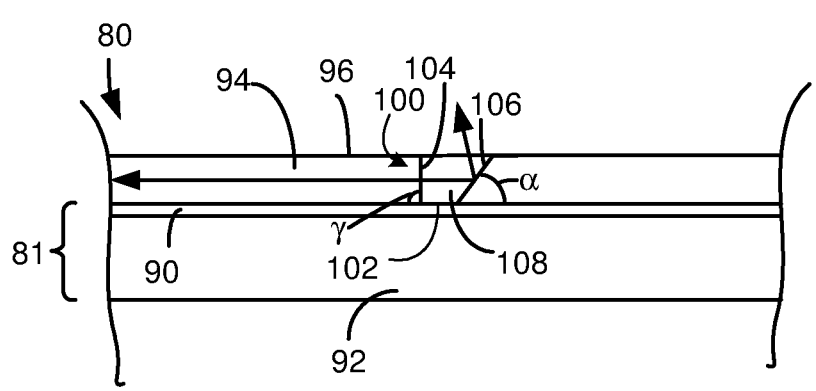

FIG. 4A through FIG. 4B illustrates a suitable construction for a redirection component 82 on a silicon-on-insulator platform. FIG. 4A is topview of the redirection component 82 and FIG. 4B is a cross-section of the redirection component 82 of FIG. 4A taken along the line labeled B. The redirection component 82 includes a port recess 100 that extends into the first light-transmitting medium 94. The port recess 100 includes one or more sides. The illustrated embodiment includes a bottom side 102 and a plurality of lateral sides including a waveguide side 104 and a reflecting side 106 that serves as the reflecting surface 84.

A second light-transmitting medium 108 is positioned in the port recess 100. The second light-transmitting medium 108 can be a liquid or a gas and is preferably a solid. The second light-transmitting medium 108 can have a different index of refraction than the light-transmitting medium 108. Suitable second light transmitting media 108 include, but are not limited to, air, epoxy, polymers, spin-on glasses and evaporated or sputtered films. An example of a suitable polymer is Polyimide PI2611 that is not a substantial source of stress for an optical device constructed on a silicon-on-insulator wafer.

As evident in FIG. 4B, the waveguide side 104 can be positioned at an angle γ measured relative to the base 81 and the reflecting side 106 can be positioned at an angle α measured relative to the base 81. The angle γ can be the same or different from the angle α. A suitable range of angles for γ and/or α includes, but is not limited to, angles in the range from 0° to 90°, and 45° to 90° and angles less than 89°, 87° or 85°. When the light-transmitting medium 94 is silicon and the port recess 100 is formed by etching, a suitable angle for γ and/or α is about 54.7° since the crystalline structure of the silicon layer causes sides of the port recess 100 to be naturally etched at an angle of about 54.7°. In one example, the angle γ is about 90° and α is about 54.7°.

During operation of the LIDAR chip, an outgoing LIDAR signal guided by the alternate waveguides 16 travels to an end of the alternate waveguides 16 and is traveling in the direction of propagation immediately before exiting the alternate waveguides 16. The outgoing LIDAR signal exits from the alternate waveguides 16 and is received by the second light-transmitting medium 108. The outgoing LIDAR signal travels through the second light-transmitting medium 108 traveling in a first direction. The first direction can be the same or different from the direction of propagation. For instance, if the direction of propagation is not normal to the waveguide side 104 and the second light-transmitting medium 108 has an index of refraction that is different from the first light-transmitting medium second light-transmitting medium 108, there may be some refraction that changes the direction of the outgoing LIDAR signal upon the outgoing LIDAR signal entering the second light-transmitting medium. The outgoing LIDAR signal travels through the second light-transmitting medium 108 to the reflecting side 106. The reflecting side 106 reflects the outgoing LIDAR signal. The outgoing LIDAR signal then travels through the second light-transmitting medium 108 and exits the second light-transmitting medium 108. Before exiting from the second light-transmitting medium 108, the outgoing LIDAR signal is traveling in a second direction. The second direction is toward a location that is over a non-lateral side of the LIDAR chip such as the top side of the device or the bottom side of the LIDAR chip. For instance, the second direction can be toward a beam-directing component 86 as shown in FIG. 2B. FIG. 4B illustrates the second direction as being toward a location that is above the LIDAR chip. The portion of the outgoing LIDAR signal that exits from the second light-transmitting medium 108 can serve as the output signal.

In some instance, the outgoing LIDAR signal and/or the incoming LIDAR travel through a partial free space region 99 between all or a portion of the alternate waveguides 16 and a redirection component 82. The partial free space region 100 can be free space in the horizontal direction but guided in the vertical direction. A portion of the free space region 99 can terminate at the waveguide side 104 as is evident from FIG. 4A. Accordingly, the waveguide side 104 can serve as a facet of an alternate waveguide.

The redirecting component 82 of FIG. 4A and FIG. 4B can operate in reverse when the redirecting component receives an input signal. For instance, the redirecting component 82 can operate in reverse as disclosed in the context of FIG. 1A and/or is included in an input port 72 as disclosed in the context of FIG. 1A and FIG. 1B.

Figure 4C:
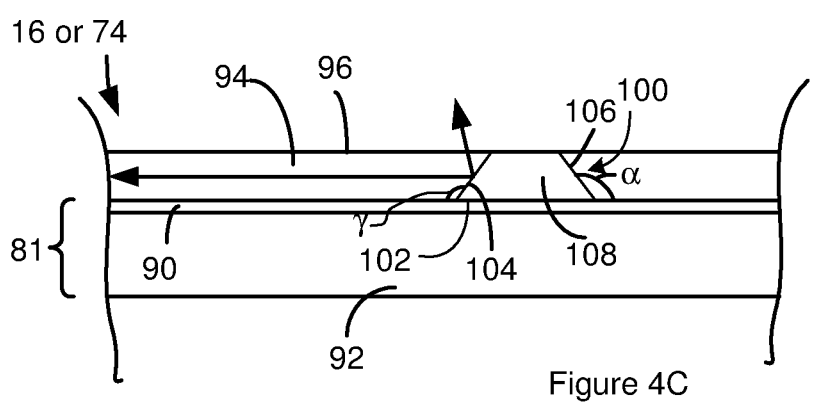
FIG. 4C is a cross-section of another embodiment of a redirection component.
Figure 4D:
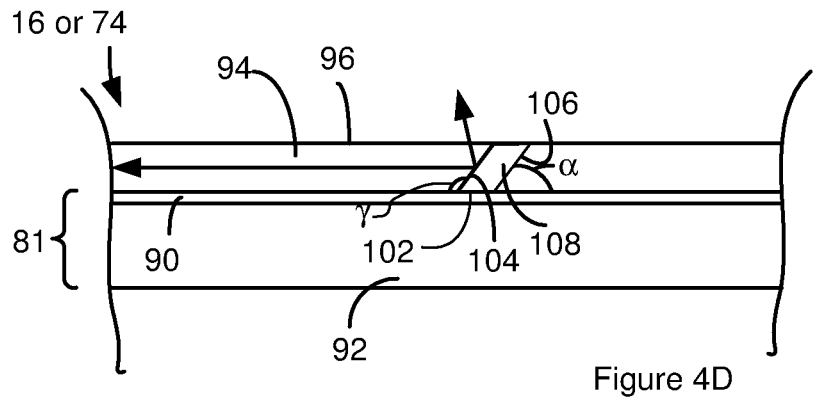
FIG. 4D is a cross-section of another embodiment of a redirection component.
Figure 4E:
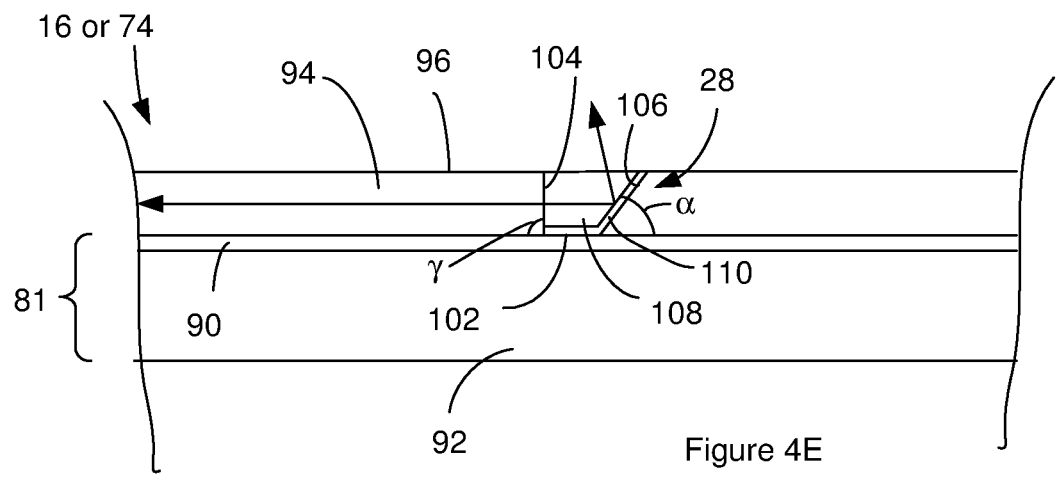
FIG. 4E is a cross-section of another embodiment of a redirection component.
Figure 4F:
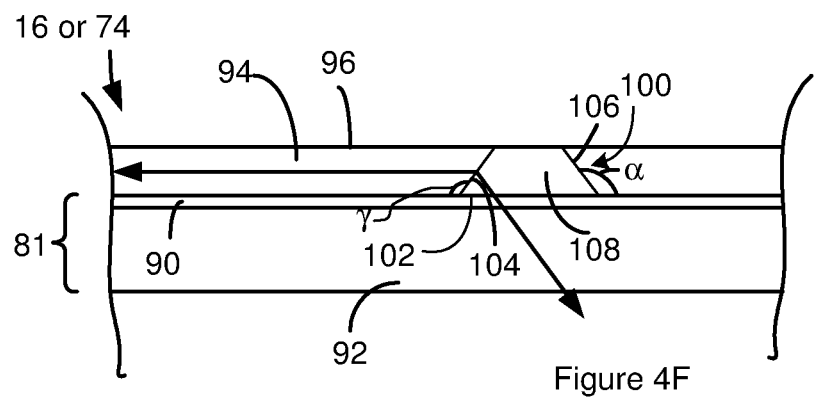
FIG. 4F is a cross-section of another embodiment of a redirection component.

The port recess 100 can have other constructions. For instance, the port recess 100 can be constructed such that reflection occurs at the waveguide side 104 as shown in FIG. 4C and FIG. 4D. As a result, the waveguide side 104 can serve as the reflecting surface. The reflection can result from the presence of a reflecting material 110. For instance, FIG. 4E illustrates the redirecting component 82 of FIG. 4A constructed with a reflecting material 110 on the reflecting side 106 of the port recess 100. Although the reflecting material 110 is shown on the reflecting side 106, the reflecting material 110 can be positioned on the waveguide side 104. Suitable reflecting media include, but are not limited to, reflective metals such as Al and Au. Alternately, the reflection can be a result of Total Internal Reflection (TTR). For instance, the reflection can be a result of a change in index of refraction at the reflecting surface and/or of the angle between the light signal and the reflecting surface. Accordingly, the second light-transmitting medium 108 can be chosen to provide a particular change in index of refraction at the reflecting surface.

Although the port recesses disclosed in FIG. 1A through FIG. 4E are constructed to direct the outgoing LIDAR signal such that the outgoing LIDAR signal exits the LIDAR chip traveling in a direction that is above the LIDAR chip, the port recesses can be constructed so as to direct the outgoing LIDAR signal toward a location that is below the LIDAR chip. For instance, FIG. 4F illustrates a port recess configured direct the outgoing LIDAR signal toward a location that is below the LIDAR chip. The configuration of FIG. 4F can be achieved through the selection of the second light-transmitting medium 108 and/or the angle between the light signal and the reflecting surface.

Figure 5A:
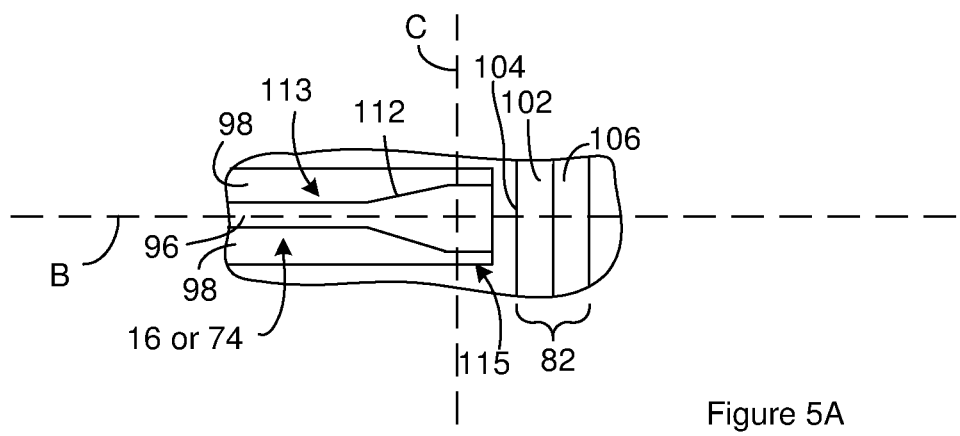
FIG. 5A through FIG. 5B illustrate a taper that is suitable for use in an alternate waveguide or an input waveguide.
Figure 5B:
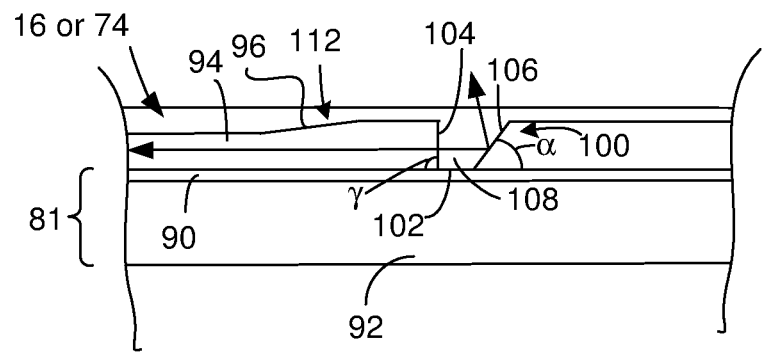
Figure 5C:
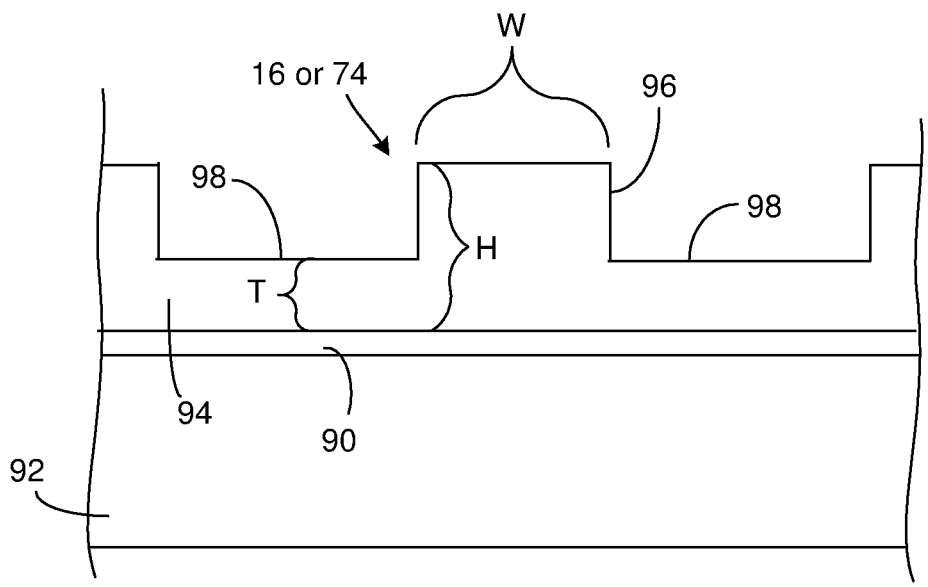
FIG. 5C is a cross section of the portion of the photonic circuit chip illustrated in FIG. 5A taken at the line labeled C.

In some instances, all or a portion of the alternate waveguides 16 and/or all or a portion of the input waveguides 74 include a taper 112 as illustrated in FIG. 5A through FIG. 5C. FIG. 5A is a topview of a portion of the LIDAR chip. FIG. 5B is a cross section of the portion of the LIDAR chip illustrated in FIG. 5A taken along the line labeled B. FIG. 5C is a cross section of the portion of the LIDAR chip illustrated in FIG. 5A taken at the line labeled C. The illustrated alternate waveguide 16 includes a first portion 113 and a second portion 115. The second portion 115 has a larger cross sectional area than the first portion 113 of the waveguide where the cross section is taken perpendicular to a direction of propagation of a light signal through the waveguide. FIG. 5B illustrates the second portion 115 of the waveguide extending beyond the taper; however, the taper can terminate at the second portion 115 of the waveguide. As a result, the taper can terminate at the waveguide side 104 and the portion of the waveguide side 104 that is included in the taper can serve as the second portion 115 of the waveguide.

The alternate waveguides 16 includes a taper that provides a transition between the first portion of the waveguide and the second portion of the waveguide. The taper is a horizontal taper as evident in FIG. 5A and a vertical taper as evident in FIG. 5B, however, an alternate waveguides 16 can include only a horizontal taper or only a vertical taper. The spread of the outgoing LIDAR signal and accordingly the output signal can decrease as the cross sectional dimensions of the alternate waveguides 16 increase. As a result, the taper 112 can reduce the spread of the outgoing LIDAR signal and/or the output signal.

The second light-transmitting medium 108 can optionally be positioned in the port recess 28 and can also optionally be positioned on top of the taper 112 as is evident from FIG. 5A and FIG. 5B. For the purpose of illustration, the second light-transmitting medium 108 is treated as transparent in FIG. 5A to permit viewing of the underlying horizontal taper. As evident in FIG. 5B, the positioning of the second light-transmitting medium 108 over the taper 112 can provide a continuous flat surface over the taper 112.

The taper 112 can be an adiabatic taper. In some instances, the taper increases from a single mode dimensions to multi-mode dimensions. The dimensions of the first portion 115 of the waveguide can be as disclosed in the context of FIG. 3. The dimensions of the second portion 115 of the waveguide are labeled in FIG. 5C. For instance, the ridge of the second portion 115 of the waveguide has a width labeled W and a height labeled H. In some instances, the taper is constructed so as provide the alternate waveguide 16 with one or more conditions selected from the group consisting of a width (w) that increases from greater than 1 μm and less than 4 μm to a width (W) greater than 5 μm and less than 15 μm and a height (h) that increases from greater than 1 μm and less than 4 μm to a height (H) greater than 5 μm and less than 15 μm.

Figure 6A:
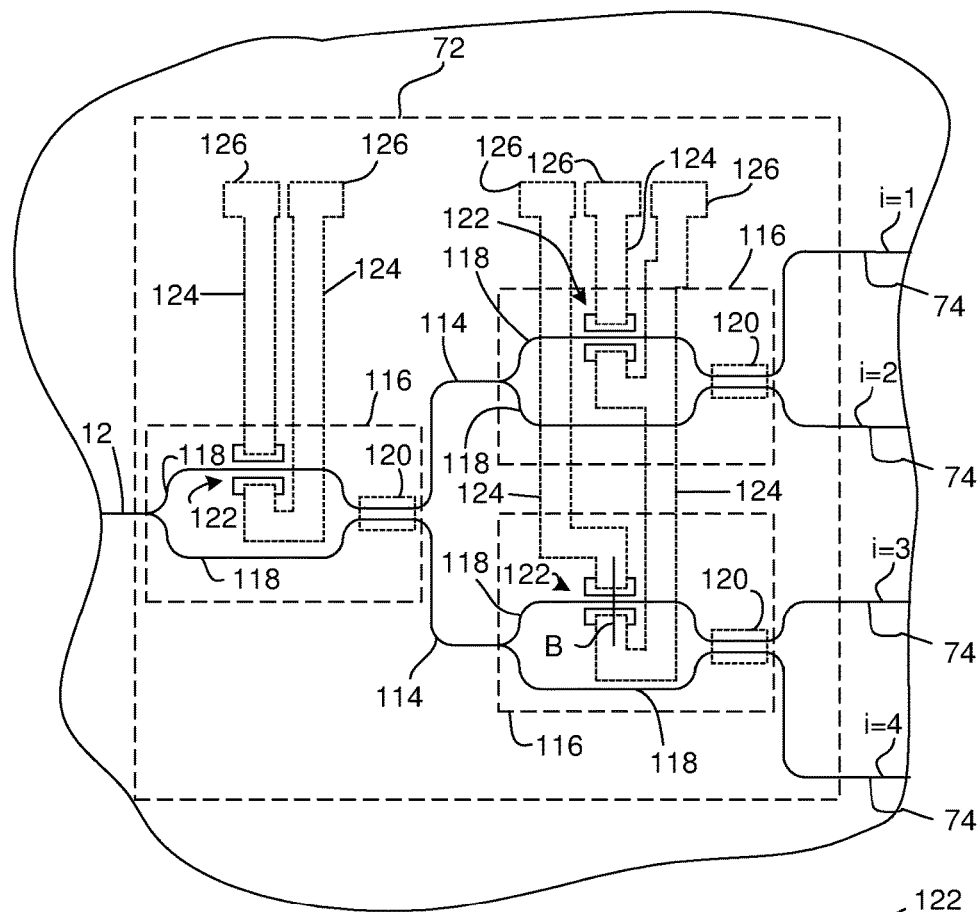
FIG. 6A and FIG. 6B illustrate an example of an optical switch that includes cascaded Mach-Zehnder interferometers.
Figure 6B:
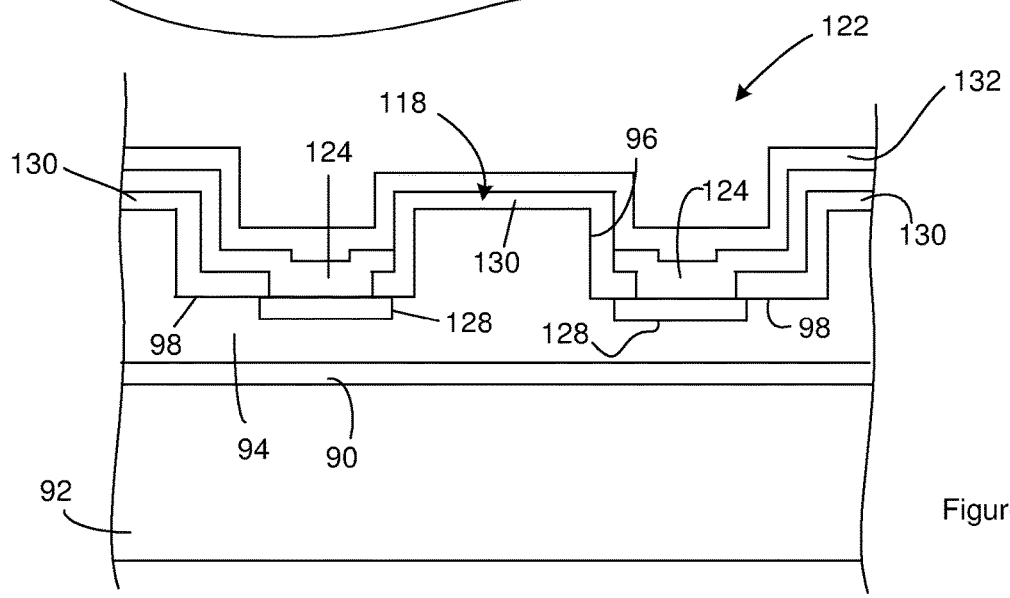

Suitable signal directing components 14 for use with the LIDAR chip include, but are not limited to, optical switches such as cascaded Mach-Zehnder interferometers and microring resonator switches. In one example, the signal directing component 14 includes cascaded Mach-Zehnder interferometers that use thermal or free-carrier injection phase shifters. FIG. 6A and FIG. 6B illustrate an example of an optical switch that includes cascaded Mach-Zehnder interferometers 116. FIG. 6A is a topview of the optical switch. FIG. 6B is a cross section of the optical switch shown in FIG. 6A taken along the line labeled B in FIG. 6A.

The optical switch receives the outgoing LIDAR signal from the utility waveguide 12. The optical switch is configured to direct the outgoing LIDAR signal to one of several alternate waveguides 16. The optical switch includes interconnect waveguides 114 that connect multiple Mach-Zehnder interferometers 116 in a cascading arrangement. Each of the Mach-Zehnder interferometers 116 directs the outgoing LIDAR signal to one of two interconnect waveguides 114. The electronics can operate each Mach-Zehnder so as to select which of the two interconnect waveguides 114 receives the outgoing LIDAR signal from the Mach-Zehnder interferometer 116. The interconnect waveguides 114 that receive the outgoing LIDAR signal can be selected such that the outgoing LIDAR signal is guided through the optical switch to a particular one of the alternate waveguides 16.

Each of the Mach-Zehnder interferometers 116 includes two branch waveguides 118 that each receives a portion of the outgoing LIDAR signal from the utility waveguide 12 or from an interconnect waveguide 114. Each of the Mach-Zehnder interferometers 116 includes a direction component 120 that receives two portions of the outgoing LIDAR signal from the branch waveguides 118. The direction component 120 steers the outgoing LIDAR signal to one of the two interconnect waveguides 114 configured to receive the outgoing LIDAR signal from the direction component 120. The interconnect waveguide 114 to which the outgoing LIDAR signal is directed is a function of the phase differential between the two different portions of the outgoing LIDAR signal received by the direction component 120. Although FIG. 6A illustrates a directional coupler operating as the direction component 120, other direction components 120 can be used. Suitable alternate direction components 120 include, but are not limited to, Multi-Mode Interference (MMI) devices and tapered couplers.

Each of the Mach-Zehnder interferometers 116 includes a phase shifter 122 positioned along one of the branch waveguides 118. The output component includes conductors 124 in electrical communication with the phase shifters 122. The conductors 124 are illustrated as dashed lines so they can be easily distinguished from underlying features. The conductors 124 each terminate at a contact pad 126. The contact pads 126 can be used to provide electrical communication between the conductors 124 and the electronics. Accordingly, the conductors 124 provide electrical communication between the electronics and the phase shifters 122 and allow the electronics to operate the phase shifters 122. Suitable conductors 124 include, but are not limited to, metal traces. Suitable materials for the conductors include, but are not limited to, titanium, aluminum and gold.

The electronics can operate each of the phase shifters 122 so as to control the phase differential between the portions of the outgoing LIDAR signal received by a direction component 120. In one example, a phase shifter 122 can be operated so as to change the index of refraction of a portion of at least one of a branch waveguide 118. Changing the index of a portion of a branch waveguide 118 in a Mach-Zehnder interferometer 116, changes the effective length of that branch waveguides 118 and accordingly changes the phase differential between the portions of the outgoing LIDAR signal received by a direction component 120. The ability of the electronics to change the phase differential allows the electronics to select the interconnect waveguide 114 that receives the outgoing LIDAR signal from the direction component 120.

FIG. 6B illustrates one example of a suitable construction of a phase shifter 122 on a branch waveguide 118. The branch waveguide 118 is at least partially defined by a ridge 96 of the light-transmitting medium 94 that extends away from slab regions 98 of the light-transmitting medium 94. Doped regions 128 extend into the slab regions 98 with one of the doped regions including an n-type dopant and one of the doped regions 128 including a p-type dopant. A first cladding 130 is positioned between the light-transmitting medium 94 and a conductor 124. The conductors 124 each extend through an opening in the first cladding 130 into contact with one of the doped regions 128. A second cladding 132 is optionally positioned over the first cladding 130 and over the conductor 124. The electronics can apply a forward bias can be applied to the conductors 124 so as to generate an electrical current through the branch waveguide 118. The resulting injection of carriers into the branch waveguide 118 causes free carrier absorption that changes the index of refraction in the branch waveguide 118.

The first cladding 130 and/or the second cladding 132 illustrated in FIG. 6B can each represent one or more layers of materials. The materials for the first cladding 130 and/or the second cladding 132 can be selected to provide electrical isolation of the conductors 124, lower index of refraction relative to the light-transmitting medium 94, stress reduction and mechanical and environmental protection. Suitable materials for the first cladding 130 and/or the second cladding 132 include, but are not limited to, silicon nitride, tetraorthosilicate (TEOS), silicon dioxide, silicon nitride, and aluminum oxide. The one or more materials for the first cladding 130 and/or the second cladding 132 can be doped or undoped.

Figure 7:
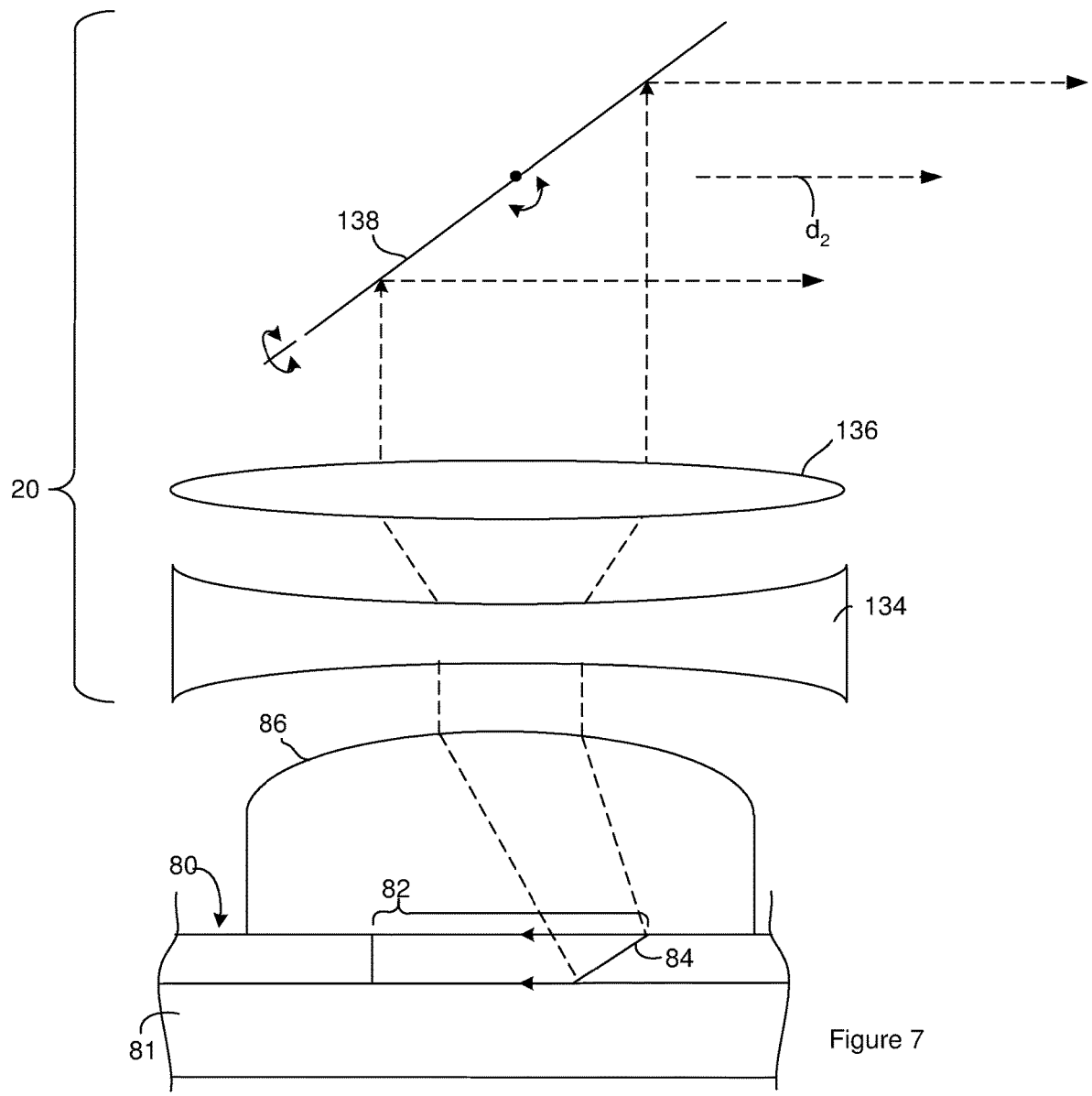
FIG. 7 illustrates the port of FIG. 2B used in combination with optical components that include a beam shaper, a collimator, and one or more beam steering components.

The one or more optical components 20 can include one or more beam-shaping components and/or one or more beam steering devices. As an example, FIG. 7 illustrates the port of FIG. 2B used in combination with optical components 20 that include a beam shaper 134 positioned to receive the LIDAR output signal. In some instances, the beam shaper 134 is configured to expand the width of the LIDAR output signal. For instance, the beam shaper 134 can output a shaped LIDAR output signal that is wider than the LIDAR output signal received by the beam shaper 134 and/or that has a width that increases as the shaped LIDAR output signal travels away from the beam shaper 134. Suitable beam shapers 134 include, but are not limited to, concave lenses, convex lenses, plano concave lenses, and plano convex lenses.

The optical components 20 include a collimator 136 that receives the shaped outgoing LIDAR output signal and outputs a collimated LIDAR output signal. Suitable collimators 136 include, but are not limited to, convex lenses and GRIN lenses.

The optical components 20 includes one or more beam steering components 138 that receive the collimated LIDAR output signal from the collimator 136 and that output the system output signal. The direction that the system output signal travels away from the LIDAR system is labeled $d_2$ in FIG. 7. The electronics can operate the one or more beam steering components 138 so as to steer the system output signal to different sample regions in a field of view. As a result, the one or more beam steering components 138 can function as a beam-steering mechanism that is operated by the electronics so as to steer the system output signals within the field of view of the LIDAR system.

Suitable beam steering components 138 include, but are not limited to, movable mirrors, MEMS mirrors, optical phased arrays (OPAs), optical gratings, and actuated optical gratings.

Although FIG. 7 illustrates the optical components 20 including a beam-steering components 138, a collimator 136, and a beam shaper, the beam steering components 138 can include or consist of none, one, two or three components selected from the group consisting of a beam-steering components, a collimator, and a beam shaper.

In some instances, the optical components 20 include an adapter in addition to none, one, or more than one other optical components. The adapter can include, consist of, or serve as a circulator configured to separate LIDAR output signals from the LIDAR input signals to allow the LIDAR input signals to be received on the input waveguides 74 and the LIDAR output signals to be output from the alternate waveguides 16.

Figure 8A:
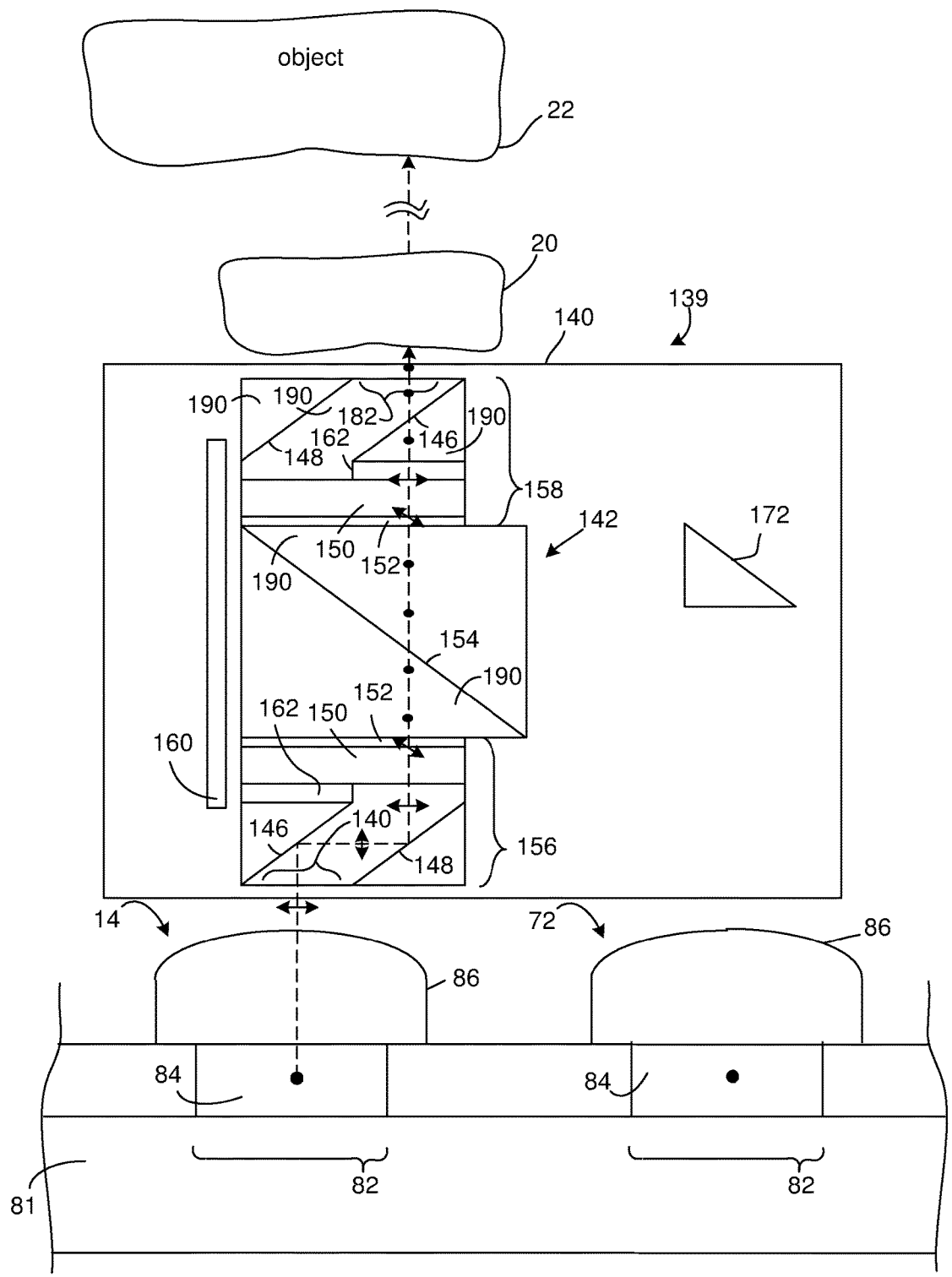
FIG. 8A through FIG. 8C illustrate an example of an adapter that is suitable for use with an imaging system constructed according to FIG. 1B or FIG. 1C.
Figure 8B:
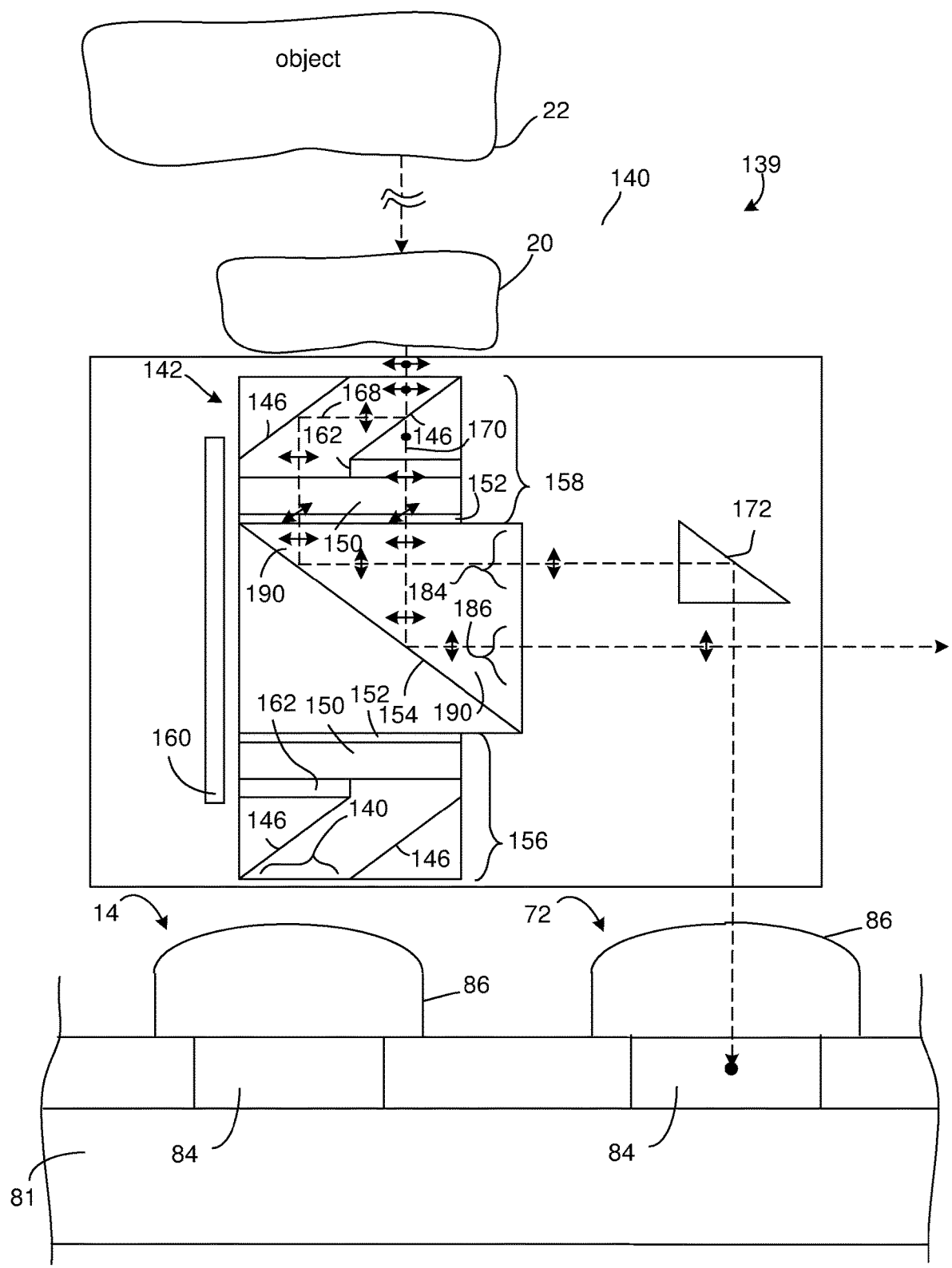
Figure 8C:
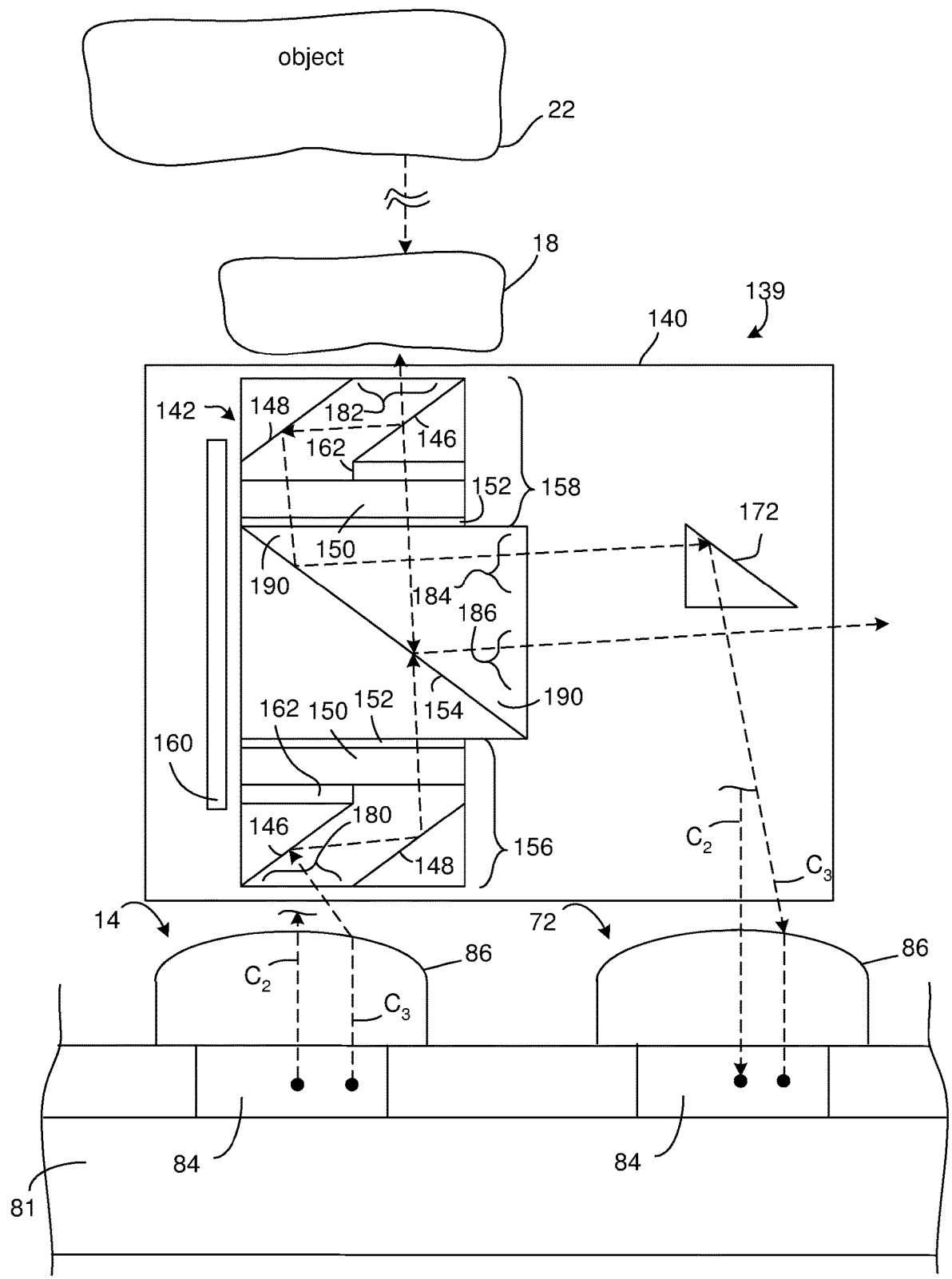

FIG. 8A through FIG. 8C illustrate an example of an adapter 139 that is suitable for use with a LIDAR system constructed according to FIG. 1B and/or FIG. 1C where the port 18 and the input port 72 are constructed according to FIG. 2A through FIG. 2C. For the purposes of illustration, the light signals that result from the outgoing LIDAR signal being directed to the alternate waveguide 16 with alternate waveguide index i are classified as light signals carrying channel i. A path of the light signals that carry the channel with alternate waveguide index 2 ($C_2$) is shown in FIG. 8A and FIG. 8B.

The adapter 139 includes multiple adapter components positioned on a base 140. The adapter components include a circulator 142. An example of a circulator 142 that is suitable for use with the core of FIG. 1B and/or FIG. 1C is illustrated in FIG. 8A and FIG. 8B. The path shown in FIG. 8A follows light from the LIDAR output signal carrying channel $C_2$ traveling from the LIDAR chip through the circulator 142 until it exits the LIDAR system as a system output signal. In contrast, FIG. 8B follows light from the system return signals carrying channel $C_2$ traveling through the circulator until it enters the LIDAR chip in a LIDAR input signal carrying channel $C_2$.

The circulator 142 include a first polarization beam splitter 146 that receives the LIDAR output signal carrying channel $C_2$. The first polarization beam splitter 146 is configured to split the LIDAR output signal into a light signal in a first polarization state and a light signal in a second polarization state signal. The first polarization state and the second polarization state can be linear polarization states and the second polarization state is different from the first polarization state. For instance, the first polarization state can be TE and the second polarization state can be TM or the first polarization state can be TM and the second polarization state can be TE.

Because the light source 10 often includes a laser as the source of the light source output signal, the LIDAR output signal can be linearly polarized. Since the light source output signal is the source of the circulator input signals, the LIDAR output signals received by the first polarization beam splitter 146 can also be linearly polarized. In FIG. 8A and FIG. 8B, light signals with the first polarization state are labeled with vertical bi-directional arrows and light signals with the polarization state are labeled filled circles. For the purposes of the following discussion, the LIDAR output signals are assumed to be in the first polarization state, however, LIDAR output signals in the second polarization state are also possible. Since the LIDAR output signals are assumed to be in the first polarization state, the LIDAR output signals are labeled with vertical arrows.

Since the LIDAR output signals are assumed to be in the first polarization state, the first polarization beam splitter 146 is shown outputting a first polarization state signal in the first polarization state. However, the first polarization beam splitter 146 is not shown outputting a light signal in the second polarization state due to a lack of a substantial amount of the second polarization state in the LIDAR output signals.

The circulator 142 can include a second polarization beam splitter 148 that receives the first polarization state signal. The second polarization beam splitter 148 splits the first polarization state signal into a first polarization signal and a second polarization signal where the first polarization signal has a first polarization state but does not have, or does not substantially have, a second polarization state and the second polarization signal has the second polarization state but does not have, or does not substantially have, the first polarization state. Since the first polarization state signal received by the second polarization beam splitter 148 has the first polarization state but does not have, or does not substantially have, the second polarization state; the second polarization beam splitter 148 outputs the first polarization signal but does not substantially output the second polarization signal. The first polarization beam splitter 146 and the second polarization beam splitter 148 can have the combined effect of filtering one of the polarization states from the circulator input signals.

The circulator 142 can include a non-reciprocal polarization rotator 150 that receive the first polarization signal and outputs a first rotated signal. In some instances, the non-reciprocal polarization rotator 150 is configured to rotate the polarization state of the first polarization signal by n*90°+45° where n is 0 or an even integer. As a result, the polarization state of the first rotated signal is rotated by 45° from the polarization state of the first polarization signal. Suitable non-reciprocal polarization rotators 150 include, but are not limited to, non-reciprocal polarization rotators such as Faraday rotators.

The circulator 142 can include a 45° polarization rotator 152 that receives the first rotated signal and outputs a second rotated signal. In some instances, the 45° polarization rotator 152 is configured to rotate the polarization state of the first rotated signal by m*90°+45° where m is 0 or an even integer. As a result, the polarization state of the second rotated signal is rotated by 45° from the polarization state of the first rotated signal. The combined effect of the polarization state rotations provided by the non-reciprocal polarization rotator 150 and the 45° polarization rotator 152 is that the polarization state of the second rotated signal is rotated by 90° relative to the polarization state of the first polarization signal. Accordingly, in the illustrated example, the second rotated signal has the second polarization state. Suitable 45° polarization rotators 152 include, but are not limited to, reciprocal polarization rotators such as half wave plates.

The circulator 142 can include a third polarization beam splitter 154 that receives the second rotated signal from the 45° polarization rotator 152. The third polarization beam splitter 154 is configured to split the second rotated signal into a light signal in the first polarization state and a light signal in the second polarization state signal. Since the second rotated signal is in the second polarization state, the third polarization beam splitter 154 outputs the second rotated signal but does not substantially output a signal in the first polarization state.

As is evident from FIG. 8A, the first polarization beam splitter 146, the second polarization beam splitter 148, the non-reciprocal polarization rotator 150, and the 45° polarization rotator 152 can be included in a component assembly 156. The component assembly 156 can be constructed as a monolithic block in that the components of the component assembly 156 can be bonded together in a block. In some instances, the component assembly 156 has the geometry of a cube, cuboid, square cuboid, or rectangular cuboid.

The circulator 142 can include a second component assembly 158. In some instances, the second component assembly 158 has the same construction as the component assembly 156. As a result, the component assembly 156 can also serve as the second component assembly 158. The second component assembly 158 can receive the second rotated signal from the third polarization beam splitter 148. In particular, the 45° polarization rotator 152 in the second component assembly 158 can receive the second rotated signal from the third polarization beam splitter 148 and output a third rotated signal. In some instances, the 45° polarization rotator 152 is configured to rotate the polarization state of the second rotated signal by m*90°+45° where m is 0 or an even integer. As a result, the polarization state of the third rotated signal is rotated by 45° from the polarization state of the second rotated signal. Suitable 45° polarization rotators 152 include, but are not limited to, reciprocal polarization rotators such as half wave plates.

The second component assembly 158 can include a non-reciprocal polarization rotator 150 that receive the third rotated signal and outputs a fourth rotated signal. In some instances, the non-reciprocal polarization rotator 150 is configured to rotate the polarization state of the third polarization signal by n*90°+45° where n is 0 or an even integer. As a result, the polarization state of the fourth rotated signal is rotated by 45° from the polarization state of the third polarization signal. Suitable non-reciprocal polarization rotators 150 include, but are not limited to, non-reciprocal polarization rotators such as Faraday rotators.

The combined effect of the polarization state rotations provided by the non-reciprocal polarization rotator 150 and the 45° polarization rotator 152 in the second component assembly 158 is that the polarization state of the fourth rotated signal is rotated by 90° relative to the polarization state of the second polarization signal. Accordingly, in the illustrated example, the fourth rotated signal has the first polarization state.

When the non-reciprocal polarization rotator 150 in the first component assembly 156 and the non-reciprocal polarization rotator 150 in the first component assembly 158 are each a Faraday rotator, the adapter components can include a magnet 160 positioned to provide the magnetic field that provides the Faraday rotators with the desired functionality.

The second component assembly 158 can include a 90° polarization rotator 162 that receives the fourth rotated signal and outputs a fifth rotated signal. In some instances, the 90° polarization rotator 162 is configured to rotate the polarization state of the first rotated signal by n*90°+90° where n is 0 or an even integer. As a result, the polarization state of the fifth rotated signal is rotated by 90° from the polarization state of the fourth rotated signal. The combined effect of the polarization state rotations provided by the non-reciprocal polarization rotator 150, the 45° polarization rotator 152, and the 90° polarization rotator 162 is that the polarization state of the fifth rotated signal is rotated by 0° relative to the polarization state of the second rotated signal. Accordingly, in the illustrated example, the fifth rotated signal has the second polarization state. Suitable 90° polarization rotators 162 include, but are not limited to, reciprocal polarization rotators such as half wave plates.

In instances where the second component assembly 158 has the same construction as the component assembly 156, the 90° polarization rotator 162 may also be present in the component assembly 156.

The first polarization beam splitter 146 in the second component assembly 158 receives the fifth rotated signal. The first polarization beam splitter 146 is configured to split the received light signal into a light signal with the first polarization state and a light signal with the second polarization state. Because the fifth rotated signal is in the second polarization state and does not have a component, or does not have a substantial component, in the first polarization state, the first polarization beam splitter 146 outputs an outgoing circulator signal having the second polarization state. As illustrated in FIG. 8A, the outgoing circulator signal exits from the circulator 142.

When the LIDAR system includes one or more optical components 20 in addition to the adapter, any optical components 20 can receive the outgoing circulator signal from the circulator 142. The optical components 20 can output the system output signal from the LIDAR system. When an object is present in the field of view, the object can reflect light from the system output signal. All or a portion of the reflected light can return to the LIDAR system in a system return signal. FIG. 8B shows the path that light from the system return signals carrying channel $C_2$ travels through the adapter of FIG. 8A until it enters the LIDAR chip in a first LIDAR input signal.

When the LIDAR system includes one or more optical components 20 in addition to the adapter, the system return signal is received by any of the optical components 20. The one or more optical components output a circulator return signal that is received by the oscillator. When the LIDAR system does not include any optical components 20 in addition to the adapter, the system return signal functions as the circulator return signal that is received by the oscillator.

The circulator return signal is received by the first polarization beam splitter 146 in the second component assembly 158. As noted above, a possible result of using one or more lasers is the light source 10 is that the system output signals are linearly polarized. For instance, the light carried by the system output signal is all of, or is substantially all of, the first polarization state or the second polarization state. Reflection of the system output signal by an object may change the polarization state of all or a portion of the light in the system output signal. Accordingly, the system return signal can include light of different linear polarization states. For instance, the system return signal can have a first contribution from light in the first polarization state and a second contribution from light in the second polarization state. The first polarization beam splitter 146 can be configured to separate the first contribution and the second contribution. For instance, the first polarization beam splitter 146 can be configured to output a first separated signal 168 that carries light in the first polarization state and a second separated signal 170 that carries light in the second polarization state.

The second polarization beam splitter 148 in the second component assembly 158 receives the first separated signal and reflects the first separated signal. The non-reciprocal polarization rotator 150 in the second component assembly 158 receives the first separated signal and outputs a first FPSS signal. The letters FPSS represent First Polarization State Source and indicate that the light that was in the first polarization state after reflection by the object was the source of the light for the first FPSS signal.

The first separated signal travels through the non-reciprocal polarization rotator 150 in the opposite direction of the third rotated signal. As a result, the non-reciprocal polarization rotator 150 is configured to rotate the polarization state of the first separated signal by −n*90°−45°. Accordingly, the polarization state of the first FPSS signal is rotated by −45° from the polarization state of the first separated signal.

The 45° polarization rotator 152 in the second component assembly 158 receives the first FPSS signal and outputs a second FPSS signal. Because the 45° polarization rotator 152 is a reciprocal polarization rotator, the 45° polarization rotator 152 is configured to rotate the polarization state of the first FPSS signal by m*90°+45° where m is 0 or an even integer. As a result, the polarization state of the second FPSS signal is rotated by 45° from the polarization state of the first FPSS signal. The combined effect of the polarization state rotations provided by the non-reciprocal polarization rotator 150 and the 45° polarization rotator 152 in the second component assembly 158 is that the second FPSS signal has been rotated by 0° from the polarization state of the first separated signal. As a result, the second FPSS signal has the first polarization state.

The second FPSS signal is received at the third polarization beam splitter 154. The third polarization beam splitter 154 reflects the second FPSS signal and the second FPSS signal exits the circulator 142. The adapter components can include one or more beam steering component. The illustrated adapter includes a first beam steering component 172. After exiting the circulator 142, the second FPSS signal is received at a first beam steering component 172. The first beam steering component 172 is configured to change the direction of travel of the second FPSS signal. Suitable first beam steering components 172 include, but are not limited to, mirrors and right-angled prism reflectors.

The second FPSS signal travels from the first beam steering component 172 to the beam-directing component 86 of the input port 72. Accordingly, the second FPSS signal can serve as the LIDAR input signal that is received by the LIDAR chip. Light from the LIDAR input signal travels through the input port 72 to one of the input waveguides 74 disclosed in the context of FIG. 1B through FIG. 2D.

The 90° polarization rotator 162 in the second component assembly 158 receives the second separated signal 170 and outputs a first SPSS signal. The letters SPSS represent Second Polarization State Source and indicate that the light that was in the second polarization state after reflection by the object was the source of the light for the first SPSS signal. Because the 90° polarization rotator 162 is a reciprocal polarization rotator, the 90° polarization rotator 162 is configured to rotate the polarization state of the second separated signal 170 by n*90°+90° where n is 0 or an even integer. As a result, the polarization state of the first SPSS signal is rotated by 90° from the polarization state of the second separated signal 170. Accordingly, in the illustrated example, the first SPSS signal has the first polarization state.

The non-reciprocal polarization rotator 150 in the second component assembly 158 receives the first SPSS signal and outputs a second SPSS signal. The first SPSS signal travels through the non-reciprocal polarization rotator 150 in the opposite direction of the third rotated signal. As a result, the non-reciprocal polarization rotator 150 is configured to rotate the polarization state of the first SPSS signal by −n*90°−45°. Accordingly, the polarization state of the second SPSS signal is rotated by −45° from the polarization state of the first SPSS signal.

The 45° polarization rotator 152 in the second component assembly 158 receives the second SPSS signal and outputs a third SPSS signal. Because the 45° polarization rotator 152 is a reciprocal polarization rotator, the 45° polarization rotator 152 is configured to rotate the polarization state of the second SPSS signal by m*90°+45° where m is 0 or an even integer. As a result, the polarization state of the third SPSS signal is rotated by 45° from the polarization state of the second FPSS signal. The combined effect of the polarization state rotations provided by the non-reciprocal polarization rotator 150 and the 45° polarization rotator 152 in the second component assembly 158 is that the third SPSS signal has been rotated by 0° from the polarization state of the first SPSS signal. Additionally, the combined effect of the polarization state rotations provided by the non-reciprocal polarization rotator 150, the 45° polarization rotator 152, and the 90° polarization rotator 162 in the second component assembly 158 is that the third SPSS signal has been rotated by 90° from the polarization state of the second separated signal 170. Accordingly, in the illustrated example, the third SPSS signal is shown in the first polarization state.

The third SPSS signal is received at the third polarization beam splitter 154. The third polarization beam splitter 154 reflects the third SPSS signal such that the third SPSS signal exits the circulator 142. After exiting the circulator 142, the third SPSS signal can exit the adapter as shown in FIG. 8B. In some instances, the third SPSS signal is discarded and/or disregarded.

FIG. 8C illustrates the path that light from the LIDAR output signal that carries channel $C_3$ travels through the LIDAR system. As disclosed in the context of FIG. 2A through FIG. 2D, the LIDAR output signal travel away from the LIDAR chip and/or the beam-directing component 86 in different directions. Since the LIDAR output signal travel in different directions, the circulator input signals enter a first port 180 of the circulator 142 traveling in different directions. Although the different circulator input signals enter the circulator 142 traveling in different directions, the light from the different circulator input signals are processed by the same selection of circulator components in the same sequence. For instance, the light from different circulator input signals travels through components in the sequence disclosed in the context of FIG. 8A and FIG. 8B. As a result, the light from the different circulator input signals exit from the circulator at a second port 182. For instance, the path of the light from the circulator input signal that carries channel $C_3$ through the circulator shows the outgoing circulator signal exiting from the circulator at a second port 182. Additionally, the light from the circulator return signal that carries channel $C_3$ enters the circulator at the second port 182. Similarly, the light from the circulator input signal carrying channel $C_2$ enters and exits the circulator at the second port 182 as described in the context of FIG. 8A and FIG. 8B.

A comparison of FIG. 8A and FIG. 8B shows that outgoing circulator signals approach the second port 182 from different directions and travel away from the circulator in different directions. The difference in the directions of the outgoing circulator signals can result from the circulator input signals entering the circulator from different directions.

The circulator return signals returns to the LIDAR system in the reverse direction of the outgoing circulator signal carrying the same channel. As a result, different circulator return signals return to the circulator from different directions. Accordingly, the light from the different circulator return signals can each travel a different pathway through the circulator.

Light in the different the circulator return signals that was in the first polarization state after being reflected by the object (first polarization state source, FPSS) exits from the circulator 142 at a third port 184. For instance, FIG. 8C shows a second FPSS signal (includes the light from the system return signal that carries channel $C_3$) exiting the circulator from the third port 184. Similarly, the second FPSS signal that includes the light from the system return signal that carries channel $C_2$ also exits the circulator at the third port 184 as described in the context of FIG. 8A and FIG. 8B.

The different second FPSS signals travel away from the circulator in different directions. Different second FPSS signals are received at different locations on the beam-directing component 86 of the input port 72. As a result, light from different second FPSS signals is directed to different alternate waveguides 16 as described in the context of FIG. 2A through FIG. 2D. For instance, light from the second FPSS signal that carries channel $C_3$ is included in the first LIDAR input signal labeled $C_3$ and light from the second FPSS signal that carries channel $C_2$ is included in the first LIDAR input signal labeled $C_2$. Since tight from the LIDAR input signal labeled $C_3$ and light from the LIDAR input signal labeled $C_2$ are received at different alternate waveguides 16, the alternate waveguides 16 that receives a LIDAR input signal can be a function of the direction that the associated system output signal travels away from the LIDAR system and/or of the direction that the associated system return signal returns to the LIDAR system. The different second FPSS signals traveling away from the circulator in different directions can be result of the circulator input signals entering the circulator in different directions. As a result, the alternate waveguide 16 that receives a LIDAR input signal can be a function of the direction that the associated circulator input signal enters the circulator and/or of the direction that associated LIDAR output signal travels away from the LIDAR chip. Accordingly, the LIDAR system can be configured such that the circulator input signals enter the circulator traveling in a direction that causes the second FPSS signals to travel away from the circulator in different non-parallel directions.

Light in the circulator return signals that was in the second polarization state after being reflected by the object (first polarization state source, FPSS) exits from the circulator 142 at a fourth port 186. For instance, FIG. 8C shows a third SPSS signal (includes the light from the system return signal that carries channel $C_3$) exiting the circulator from the fourth port 186. Similarly, the third SPSS signal that includes the light from the system return signal that carries channel $C_2$ also exits the circulator at the fourth port 186 as described in the context of FIG. 8A and FIG. 8B. After exiting the circulator 142, the third SPSS signal can exit the adapter as shown in FIG. 8C.

The second FPSS signals can serve as circulator output signals. The circulator output signals can include first circulator output signals. Each of the second FPSS signals can serve as one of the first circulator output signals. As a result, each of the first circulator output signals can include, include primarily, consist essentially of, and/or consist of light that was in the first polarization state when it was reflect by an object outside of the LIDAR system (FPSS).

A comparison of FIG. 8A and FIG. 8C shows that light from each of the circulator input signals is operated on by the same selection (a first selection) of circulator components when traveling from the first port 180 to the second port 182. For instance: the light from each of the circulator input signals is operated on by the first polarization beam splitter 146, the second polarization beam splitter 148, the non-reciprocal polarization rotator 150, and the 45° polarization rotator 152 from the component assembly 156; and also by the third polarization beam splitter 154; and also by the 45° polarization rotator 152, the non-reciprocal polarization rotator 150, the second polarization beam splitter 148, and the first polarization beam splitter 146 from the second component assembly 158. However, FIG. 8A and FIG. 8C also shows that the light from each of the each of the circulator input signals can travel a different pathway through the circulator. A comparison of FIG. 8B and FIG. 8C shows that light in each of the first circulator output signals is operated on by the same selection (a second selection) of circulator components when traveling from the second port 182 to the third port 184. However, FIG. 8B and FIG. 8C also shows that the light in each of the first circulator output signals can travel a different pathway through the circulator. A comparison of FIG. 8B and FIG. 8C shows that light in each of the second circulator output signals is operated on by the same selection (a third selection) of circulator components when traveling from the second port 182 to the fourth port 186. However, FIG. 8B and FIG. 8C also shows that the light in each of the second circulator output signals can travel a different pathway through the circulator. As is evident from FIG. 8A through FIG. 8C, the first selection of components, the second selection of components, and the third selection of components can be different.

The outgoing circulator signals can each include, include primarily, consists of, or consists essentially of light from one of the circulator input signals. Additionally, the circulator return signals can each include, include primarily, consists of, or consists essentially of light from one of the circulator input signals, and one of the outgoing circulator signals. Further, the circulator output signals can each include, include primarily, consists of, or consists essentially of light from one of the circulator return signals, one of the outgoing circulator signals, and one of the circulator input signals.

The polarization beam splitters shown in FIG. 8A through FIG. 8C can have the construction of cube-type beamsplitters or Wollaston prisms. As a result, the components described as a beamsplitter can represent a beamsplitting component such as a coating, plate, film, or an interface between light-transmitting materials 190 such as a glass, crystal, birefringent crystal, or prism. A light-transmitting material 190 can include one or more coatings positioned as desired. Examples of suitable coating for a light-transmitting material 190 include, but are not limited to, anti-reflective coatings. In some instances, one, two, three, or four ports selected from the group consisting of the first port 180, the second port 182, the third port 184, and the fourth port 186 are all or a portion of a surface of the circulator. For instance, one, two, three, or four ports selected from the group consisting of the first port 180, the second port 182, the third port 184, and the fourth port 186 can each be all or a portion of a surface of the light-transmitting material 190 as shown in FIG. 8A and FIG. 8B. The surface of the circulator or light-transmitting material 190 that serves as a port can include one or more coatings.

In some instances, the components of the component assembly 156, the second component assembly 158, and/or the circulator 142 are immobilized relative to one another through the use of one or more bonding media such as adhesives, epoxies or solder. In some instances, the components of a component assembly 156 and/or a second component assembly 158 are immobilized relative to one another before being included in the circulator 142. Using a component assembly 156 and a second component assembly 158 with the same construction combined with immobilizing the components of these component assemblies before assembling of the circulator 142 can simplify the fabrication of the circulator.

Although the LIDAR system is disclosed as having a component assembly 156 and a second component assembly 158 with the same construction, the component assembly 156 and second component assembly 158 can have different constructions. For instance, the component assembly 156 can include a 90° polarization rotator 162 that is not used during the operation of the LIDAR system. As a result, the component assembly 156 can exclude the 90° polarization rotator 162. As another example, the component assembly 156 can include, or consist of, the non-reciprocal polarization rotator 150 and the 45° polarization rotator 152. In this example, the non-reciprocal polarization rotator 150 or the 45° polarization rotator 152 can receive the circulator input signals directly from the redirection component 102. As a result, the component assembly 156 can exclude the first polarization beam splitter 146, the second polarization beam splitter 148, the associated light-transmitting material 190, and the 90° polarization rotator 162.

Figures 9A, 9B:
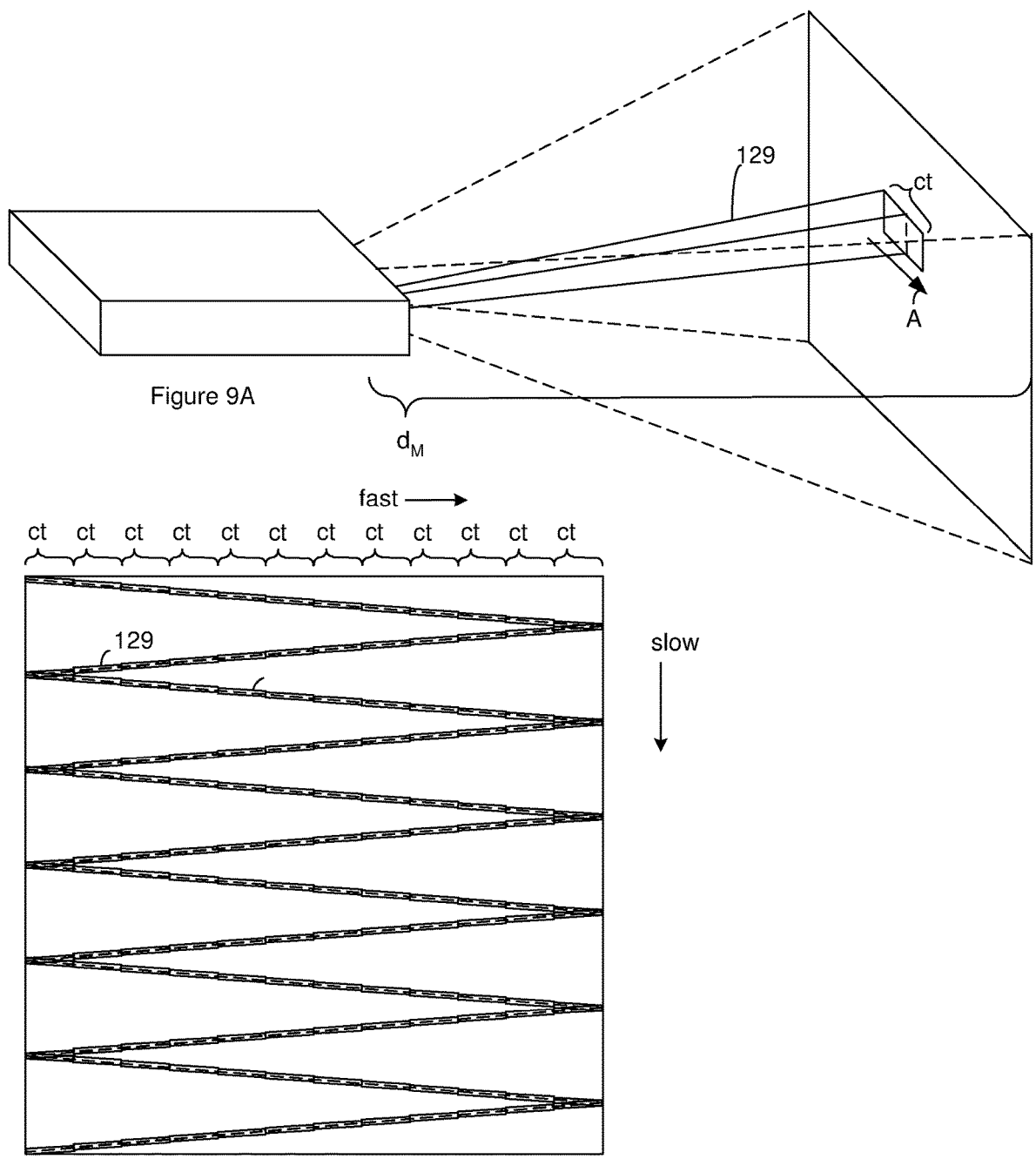
FIG. 9A is a schematic of the relationship between an imaging system and the field of view.
FIG. 9B is a sideview of an imaginary plane from FIG. 9A.

FIG. 9A is a schematic of the relationship between a LIDAR system and the field of view. The field of view is represented by the dashed lines that extend from the LIDAR system to an imaginary surface within the field of view. In order to show the extent of the field of view, the imaginary surface is positioned at a maximum operational distance (labeled $d_M$) from the LIDAR system. The maximum operational distance can generally be considered the maximum distance for which the LIDAR system is configured to provide reliable LIDAR data. In reality, the imaginary surface can have a curved shape due to the fixed nature of the maximum operational distance, however, a planar surface is shown to simplify the following discussion.

The LIDAR system can include one or more beam steering mechanisms and one or more signal steering mechanisms as described above. The electronics can operate the one or more beam steering mechanisms and one or more signal steering mechanisms to steer the system output signal to different sample regions 129 in the field of view. A portion of a sample region is illustrated by the rectangle on the plane of FIG. 9A. The electronics generate LIDAR data in a series of cycles by sequentially illuminating different sample regions in the field of view for the LIDAR system. LIDAR data can be generated for each of the sample regions. A sample region is the portion of the field of view that is illuminated during the cycle that is used to generate the LIDAR data for the sample region. As a result, each of the LIDAR data results is associated with one of the cycles and one of the sample regions.

In FIG. 9A, only a portion of the illustrated sample region is shown as illuminated by the system output signal because the system output signal can continue to be scanned during the data period(s) associated with the sample region. For instance, the system output signal in FIG. 9A can be scanned in the direction of the arrow labeled A for the duration of a cycle. This scan can cause the system output signal to illuminate the length of the plane labeled ct during the cycle. Although the sample region is shown as two dimensional in FIG. 9A, the sample region is three-dimensional and can extend from the rectangle on the illustrated plane back to the LIDAR system.

FIG. 9B is a sideview of the imaginary plane from FIG. 9A. The LIDAR system can include multiple steering mechanisms (not shown in FIG. 9A through FIG. 9C) that steer the system output signal to different sample regions in the field of view. The dashed line in FIG. 9B represents the path that the centroid of the system output signal carrying channel $C_2$ travels across the plane in the field of view in response to steering of the system output signal by only the one or more beam steering components 138 (a beam steering mechanism) disclosed in the context of FIG. 7. The one or more beam steering components 138 provide two-dimensional steering of the system output signal. The sample regions 129 are represented by the rectangles positioned along path of the system output signal.

The scan path of the system output signal shown in FIG. 9B has a fast axis illustrated by the arrow labeled "fast" in FIG. 9B. The scan path of the system output signal shown in FIG. 9B has a slow axis illustrated by the arrow labeled "slow" in FIG. 9B. The scan speed of the system output signal in the direction of the fast axis is faster than the scan speed of the system output signal in the direction of the slow axis.

In order to have LIDAR data results that represent the entire field of view, it is generally desirable for the number of sample regions in the direction of the fast axis to match the number of sample regions in the direction of the slow axis. The scanning speed in the fast direction can increased so as to increase the number of zigzags that the system output signals travels across the field of view. The increased number of zigzags provides an increased number of sample regions in the direction of the fast axis. However, as the applications for LIDAR systems have increased, the size that is desired for the field of view and the maximum operational distance have increased to dimensions where the scan speed that is required of the one or more beam steering components 138 is not possible or practical and/or has undesirably high power requirements.

Figure 9C:
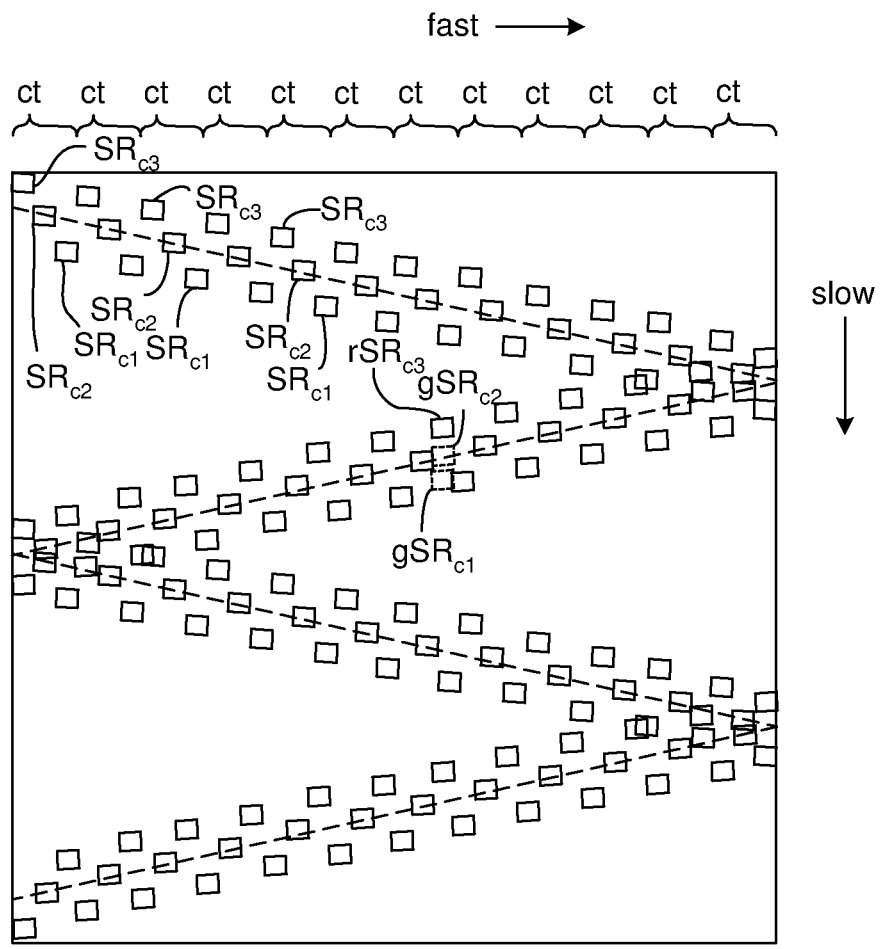
FIG. 9C is a sideview of another embodiment of the imaginary plane from FIG. 9A.

FIG. 9C is a sideview of the imaginary plane from FIG. 9A. The dashed line in FIG. 9C represents the path that the centroid of the system output signal when the system output signal channel $C_2$ is steered by only the one or more beam steering components 138 (the beam steering mechanism) disclosed in the context of FIG. 7. The sample regions of FIG. 9C are vertically separated from one another and from the path provided by the beam steering mechanism as illustrated by the dashed lines. The vertical separation results from the electronics operating the signal directing component 14 so as to change the direction that the system output signal travels away from the LIDAR system. As a result, the operation of the signal steering mechanism moves the system output signal in a direction that is transverse to the path provided by the beam steering mechanism. For instance, the sample regions 129 labeled $SR_{c1}$ can represent the sample region when the signal directing component 14 is operated such that the system output signal carries channel $C_1$; the sample regions 129 labeled $SR_{c2}$ can represent the sample region when the system output signal carries channel $C_2$; and the sample regions 129 labeled $SR_{c3}$ can represent the sample region when the system output signal carries channel $C_3$. As is evident from the sample region sequence shown in FIG. 9C, the signal directing component 14 is operated such that the system output signals sequentially carry the channels $C_i$ in the sequence i=1 through N and the sequence is repeated. Although FIG. 9C illustrates the channel sequence repeated in in the same order, the channel sequence can be repeated in an order that is the reverse of the prior sequence.

The scanning speed on the fast axis can be slowed relative to the fast axis scanning speed of FIG. 9B while retaining the same frame rate (rate at which each of the sample regions in the field of view is illuminated by the system output signal). For instance, the fast axis scanning speed of FIG. 9C is about 1/N times the fast axis fast axis scanning speed of FIG. 9B where N is the number of alternate waveguides 16. The reduced fast axis scanning speed is evident from the reduced number of zigzags within the same frame scan time (1/frame rate). As a result of the reduced fast axis scanning speed, the sample regions have a reduced length in the direction of the fast axis and accordingly have a reduced size. The reduced size of the sample regions leads to increased LIDAR data reliability.

In FIG. 9B, the distance that the system output signal travels along the fast axis during the duration of each cycle is labeled ct. That same distance is also labeled ct in FIG. 9C. Within each distance labeled ct in FIG. 9B and FIG. 9C, there are 12 sample regions spread out across the slow axis. As a result, the combination of using the signal directing component 14 to steer the system output signal and the reduced fast axis scan speed can provide the same slow axis resolution as increasing the fast axis scan speed.

The fast axis scanning speed (speed that the signal steering mechanism provides in the direction of the fast axis) can be represented by the rate of angular change in the direction that the system output signal travels away from the LIDAR system in the direction of the fast axis (the fast axis angular rate of change). The slow axis scanning speed (speed that the signal steering mechanism provides in the direction of the slow axis) can be represented by the rate of angular change in the direction that the system output signal travels away from the LIDAR system in along the slow axis (the slow axis angular rate change). The slow and axis and fast axis can be perpendicular to one another. In some instances, a ratio of the fast axis angular rate of change:the slow axis angular rate of change is greater than 1:1, 2:1, 3:1, or 4:1 and/or less than 5:1, 10:1, or 100:1. Additionally, or alternately, the fast axis angular rate of change can be greater than 100 degrees/second, 200 degrees/second, or 300 degrees/second and/or less than 500 degrees/second, 1000 degrees/second, or and 2000 degrees/second and/or the slow axis angular rate of change can be greater than 20 degrees/second, 50 degrees/second, or 100 degrees/second and/or less than 200 degrees/second, 500 degrees/second, or and 1000 degrees/second.

Although FIG. 9B and FIG. 9C, illustrates the signal steering mechanism steering the system output signal on a zigzag path back and forth across the field of view, the signal steering mechanism can steer the system output signal back and forth across the field of view using other patterns. For instance, the path need not include straight segments connected at sharp angles but can instead include straight segments connected by curves. Alternately, the path can include curves and/or curved segments and can exclude straight segments. For instance, the path can be configured as a series of s-shaped sections.

Figure 10A:
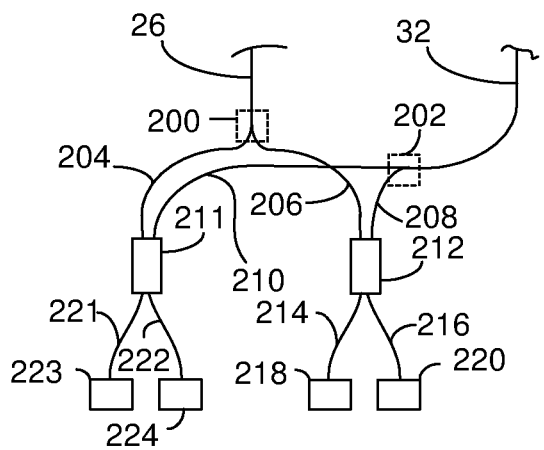
FIG. 10A through FIG. 10B illustrate an example of a processing component that is suitable for use as a processing component in an imaging system constructed according to FIG. 1A through FIG. 1C.
Figure 10B:
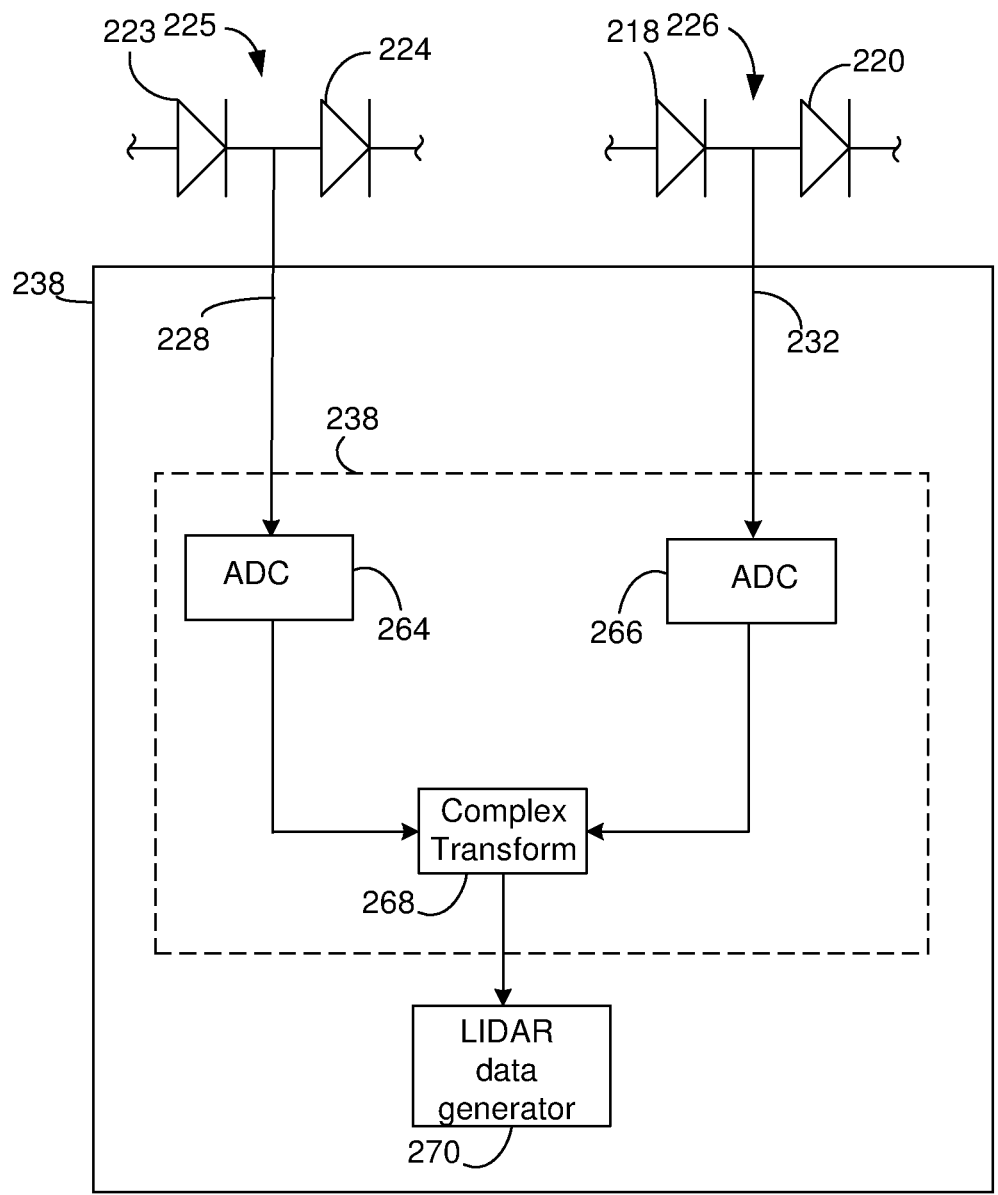

FIG. 10A through FIG. 10B illustrate an example of a processing component that is suitable for use as the processing component 28 in a LIDAR system constructed according to FIG. 1A through FIG. 1C. In the LIDAR system of FIG. 1A, the signal directing component 14 directs the outgoing LIDAR signal to a series of different alternate waveguides 16 as is evident from FIG. 9A through FIG. 9C. As a result, the comparative waveguide 26 receives comparative signals that carry different channels (i.e. that carry light from outgoing LIDAR signals carried on different alternate waveguides) in series. Since different channels illuminate different sample regions (FIG. 9A through FIG. 9C), the comparative waveguides 26 receive the comparative signals that carry light from different sample regions in series. Since the comparative waveguide 26 carries these comparative signals to the processing unit 28, the processing component 28 receives comparative signals that carry different channels in series and accordingly receives comparative signals that carry light from different sample regions in series. As noted above, the processing component 28 also receives a reference signal from the reference waveguide 32.

In the LIDAR system of FIG. 1B, the second signal directing component 76 directs the LIDAR input signals carried on different input waveguides 74 to the comparative waveguide 26. However, LIDAR input signals that carry different channels are received on different input waveguides 74. Further, the LIDAR input signals that carry different channels are serially received on the input waveguides 74 as a result of the signal directing component 14 directing the outgoing LIDAR signal to one of the different alternate waveguides 16. As a result, the comparative waveguide 26 receives the LIDAR input signals that carry different channels (i.e. that carry light from outgoing LIDAR signals carried on different alternate waveguides) in series. Since different channels illuminate different sample regions, the comparative waveguide 26 receives the comparative signals that carry light from different sample regions in series. Since the comparative waveguide 26 carries these comparative signals to the processing unit 28, the processing component 28 receives comparative signals that carry different channels in series and accordingly receives comparative signals that carry light from different sample regions in series. As noted above, the processing component 28 also receives a reference signal from the reference waveguide 32.

The processing component 28 includes an optical-to-electrical assembly configured to convert the light signals to electrical signals. FIG. 10A is a schematic of an example of a suitable optical-to-electrical assembly that includes a first splitter 200 that divides the comparative signal received from the comparative waveguide 26 onto a first comparative waveguide 204 and a second comparative waveguide 206. The first comparative waveguide 204 carries a first portion of the comparative signal to a light-combining component 211. The second comparative waveguide 206 carries a second portion of the comparative signal to a second light-combining component 212.

The processing component of FIG. 10A also includes a second splitter 202 that divides the reference signal received from the reference waveguide 32 onto a first reference waveguide 210 and a second reference waveguide 208. The first reference waveguide 210 carries a first portion of the reference signal to the light-combining component 211. The second reference waveguide 208 carries a second portion of the reference signal to the second light-combining component 212.

The second light-combining component 212 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal.

The second light-combining component 212 also splits the resulting second composite signal onto a first auxiliary detector waveguide 214 and a second auxiliary detector waveguide 216. The first auxiliary detector waveguide 214 carries a first portion of the second composite signal to a first auxiliary light sensor 218 that converts the first portion of the second composite signal to a first auxiliary electrical signal. The second auxiliary detector waveguide 216 carries a second portion of the second composite signal to a second auxiliary light sensor 220 that converts the second portion of the second composite signal to a second auxiliary electrical signal. Examples of suitable light sensors include germanium photodiodes (PDs), and avalanche photodiodes (APDs).

In some instances, the second light-combining component 212 splits the second composite signal such that the portion of the comparative signal (i.e. the portion of the second portion of the comparative signal) included in the first portion of the second composite signal is phase shifted by 180° relative to the portion of the comparative signal (i.e. the portion of the second portion of the comparative signal) in the second portion of the second composite signal but the portion of the reference signal (i.e. the portion of the second portion of the reference signal) in the second portion of the second composite signal is not phase shifted relative to the portion of the reference signal (i.e. the portion of the second portion of the reference signal) in the first portion of the second composite signal. Alternately, the second light-combining component 212 splits the second composite signal such that the portion of the reference signal (i.e. the portion of the second portion of the reference signal) in the first portion of the second composite signal is phase shifted by 180° relative to the portion of the reference signal (i.e. the portion of the second portion of the reference signal) in the second portion of the second composite signal but the portion of the comparative signal (i.e. the portion of the second portion of the comparative signal) in the first portion of the second composite signal is not phase shifted relative to the portion of the comparative signal (i.e. the portion of the second portion of the comparative signal) in the second portion of the second composite signal. Examples of suitable light sensors include germanium photodiodes (PDs), and avalanche photodiodes (APDs).

The first light-combining component 211 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal.

The light-combining component 211 also splits the first composite signal onto a first detector waveguide 221 and a second detector waveguide 222. The first detector waveguide 221 carries a first portion of the first composite signal to a first light sensor 223 that converts the first portion of the second composite signal to a first electrical signal. The second detector waveguide 222 carries a second portion of the second composite signal to a second light sensor 224 that converts the second portion of the second composite signal to a second electrical signal. Examples of suitable light sensors include germanium photodiodes (PDs), and avalanche photodiodes (APDs).

In some instances, the light-combining component 211 splits the first composite signal such that the portion of the comparative signal (i.e. the portion of the first portion of the comparative signal) included in the first portion of the composite signal is phase shifted by 180° relative to the portion of the comparative signal (i.e. the portion of the first portion of the comparative signal) in the second portion of the composite signal but the portion of the reference signal (i.e. the portion of the first portion of the reference signal) in the first portion of the composite signal is not phase shifted relative to the portion of the reference signal (i.e. the portion of the first portion of the reference signal) in the second portion of the composite signal. Alternately, the light-combining component 211 splits the composite signal such that the portion of the reference signal (i.e. the portion of the first portion of the reference signal) in the first portion of the composite signal is phase shifted by 180° relative to the portion of the reference signal (i.e. the portion of the first portion of the reference signal) in the second portion of the composite signal but the portion of the comparative signal (i.e. the portion of the first portion of the comparative signal) in the first portion of the composite signal is not phase shifted relative to the portion of the comparative signal (i.e. the portion of the first portion of the comparative signal) in the second portion of the composite signal.

When the second light-combining component 212 splits the second composite signal such that the portion of the comparative signal in the first portion of the second composite signal is phase shifted by 180° relative to the portion of the comparative signal in the second portion of the second composite signal, the light-combining component 211 also splits the composite signal such that the portion of the comparative signal in the first portion of the composite signal is phase shifted by 180° relative to the portion of the comparative signal in the second portion of the composite signal. When the second light-combining component 212 splits the second composite signal such that the portion of the reference signal in the first portion of the second composite signal is phase shifted by 180° relative to the portion of the reference signal in the second portion of the second composite signal, the light-combining component 211 also splits the composite signal such that the portion of the reference signal in the first portion of the composite signal is phase shifted by 180° relative to the portion of the reference signal in the second portion of the composite signal.

The first reference waveguide 210 and the second reference waveguide 208 are constructed to provide a phase shift between the first portion of the reference signal and the second portion of the reference signal. For instance, the first reference waveguide 210 and the second reference waveguide 208 can be constructed so as to provide a 90 degree phase shift between the first portion of the reference signal and the second portion of the reference signal. As an example, one reference signal portion can be an in-phase component and the other a quadrature component. Accordingly, one of the reference signal portions can be a sinusoidal function and the other reference signal portion can be a cosine function. In one example, the first reference waveguide 210 and the second reference waveguide 208 are constructed such that the first reference signal portion is a cosine function and the second reference signal portion is a sine function. Accordingly, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

The first light sensor 223 and the second light sensor 224 can be connected as a balanced detector and the first auxiliary light sensor 218 and the second auxiliary light sensor 220 can also be connected as a balanced detector. For instance, FIG. 10B provides a schematic of the relationship between the electronics, the first light sensor 223, the second light sensor 224, the first auxiliary light sensor 218, and the second auxiliary light sensor 220. The symbol for a photodiode is used to represent the first light sensor 223, the second light sensor 224, the first auxiliary light sensor 218, and the second auxiliary light sensor 220 but one or more of these sensors can have other constructions. In some instances, all of the components illustrated in the schematic of FIG. 10B are included on the LIDAR chip. In some instances, the components illustrated in the schematic of FIG. 10B are distributed between the LIDAR chip and electronics located off of the LIDAR chip.

The electronics connect the first light sensor 223 and the second light sensor 224 as a first balanced detector 225 and the first auxiliary light sensor 218 and the second auxiliary light sensor 220 as a second balanced detector 226. In particular, the first light sensor 223 and the second light sensor 224 are connected in series. Additionally, the first auxiliary light sensor 218 and the second auxiliary light sensor 220 are connected in series. The serial connection in the first balanced detector is in communication with a first data line 228 that carries the output from the first balanced detector as a first data signal. The serial connection in the second balanced detector is in communication with a second data line 232 that carries the output from the second balanced detector as a second data signal. The first data signal is an electrical representation of the first composite signal and the second data signal is an electrical representation of the second composite signal. Accordingly, the first data signal includes a contribution from a first waveform and a second waveform and the second data signal is a composite of the first waveform and the second waveform. The portion of the first waveform in the first data signal is phase-shifted relative to the portion of the first waveform in the first data signal but the portion of the second waveform in the first data signal being in-phase relative to the portion of the second waveform in the first data signal. For instance, the second data signal includes a portion of the reference signal that is phase shifted relative to a different portion of the reference signal that is included the first data signal. Additionally, the second data signal includes a portion of the comparative signal that is in-phase with a different portion of the comparative signal that is included in the first data signal. The first data signal and the second data signal are beating as a result of the beating between the comparative signal and the reference signal, i.e. the beating in the first composite signal and in the second composite signal.

The electronics 62 includes a transform mechanism 238 configured to perform a mathematical transform on the first data signal and the second data signal. For instance, the mathematical transform can be a complex Fourier transform with the first data signal and the second data signal as inputs. Since the first data signal is an in-phase component and the second data signal its quadrature component, the first data signal and the second data signal together act as a complex data signal where the first data signal is the real component and the second data signal is the imaginary component of the input.

The transform mechanism 238 includes a first Analog-to-Digital Converter (ADC) 264 that receives the first data signal from the first data line 228. The first Analog-to-Digital Converter (ADC) 264 converts the first data signal from an analog form to a digital form and outputs a first digital data signal. The transform mechanism 238 includes a second Analog-to-Digital Converter (ADC) 266 that receives the second data signal from the second data line 232. The second Analog-to-Digital Converter (ADC) 266 converts the second data signal from an analog form to a digital form and outputs a second digital data signal. The first digital data signal is a digital representation of the first data signal and the second digital data signal is a digital representation of the second data signal. Accordingly, the first digital data signal and the second digital data signal act together as a complex signal where the first digital data signal acts as the real component of the complex signal and the second digital data signal acts as the imaginary component of the complex data signal.

The transform mechanism 238 includes a transform component 268 that receives the complex data signal. For instance, the transform component 268 receives the first digital data signal from the first Analog-to-Digital Converter (ADC) 264 as an input and also receives the second digital data signal from the first Analog-to-Digital Converter (ADC) 266 as an input. The transform component 268 can be configured to perform a mathematical transform on the complex signal so as to convert from the time domain to the frequency domain. The mathematical transform can be a complex transform such as a complex Fast Fourier Transform (FFT). A complex transform such as a complex Fast Fourier Transform (FFT) provides an unambiguous solution for the shift in frequency of a comparative signal relative to the system output signal.

The electronics include a LIDAR data generator 270 that receives the output from the transform component 268 and processes the output from the transform component 268 so as to generate the LIDAR data (distance and/or radial velocity between the reflecting object and the LIDAR chip or LIDAR system). The LIDAR data generator performs a peak find on the output of the transform component 268 to identify one or more peaks in the beat frequency.

The electronics use the one or more frequency peaks for further processing to generate the LIDAR data (distance and/or radial velocity between the reflecting object and the LIDAR chip or LIDAR system). The transform component 268 can execute the attributed functions using firmware, hardware or software or a combination thereof.

Figure 10C:
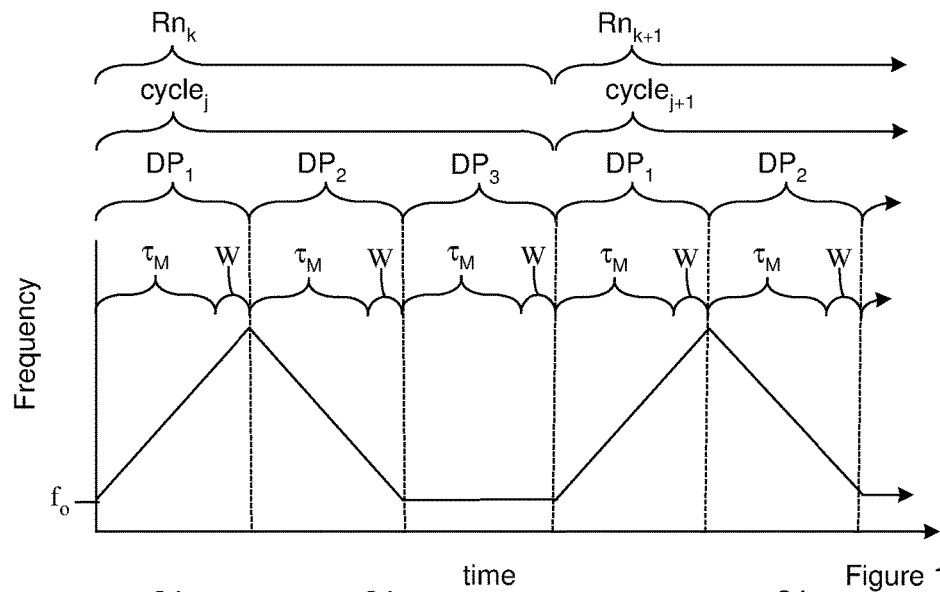
FIG. 10C illustrates the frequency of a signal output from the imaging system over time.

FIG. 10C shows an example of a relationship between the frequency of the system output signal, time, cycles and data periods. The base frequency of the system output signal ($f_o$) can be the frequency of the system output signal at the start of a cycle.

FIG. 10C shows frequency versus time for a sequence of two cycles labeled cycle$_j$ and cycle$_{j+1}$. In some instances, the frequency versus time pattern is repeated in each cycle as shown in FIG. 10C. The illustrated cycles do not include re-location periods and/or re-location periods are not located between cycles. As a result, FIG. 10C illustrates the results for a continuous scan where the steering of the system output signal is continuous.

Each cycle includes K data periods that are each associated with a period index k and are labeled $DP_k$. In the example of FIG. 10C, each cycle includes three data periods labeled $DP_k$ with k=1, 2, and 3. In some instances, the frequency versus time pattern is the same for the data periods that correspond to each other in different cycles as is shown in FIG. 10C. Corresponding data periods are data periods with the same period index. As a result, each data period $DP_1$ can be considered corresponding data periods and the associated frequency versus time patterns are the same in FIG. 10C. At the end of a cycle, the electronics return the frequency to the same frequency level at which it started the previous cycle.

During the data period $DP_1$, and the data period $DP_2$, the electronics operate the light source such that the frequency of the system output signal changes at a linear rate α. The direction of the frequency change during the data period $DP_1$ is the opposite of the direction of the frequency change during the data period $DP_2$.

FIG. 10C labels sample regions that are each associated with a sample region index k and are labeled $Rn_k$. FIG. 10C labels sample regions $Rn_k$ and $Rn_k+1$. Each sample region is illuminated with the system output signal during the data periods that FIG. 10C shows as associated with the sample region. For instance, sample region $Rn_k$ is illuminated with the system output signal during the data periods labeled $DP_1$ through $DP_3$. The sample region indices k can be assigned relative to time. For instance, the sample regions can be illuminated by the system output signal in the sequence indicated by the index k. As a result, the sample region $Rn_{10}$ can be illuminated after sample region $Rn_9$ and before $Rn_{11}$.

The LIDAR system is typically configured to provide reliable LIDAR data when the object is within an operational distance range from the LIDAR system. The operational distance range can extend from a minimum operational distance to a maximum operational distance. A maximum roundtrip time can be the time required for a system output signal to exit the LIDAR system, travel the maximum operational distance to the object, and to return to the LIDAR system and is labeled $\tau_M$ in FIG. 10C.

Since there is a delay between the system output signal being transmitted and returning to the LIDAR system, the composite signals do not include a contribution from the LIDAR signal until after the system return signal has returned to the LIDAR system. Since the composite signal needs the contribution from the system return signal for there to be a LIDAR beat frequency, the electronics measure the LIDAR beat frequency that results from system return signal that return to the LIDAR system during a data window in the data period. The data window is labeled "W" in FIG. 10C. The contribution from the LIDAR signal to the composite signals will be present at times larger than the maximum operational time delay ($\tau_M$). As a result, the data window is shown extending from the maximum operational time delay ($\tau_M$) to the end of the data period.

A frequency peak in the output from the Complex Fourier transform represents the beat frequency of the composite signals that each includes a comparative signal beating against a reference signal. The beat frequencies from two or more different data periods can be combined to generate the LIDAR data. For instance, the beat frequency determined from $DP_1$ in FIG. 10C can be combined with the beat frequency determined from $DP_2$ in FIG. 10C to determine the LIDAR data. As an example, the following equation applies during a data period where electronics increase the frequency of the outgoing LIDAR signal during the data period such as occurs in data period $DP_1$ of FIG. 10C: $f_{ub}=-f_d+\alpha\tau$ where $f_{ub}$ is the frequency provided by the transform component, $f_d$ represents the Doppler shift ($f_d=2vf_c/c$) where $f_c$ represents the optical frequency ($f_o$), c represents the speed of light, v is the radial velocity between the reflecting object and the LIDAR system where the direction from the reflecting object toward the chip is assumed to be the positive direction, τ is the time in which the light from the system output signal travels to the object and returns to the LIDAR system (the roundtrip time), and c is the speed of light. The following equation applies during a data period where electronics decrease the frequency of the outgoing LIDAR signal such as occurs in data period $DP_2$ of FIG. 10C: $f_{db}=-f_d-\alpha\tau$ where $f_{db}$ is a frequency provided by the transform component ($f_{i,LDP}$ determined from $DP_2$ in this case). In these two equations, $f_d$ and τ are unknowns. The electronics solve these two equations for the two unknowns. The radial velocity for the sample region then be calculated from the Doppler shift ($v=c*f_d/(2f_c)$) and/or the separation distance for that sample region can be calculated from $c*\tau/2$. As a result, the electronics use each of the beat frequencies can as a variable in one or more equations that yield the LIDAR data. Since the LIDAR data can be generated for each corresponding frequency pair output by the transform, separate LIDAR data can be generated for each of the objects in a sample region. Accordingly, the electronics can determine more than one radial velocity and/or more than one radial separation distance from a single sampling of a single sample region in the field of view.

The data period labeled $DP_3$ in FIG. 10C is optional. As noted above, there are situations where more than one object is present in a sample region. For instance, during the feedback period in $DP_1$ for $cycle_2$ and also during the feedback period in $DP_2$ for $cycle_2$, more than one frequency pair can be matched. In these circumstances, it may not be clear which frequency peaks from $DP_2$ correspond to which frequency peaks from $DP_1$. As a result, it may be unclear which frequencies need to be used together to generate the LIDAR data for an object in the sample region. As a result, there can be a need to identify corresponding frequencies. The identification of corresponding frequencies can be performed such that the corresponding frequencies are frequencies from the same reflecting object within a sample region. The data period labeled $DP_3$ can be used to find the corresponding frequencies. LIDAR data can be generated for each pair of corresponding frequencies and is considered and/or processed as the LIDAR data for the different reflecting objects in the sample region.

An example of the identification of corresponding frequencies uses a LIDAR system where the cycles include three data periods ($DP_1$, $DP_2$, and $DP_3$) as shown in FIG. 10C. When there are two objects in a sample region illuminated by the LIDAR outputs signal, the transform component outputs two different frequencies for $f_{ub}$: $f_{u1}$ and $f_{u2}$ during $DP_1$ and another two different frequencies for $f_{db}$: $f_{d1}$ and $f_{d2}$ during $DP_2$. In this instance, the possible frequency pairings are: ($f_{d1}$, $f_{u1}$); ($f_{d1}$, $f_{u2}$); ($f_{d2}$, $f_{u1}$); and ($f_{d2}$, $f_{du2}$). A value of $f_d$ and τ can be calculated for each of the possible frequency pairings. Each pair of values for fa and i can be substituted into $f_3=-f_d+\alpha_3\tau_0$ to generate a theoretical $f_3$ for each of the possible frequency pairings. The value of $\alpha_3$ is different from the value of α used in $DP_1$ and $DP_2$. In FIG. 10C, the value of $\alpha_3$ is zero. In this case, the transform component also outputs two values for $f_3$ that are each associated with one of the objects in the sample region. The frequency pair with a theoretical $f_3$ value closest to each of the actual $f_3$ values is considered a corresponding pair. LIDAR data can be generated for each of the corresponding pairs as described above and is considered and/or processed as the LIDAR data for a different one of the reflecting objects in the sample region. Each set of corresponding frequencies can be used in the above equations to generate LIDAR data. The generated LIDAR data will be for one of the objects in the sample region. As a result, multiple different LIDAR data values can be generated for a sample region where each of the different LIDAR data values corresponds to a different one of the objects in the sample region The processing components in FIG. 1A and FIG. 1B receive a series of comparative signals that carry different channels and are accordingly from different sample regions. As a result, the processing components in FIG. 1A and FIG. 1B provide LIDAR data for series of sample regions that were illuminated by system output signals carrying different channels. The series of sample regions for which the processing component provides LIDAR data can be the same as the series of sample regions that were illuminated. The processing component configuration of FIG. 10A through FIG. 10C can also be used for the processing components of FIG. 10C. However, the processing components 28 of FIG. 1C receive comparative signals that carry only one of the channels. As a result, when the processing components 28 in FIG. 1A and FIG. 1B processing component configuration of FIG. 10A through FIG. 10C, each of the processing components provides LIDAR data for a series of sample regions that were illuminated by the system output signal carrying only one of the channels.

Figure 10D:
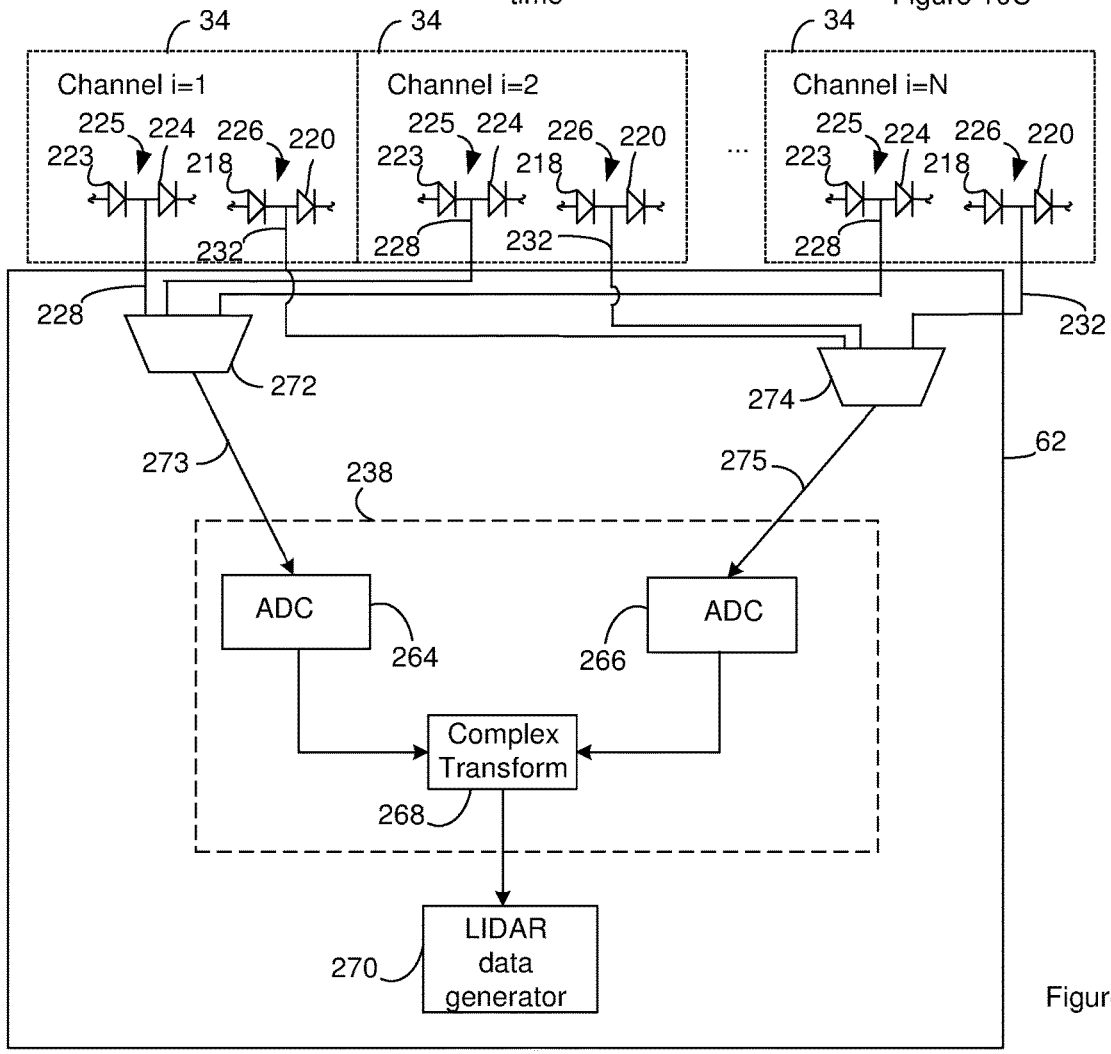
FIG. 10D is a schematic of a relationship between light sensors included in the LIDAR system and electronics included in the imaging system.

In the LIDAR system of FIG. 1C, the electronics from different processing components 28 can be combined so that beating signals are combined electronically rather than optically. For instance, each of the processing components 28 can include the optical-to-electrical assembly of FIG. 10A. FIG. 10D is a schematic of the relationship between the first light sensor 223, the second light sensor 224, the first auxiliary light sensor 218, and the second auxiliary light sensor 220 in each of the optical-to-electrical assemblies from FIG. 10A and the electronics. Since each of the different processing components 28 receives a LIDAR input signal carrying a different channel, FIG. 10D illustrates the first light sensor 223, the second light sensor 224, the first auxiliary light sensor 218, and the second auxiliary light sensor 220 associated with the channel received by the light sensor.

The first data lines 228 from each of the different first balanced detectors 225 carries the first data signal to a first electrical multiplexer 272. The first electrical multiplexer 272 outputs the first data signals from different first data lines 228 on a common data line 273. Since system output signals that carry different channels are serially output from the LIDAR system, the first LIDAR input signals that carry different channels are serially received on the first input waveguides 16 and the first LIDAR input signals that carry different channels are received on different first input waveguides 16. As a result, the processing component 28 configured to receive the first comparative signal carrying channel i receives the first comparative signal in response to the signal directing component 14 being operated such that the system output signal carrying channel i is output from the LIDAR system. Additionally, processing component(s) 28 that are not configured to receive the first comparative signal carrying channel i do not substantially receive a first comparative signal in response to the signal directing component 14 being operated such that the system output signal carrying channel i is output from the LIDAR system. Since the system output signals that carry different channels are serially output from the LIDAR system, the first comparative signals carrying different channels are serially received at different processing component(s) 28 although there may be some overlap of different channels that occurs. Since the processing component(s) 28 serially receive the first comparative signals carrying different channels, the first common data line 273 carries first data signals that carry different channels in series. There may be some short term overlap between channels in the series of first data signals, however, the overlap does not occur in the data windows illustrated in FIG. 10C. The first common data line 273 carries the series of first data signals to the first Analog-to-Digital Converter (ADC) 264.

The second data lines 232 from each of the different second balanced detectors 226 carries the second data signal to a second electrical multiplexer 274. The second electrical multiplexer 274 outputs the second data signals from different second data line 232 on a second common data line 275. As noted above, the processing component(s) 28 serially receive the first comparative signals carrying different channels. As a result, the second common data line 275 carries second data signals that carry different channels in series. There may be some short term overlap between channels in the series of second data signals, however, the overlap does not occur during the data windows illustrated in FIG. 10C. The second common data line 275 carries the series of second data signals to the second Analog-to-Digital Converter (ADC) 266.

The transform mechanism 238 and LIDAR data generator 270 of FIG. 10D can be operated as disclosed in the context of FIG. 10A through FIG. 10C. For instance, the first Analog-to-Digital Converter (ADC) 264 converts the first data signal from an analog form to a digital form and outputs the first digital data signal. The second Analog-to-Digital Converter (ADC) 266 converts the second data signal from an analog form to a digital form and outputs a second digital data signal.

A first digital data signal and the second digital data signal carrying the same channel act together as a complex signal where the first digital data signal acts as the real component of the complex signal and the second digital data signal acts as the imaginary component of the complex data signal. The electronics are configured such that the first digital data signals and the second digital data signals carrying the same channel are concurrently received by the LIDAR data generator 270. As a result, the LIDAR data generator 270 receives a complex signals that carries different channels in series. The LIDAR data generator 270 can generate LIDAR data for each of the different channels. As a result, the data generator 270 can generate LIDAR data for each sample region that is illuminated by the system output signals carrying the series of channels.

In another embodiment of a LIDAR system where the relationship between sensors in the optical-to-electrical assembly from FIG. 10A and electronics in the LIDAR system is constructed according to FIG. 10D, the electronics operate the electrical multiplexers as a switch that can be operated by the electronics. As a result, the electronics can operate the first electrical multiplexer 272 so as select which of the first data signals are output on the common data line 273 and can operate the second electrical multiplexer 274 so as select which of the second data signals are output on the second common data line 275. As a result, the LIDAR system can be configured to concurrently output the system output signals that carry different channels. For instance, the LIDAR chip can be configured to concurrently output each of the LIDAR output signals carrying the different channels. As, the signal directing component 14 can be configured to direct the outgoing LIDAR system to one or more than one of the alternate waveguides 16. In an example where the signal directing component 14 is configured to direct the outgoing LIDAR system all N of the alternate waveguides 16, the signal directing component can be a signal splitter.

When the LIDAR system concurrently outputs system output signals that carry different channels, each of the different processing components 28 can concurrently receive a first LIDAR input signal carrying one of the channels. Accordingly, the first data lines 228 from each of the different processing components 28 concurrently carries the first data signal to the first electrical multiplexer 272. As a result, the first electrical multiplexer 272 concurrently receives multiple first data signals that each carries a different channels and is from a different processing component 28. The electronics use the switching functionality of the first electrical multiplexer 272 to operate the first electrical multiplexer 272 such that the first electrical multiplexer 272 outputs the first data signals carrying different channels in series. As a result, the first common data line 273 carries first data signals that carry different channels in series. An example of a suitable channel series, includes, but is not limited to, the sequence of channels having channel index i=1 through N from i=1 in the numerical sequence from i=1 through to i=N.

The second data lines 232 from each of the different processing components 28 concurrently carries a second data signal to the second electrical multiplexer 274. As a result, the second electrical multiplexer 274 concurrently receives multiple second data signals that each carries a different channels and is from a different processing component 28. The electronics use the switching functionality of the second electrical multiplexer 274 to operate the second electrical multiplexer 274 such that the second electrical multiplexer 274 outputs the second data signals carrying different channels in series. As a result, the second data line 275 carries second data signals that carry different channels in series.

The transform mechanism 238 and LIDAR data generator 270 of FIG. 10D can be operated as disclosed in the context of FIG. 10A through FIG. 10C. For instance, the first Analog-to-Digital Converter (ADC) 264 converts the first data signal from an analog form to a digital form and outputs the first digital data signal. The second Analog-to-Digital Converter (ADC) 266 converts the second data signal from an analog form to a digital form and outputs a second digital data signal.

The first electrical multiplexer 272 and the second electrical multiplexer 274 are operated such that the first data line 273 and the second data line 275 concurrently carry the same channel. As a result, the first digital data signal and the second digital data signal output from the first Analog-to-Digital Converter (ADC) 264 and the second Analog-to-Digital Converter (ADC) 266 concurrently carry the same channel. The first digital data signal and the second digital data signal carrying the same channel act together as a complex signal where the first digital data signal acts as the real component of the complex signal and the second digital data signal acts as the imaginary component of the complex data signal. The first digital data signals and the second digital data signals carrying the same channel are concurrently received by the LIDAR data generator 270. As a result, the LIDAR data generator 270 receives a complex signals that carries different channels in series. The LIDAR data generator 270 can generate LIDAR data for each of the channel in the series of channels. As a result, the data generator 270 can generate LIDAR data for each sample region that is illuminated by the system output signals carrying the series of channels.

When the LIDAR system concurrently outputs system output signals that carry different channels as described above, the system output signals travel away from the LIDAR system in different directions. As a result, the field of view will have multiple different sample regions that are concurrently illuminated by a different one of the different system output signals. As an example, FIG. 9C has sample regions illustrated with dashed lines and labeled $gSR_{c1}$ and $gSR_{c2}$. The sample regions labeled $gSR_{c1}$ and $gSR_{c2}$ are illuminated concurrently with the sample regions labeled $rSR_{c3}$. However, the operation of the first electrical multiplexer 272 and the second electrical multiplexer 274 selects which channel is received by the LIDAR data generator 270. When the LIDAR data generator 270 receives the signals generated from illumination of the sample region labeled $rSR_{c3}$, the LIDAR data generator 270 does not receive signals generated from illumination of the sample regions labeled $gSR_{c1}$ and $gSR_{c2}$. As a result, the LIDAR data generator 270 generates LIDAR data results for the sample region labeled $rSR_{c3}$ but does not generate LIDAR data results for the sample regions labeled $gSR_{c1}$ and $gSR_{c2}$ and these sample regions effectively become ghost sample regions. As a result, the one or more electrical multiplexers included in the LIDAR system selects the sample region for which the LIDAR data results will be generated rather than the output from the signal directing component 14 selecting the sample region for which the LIDAR data results will be generated.

Figure 11A:
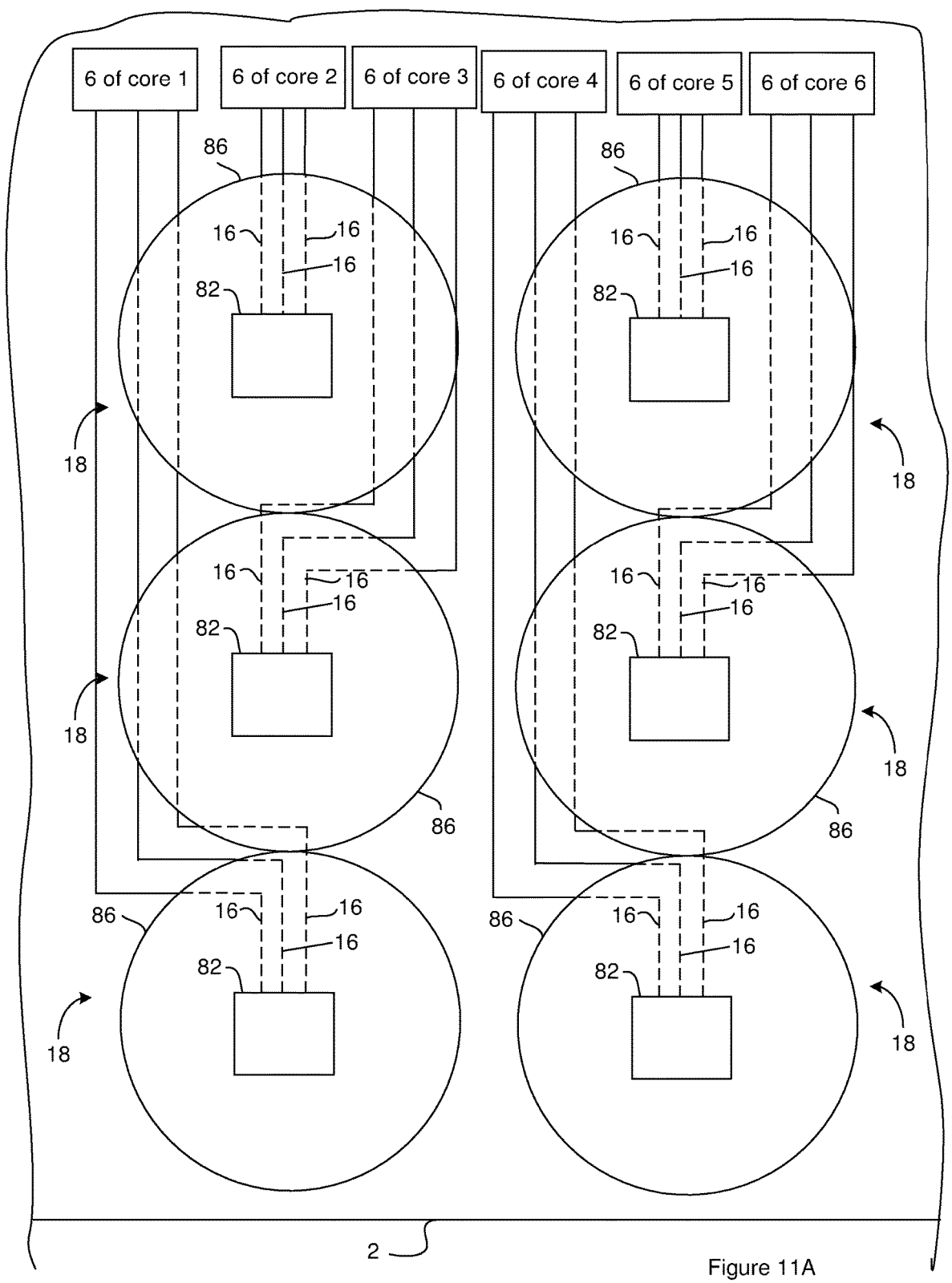
FIG. 11A is a topview of a portion of a photonic circuit chip having six different cores that can each be constructed according to FIG. 1A.

The LIDAR chips of FIG. 1A through FIG. 1C illustrate a single LIDAR core 4 on the LIDAR chip, however, the LIDAR chip can include multiple LIDAR cores. A LIDAR chip with multiple LIDAR cores 4 can have the ports 18 arranged in a one-dimensional array or a two-dimensional array. As an example, FIG. 11A illustrates a LIDAR chip having six different cores that can each be constructed according to FIG. 1A. Each of the ports 18 is shown as being constructed according to FIG. 2A. The ports 18 from different cores are arranged in a 2×3 array. Each of the ports exchanges light signals with alternate waveguides 16. The alternate waveguides 16 from the same core also exchange light signals with the beat signal generation section 6 from one of the cores. As a result, the LIDAR chip can concurrently generate LIDAR data for the sample regions in 6 different fields of view. Further, electronics can stitch together the fields of view from different cores to develop a composite field of view for the LIDAR system.

Although FIG. 11A shows the ports 18 periodically spaced in one dimension, the ports 18 can be periodically spaced in multiple dimensions. In some instances, the ports 18 are arranged in a C×R array and C is greater than or equal to 2, 4, or 8 and less than or equal to 32, 64, or 128 and/or R is greater than or equal to 2, 4 or 8 and less than or equal to 64, 32, or 128.

Figure 11B:
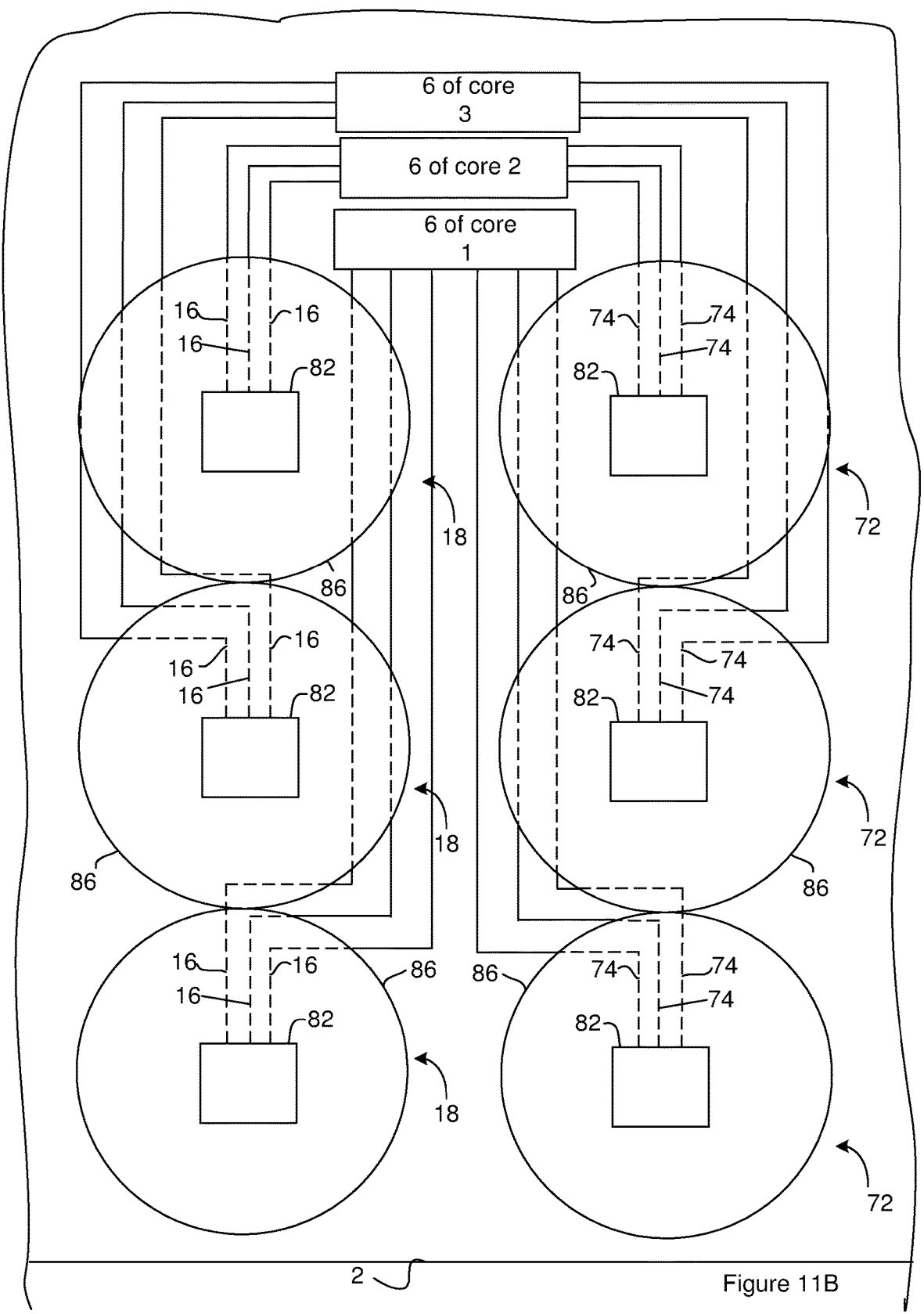
FIG. 11B is a topview of a portion of a photonic circuit chip having three different cores that can each be constructed according to FIG. 1B or FIG. 1C.

FIG. 11B illustrates a LIDAR chip having three different cores that can each be constructed according to FIG. 1B or FIG. 1C. As a result, each of the cores includes a port 18 and an input port 72. Each of the ports 18 and input ports 72 is shown as being constructed according to FIG. 2A. Each of the input ports 72 exchanges light signals with input waveguides 74. The alternate waveguides 16 and input waveguides 74 from the same core also exchange light signals with the beat signal generation section 6 from the associated core. As a result, the LIDAR chip can concurrently generate LIDAR data for the sample regions in three different fields of view. Although FIG. 11A shows the ports 18 periodically spaced in one dimension, the ports 18 can be periodically spaced in multiple dimensions. Additionally or alternately, although FIG. 11A shows the input ports 72 periodically spaced in one dimension, the input ports 72 can be periodically spaced in multiple dimensions.

When pairs of ports 18 and the corresponding input ports 72 are arranged in a C'×R' array, in some instances, C' is greater than or equal to 2, 4, or 8 and less than or equal to 64, 32, or 128 and/or R' is greater than or equal to 2, 4, or 8 and less than or equal to 64, 32, or 128. In the example of FIG. 11B, the C' is 1 and R' is 3. A C'×R' array can have the ports 18 arranged in a C×R array and/or can have the input ports 72 arranged in a C×R array. In the C'×R' of FIG. 11B, the ports 18 are arranged in a 1×3 array and the input ports 72 are arranged in a 1×3 array.

Figure 12:
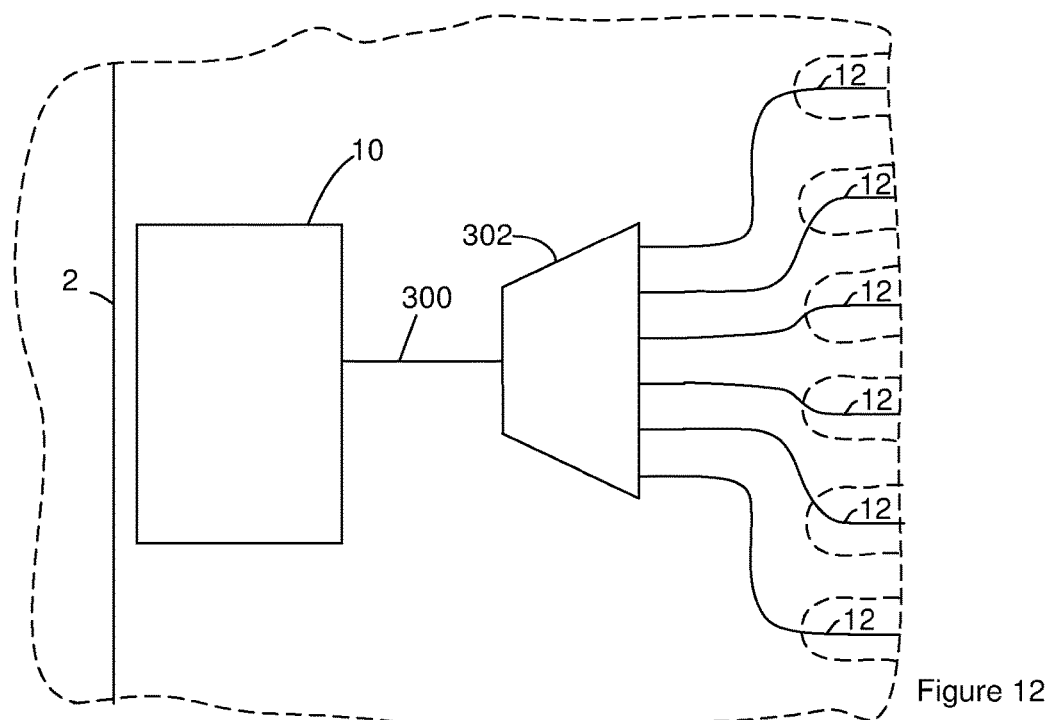
FIG. 12 is a schematic of a light source suitable for use with an imaging system having a photonic circuit chip with multiple cores.

When a LIDAR chip includes multiple cores 4, each of the cores 4 can have a light source 10 as illustrated in FIG. 1A through FIG. 1C. Alternately, a light source can be the source of the outgoing LIDAR signal in multiple different cores 4. FIG. 12 illustrates a portion of a LIDAR chip having multiple different cores 4. A light source 10 outputs a common signal on a common waveguide 300. The common waveguide carries the common signal to a signal splitter 302. The signal splitter 302 outputs multiple outgoing LIDAR signals that are each received at by a utility waveguide from a different one of the cores 4.

The signal splitter 302 can be a wavelength independent splitter such as an optical coupler, Y-junction, MMIs, cascaded evanescent optical couplers, and cascaded y-junctions. As a result, each of the outgoing LIDAR signals can have the same or substantially the same wavelength distribution. Accordingly, the system output signal from different cores 4 can have the same or substantially the same waveguide distribution. Alternately, the signal splitter 302 can be a wavelength independent splitter such as a demultiplexer. Suitable demultiplexers include, but are not limited to, arrayed waveguide gratings and echelle gratings. When the signal splitter 302 is a wavelength independent splitter, the outgoing LIDAR signals received by different cores can have different wavelength distributions. For instance, the utility outgoing LIDAR signals in different cores can carry different wavelength channels. As a result, the system output signals from different cores 4 can have the same or substantially the same waveguide distribution.

Figure 13A:
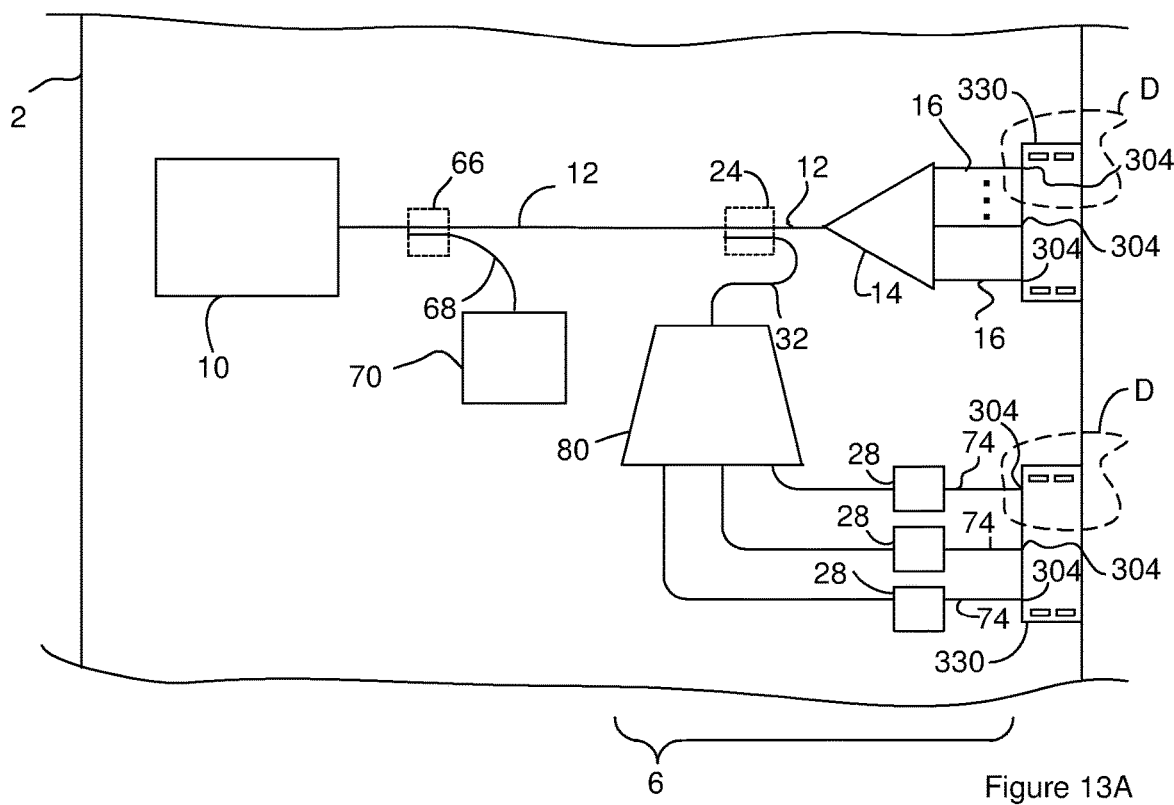

Although FIG. 1A through FIG. 1C show the beat signal generation section 6 and the transfer section 8 on the same chip, the beat signal generation section 6 and the transfer section 8 can be on separate chips. For instance, the beat signal generation section 6 can be included on a beat signal generation chip and the transfer section 8 can be included on a transfer chip. As an example, FIG. 13A illustrates a beat signal generation chip that include the beat signal generation section 6 from the core 4 disclosed in the context of FIG. 1C. The alternate waveguides 16 terminate at a facet 304 through which light signals can enter and/or exit from the beat signal generation chip. Additionally, the input waveguides 74 terminate at a facet 304 through which light signals can enter and/or exit from the beat signal generation chip.

Although beat signal generation chip of FIG. 13A shows a single core on the chip, beat signal generation chip can include multiple cores. As an example, FIG. 13B shows a portion of a beat signal generation chip that includes six cores where each core includes three alternate waveguides 16. The alternate waveguides 16 from different cores terminate at a facet 304.

Figure 13C:
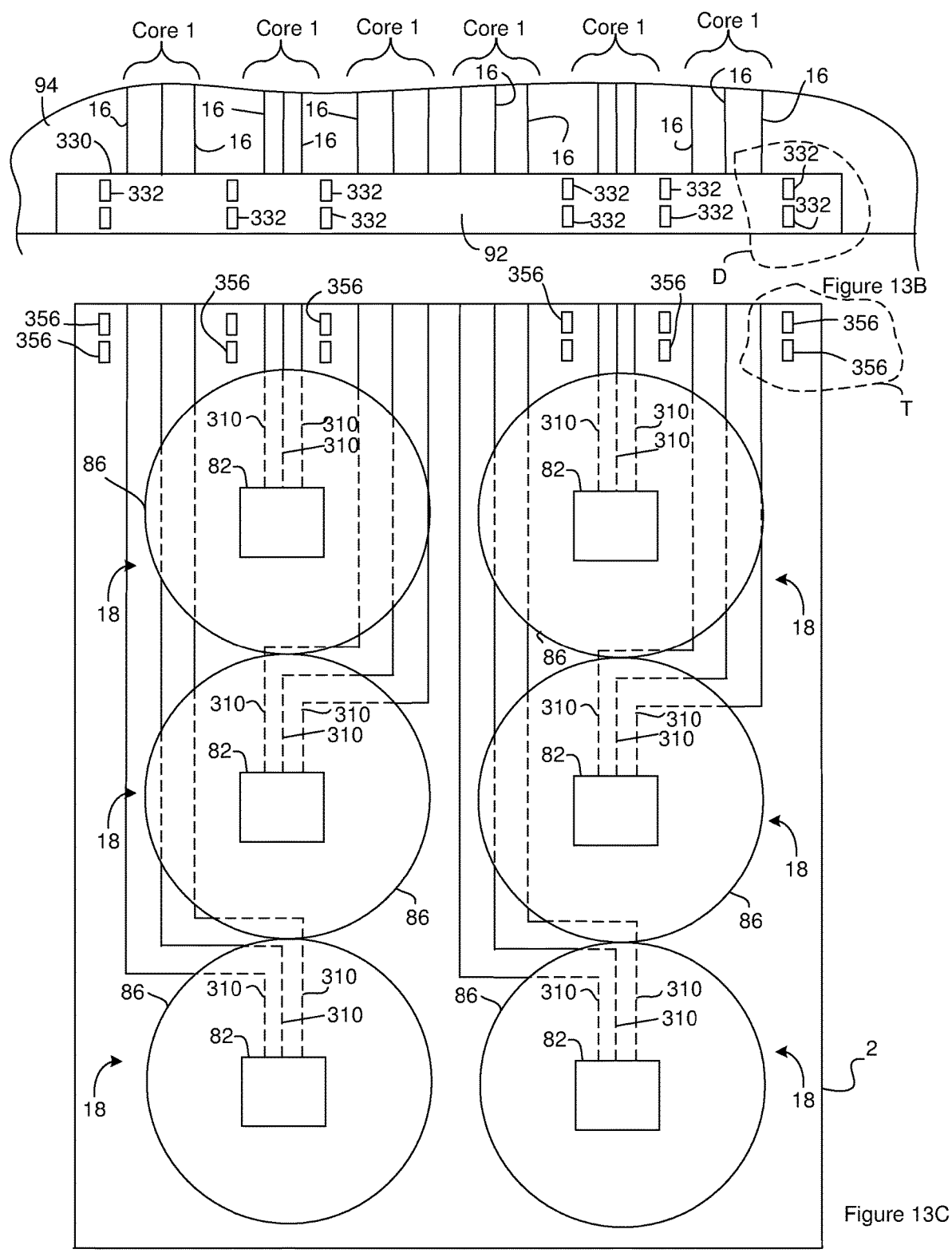

FIG. 13C illustrates an example of a transfer chip. For instance, FIG. 13C is a topview of a chip that includes ports 18 arranged as shown in FIG. 11A. The portion of the alternate waveguide shown in FIG. 1A through FIG. 1C that is located on the transfer chip serves as a second alternate waveguides 310. The second alternate waveguides 310 terminate at a facet 304 located at an edge of the transfer chip.

Figure 13D:
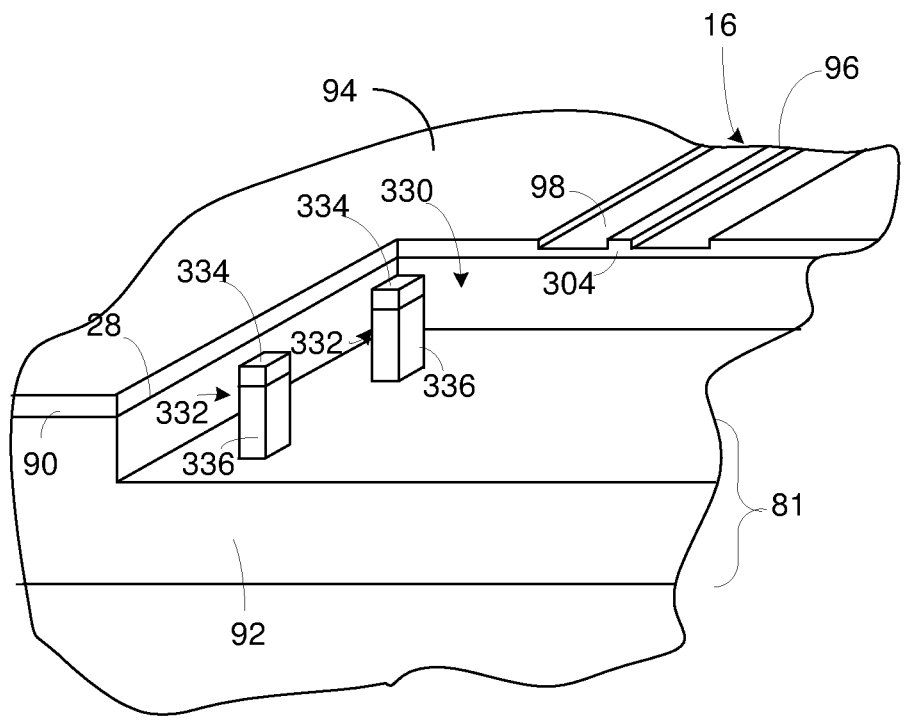

FIG. 13D is a perspective view of a portion of the beat signal generation chip shown in FIG. 13A or FIG. 13B. For instance, FIG. 13D can represent the portion of the signal generation chips labeled D in FIG. 13A or FIG. 13B. The signal generation chip is constructed on a silicon-on-insulator wafer. The illustrated portion of the beat signal generation chip includes a stop recess 330 sized to receive an edge of the transfer chip. The stop recess 330 extends through the light-transmitting medium 94 and into the base 81. In the illustrated version, the stop recess 330 extends through the light-transmitting medium 94, the buried layer 90, and into the substrate 92.

The facets 304 on the beat signal generation chip are positioned such that a light signal that exits the alternate waveguide 304 though the facet 304 can be received by a transfer chip positioned in the stop recess 330. Although not shown, the facet 304 of the alternate waveguide 16 can include an anti-reflective coating. A suitable anti-reflective coating includes, but is not limited to, single-layer coatings such as silicon nitride or aluminum oxide, or multilayer coatings, which may contain silicon nitride, aluminum oxide, and/or silica.

One or more stops 332 extend upward from a bottom of the stop recess 330. For instance, FIG. 13D illustrates two stops 332 extending upward from the bottom of the stop recess 330. The stops 332 include a cladding 334 positioned on a base portion 336. The substrate 92 can serve as the base portion 336 of the stops 332 and the stop 332 can exclude the buried layer 92. The portion of the substrate 92 included in the stops 332 can extend from the bottom of the stop recess 330 up to the level of the buried layer 90. For instance, the stops 332 can be formed by etching through the buried layer 90 and using the underlying substrate 92 as an etch-stop. As a result, the location of the top of the base portion 336 relative to the optical mode of a light signal in the alternate waveguide 16 is well known because the buried layer 90 defines the bottom of the alternate waveguide 16 and the top of the base portion 336 is located immediately below the buried layer 90. The cladding 334 can be formed on the base portion 336 of the stops 332 so as to provide the stops 332 with a height that will provide the desired alignment between the alternate waveguide 16 and a second alternate waveguide 310 on the transfer chip.

Figure 13E:
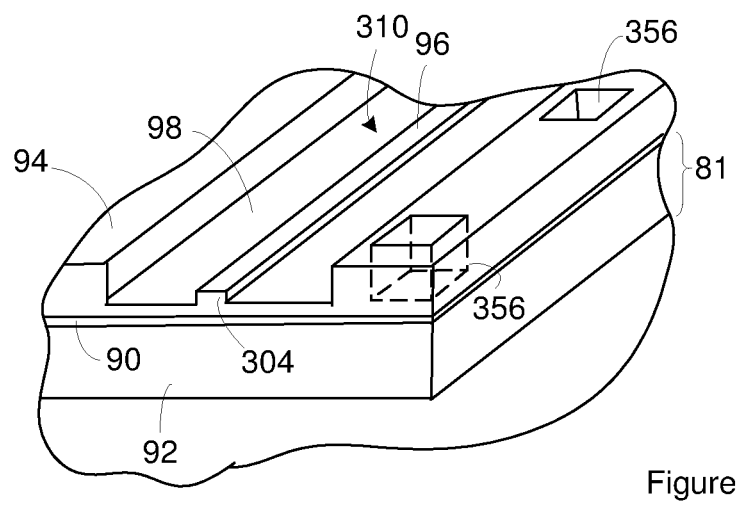

FIG. 13E is a perspective view of a portion of a transfer chip. For instance, FIG. 13C can represent the portion of the transfer chip labeled T in FIG. 13C. The transfer chip built on a silicon-on-insulator platform. FIG. 13E includes detail that is not evident in FIG. 13C. For instance, the slab regions 98 that define the second alternate waveguides 310 are not shown in FIG. 13C in order to reduce the complexity of the image.

Although not shown, the facet 304 of the second alternate waveguides 310 can optionally include an anti-reflective coating. A suitable anti-reflective coating includes, but is not limited to, single-layer coatings such as silicon nitride or aluminum oxide, or multilayer coatings that may contain silicon nitride, aluminum oxide, and/or silica.

The transfer chip also includes one or more alignment recesses 356 that are sized to receive the stops 332 from the beat signal generation chip. The dashed lines in FIG. 13E show the depth and shape of one of the alignment recesses 356. In some instances, the alignment recesses 356 extend down to the buried layer 90. When the alignment recesses 356 extends down to the buried layer 90 the alignment recesses 356 can be formed by etching into the light-transmitting medium 94 using an etch where the buried layer 90 acts as an etch stop. In some instances, the alignment recesses 356 extend through the buried layer 90 to the top of the substrate 92. When the alignment recesses 356 extend through to the buried layer 90, the alignment recesses 356 can be formed by etching through the buried layer 90 using an etch where the material of the substrate 92 acts as an etch stop. Whether the alignment recesses 356 extend down to the buried layer 90 or down to the substrate 92, the depth of the alignment recesses 956 is not dependent on etch duration or other variables, and is accordingly consistent between different transfer chips. Additionally, since the alignment recesses 356 extend down to the buried layer 90 or down to the top of the substrate 94, the position of the bottom of the alignment recesses 356 relative to the optical mode of a light signal in the second alternate waveguide 310 is well known because the buried layer 90 defines the bottom of the second alternate waveguide 310. As a result, the recesses are suitable for achieving vertical alignment of the transfer chip relative to the beat signal generation chip.

Figure 13F:
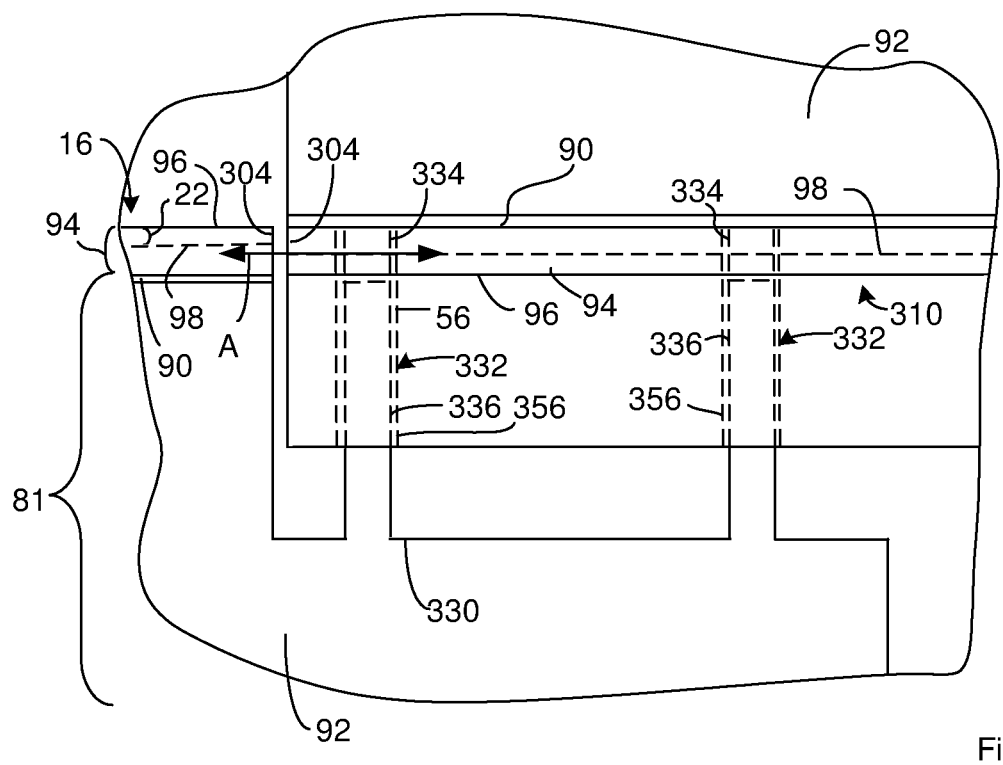

The transfer chip can be flip-chip mounted on the beat signal generation chip. For instance, FIG. 13F illustrates an interface between a transfer chip constructed according to FIG. 13E and a signal generation chip constructed according to FIG. 13D. FIG. 13F is a cross section of the system taken through an alternate waveguide 16 on the beat signal generation chip and a second alternate waveguide 310 on the transfer chip. FIG. 13F includes dashed lines that illustrate features that are located behind other features in the system. For instance, FIG. 13F includes dashed lines that illustrate the locations of the portion of the stops 332 and alignment recesses 356 located behind the ridge 96 of the second alternate waveguide 310. FIG. 13F also includes dashed lines that illustrate the location where the ridge 96 of the alternate waveguide 16 interfaces with slab regions 98 on the beat signal generation chip and dashed lines that illustrate the location where the ridge 96 of the second alternate waveguide 310 interfaces with slab regions 98 of the transfer chip.

The transfer chip is positioned in the stop recess 330 on the beat signal generation chip. The transfer chip is positioned such that the second alternate waveguide 310 is located between the base 81 of the transfer chip and the base 81 of the beat signal generation chip. Accordingly, the transfer chip is inverted in the stop recess 330. Solder or other adhesive can be used to immobilize the transfer chip relative to the beat signal generation chip.

The facet 304 of the alternate waveguide 16 is aligned with the facet 304 of the second alternate waveguide 310 such that the alternate waveguide 16 and the second alternate waveguide 310 can exchange light signals. As shown by the line labeled A, the system provides a horizontal transition path in that the direction that the light signal travels when between the beat signal generation chip and the transfer chip is horizontal or is substantially horizontal. The horizontal direction can be a result of the facet 304 of the alternate waveguide 16 being perpendicular to the base 81 of the beat signal generation chip or substantially perpendicular to the base 81 of the beat signal generation chip and/or the facet 304 of the second alternate waveguide 310 being perpendicular to the base 81 of the transfer chip or substantially perpendicular to the base 81 of the transfer chip. In some instances, the facet 304 of the second alternate waveguide 310 is also perpendicular to the base 81 of the beat signal generation chip or substantially perpendicular to the base 81 of the beat signal generation chip. A top of the facet 304 of the second alternate waveguide 310 is at a level that is below the top of the facet 304 of the alternate waveguide 16. For instance, the facet 304 of the alternate waveguide 16 and first facet 304 of the second alternate waveguide 310 each have a height above a horizontal plane on the beat signal generation chip. The height of the top of the facet 304 of the alternate waveguide 16 relative to the plane is more than the height of the top of the facet 304 of the second alternate waveguide 310 relative to the plane. Examples of the horizontal plane of the beat signal generation chip include the topside of the base 81, the bottom side of the base 91, the topside of the substrate 92, and/or the bottom side of the substrate 92.

The facet 304 of the alternate waveguide 16 can be perpendicular or substantially perpendicular to the base 81 of the beat signal generation chip. Although not shown, the facet 304 of the alternate waveguide 16 can also be angled at less than 90 degrees relative to the direction or propagation of a light signal in the alternate waveguide 16. An angle of less than 90 degrees can reduce the effects of back reflection in the alternate waveguide 16. The facet 304 of the second alternate waveguide 310 can be perpendicular or substantially perpendicular to the base 81 of the transfer chip and/or the base 81 of the beat signal generation chip. Although not shown, the facet 304 of the second alternate waveguide 310 can also be angled at less than 90 degrees relative to the direction or propagation of a light signal in the second alternate waveguide 310. An angle of less than 90 degrees can reduce the effects of back reflection in the second alternate waveguide 310.

The one or more stops 332 3 on the beat signal generation chip are each received within one of the alignment recesses 356 on the transfer chip. The top of each stop 332 contacts the bottom of the alignment recess 356. As a result, the interaction between stops 332 and the bottom of the alignment recesses 356 prevent additional movement of the transfer chip toward the beat signal generation chip. In some instances, the transfer chip rests on top of the stops 332.

As is evident from FIG. 13F, the facet 304 of the transfer chip is vertically aligned with the facet 304 of the alternate waveguide 16 on the beat signal generation chip. Additionally, the facet 304 of the transfer chip is horizontally aligned with the facet 304 of the alternate waveguide 16 on the beat signal generation chip. The horizontal alignment can be achieved by alignment of marks (not shown) and/or features on the transfer chip and the beat signal generation chip. As a result, the second alternate waveguide 310 on the transfer chip and the alternate waveguide 16 on the beat signal generation chip can exchange light signals.

The vertical alignment can be achieved by controlling the height of the stops 332 on the beat signal generation chip. For instance, the cladding 334 on the base portion 336 of the stops 332 can be grown to the height that places the first facet 304 of the second alternate waveguide 310 at a particular height relative to the facet 304 of the alternate waveguide 16 on the beat signal generation chip. As noted above, the position of the bottom of the alignment recess 356 relative to the first facet 304 and/or optical mode of the second alternate waveguide 310 is known. Additionally, the position of the tops of the base portion 336 of the stops 332 relative to the alternate waveguide 16 and/or optical mode in the alternate waveguide 16 is also known. This information can be used to determine the thickness of the cladding 334 that will provide the second alternate waveguide 310 with the desired vertical location relative to the alternate waveguide 16. The desired cladding 334 thickness can be accurately achieved by using deposition techniques such as evaporation, plasma enhanced chemical vapor deposition (PECVD), and/or sputtering to deposit the one or more cladding layers. As a result, one or more cladding layers can be deposited on the base portion 336 of the stops 332 so as to form the stops 332 to a height that provides the desired vertical alignment. Suitable materials for layers of the cladding 334 include, but are not limited to, silica, silicon nitride, and polymers.

The above illustrations show the transfer chip located at an edge of the beat signal generation chip. However, a transfer chip can be centrally located on the beat signal generation chip.

Although the flip chip interface between the transfer chip and the beat signal generation chip has the transfer chip received in a stop recess 330 on the beat signal generation chip, the arrangement can be reversed. For instance, the transfer chip can have the stop recess 330 and the beat signal generation chip can be received in the stop recess 330 on the transfer chip.

Although the interface between the transfer chip and the beat signal generation chip is disclosed in the context of a portion of each alternate waveguide 16 from the LIDAR chips disclosed in FIG. 1A through FIG. 1C being divided between the transfer chip and the beat signal generation chip, the disclosed interface can be applied to the input waveguides 74. For instance, a first portion of each input waveguide can be positioned on the beat signal generation chip and another portion of each input waveguide can be positioned on the transfer chip. The interface between the different portions of the input waveguides can be constructed as disclosed in the context of FIG. 13A through FIG. 13F.

The use of a transfer chip and a beat signal generation chip may be desired when the alternate waveguides 16 and/or input waveguides 74 include a taper 112 as disclosed in the context of FIG. 5A through FIG. 5C. Chips that have tapers in combination with the other components of the photonic circuits disclosed in the context of FIG. 1A through FIG. 1C can be difficult to fabricate. The use of a transfer chip allows the tapers to be fabricated separately from the other components of the photonic circuit and accordingly simplifies the fabrication of the LIDAR chip.

Figure 14:
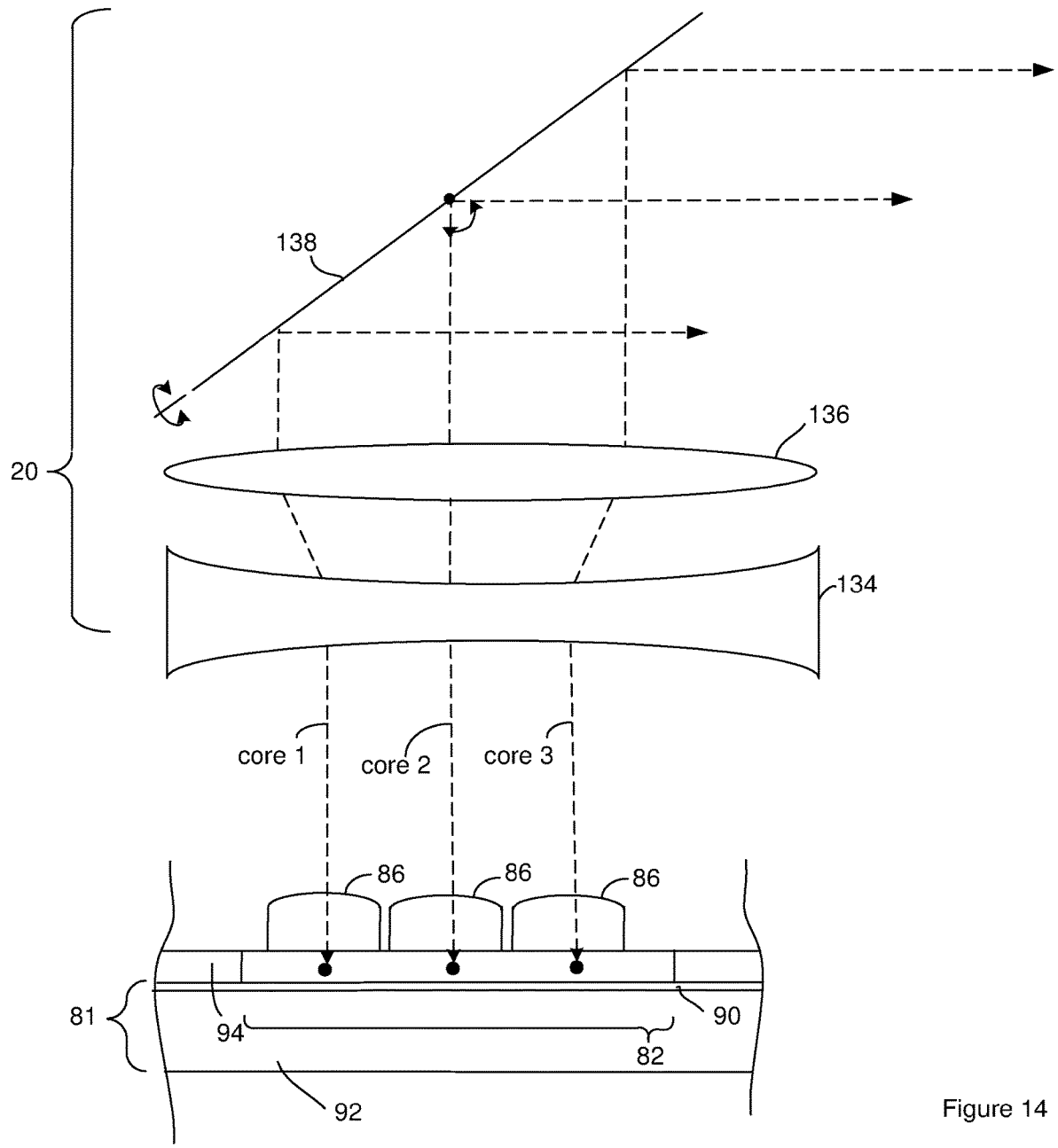
FIG. 14 illustrates an imaging system having optical components that exchange light signals with multiple different cores on a photonic circuit chip.
Figure 15:
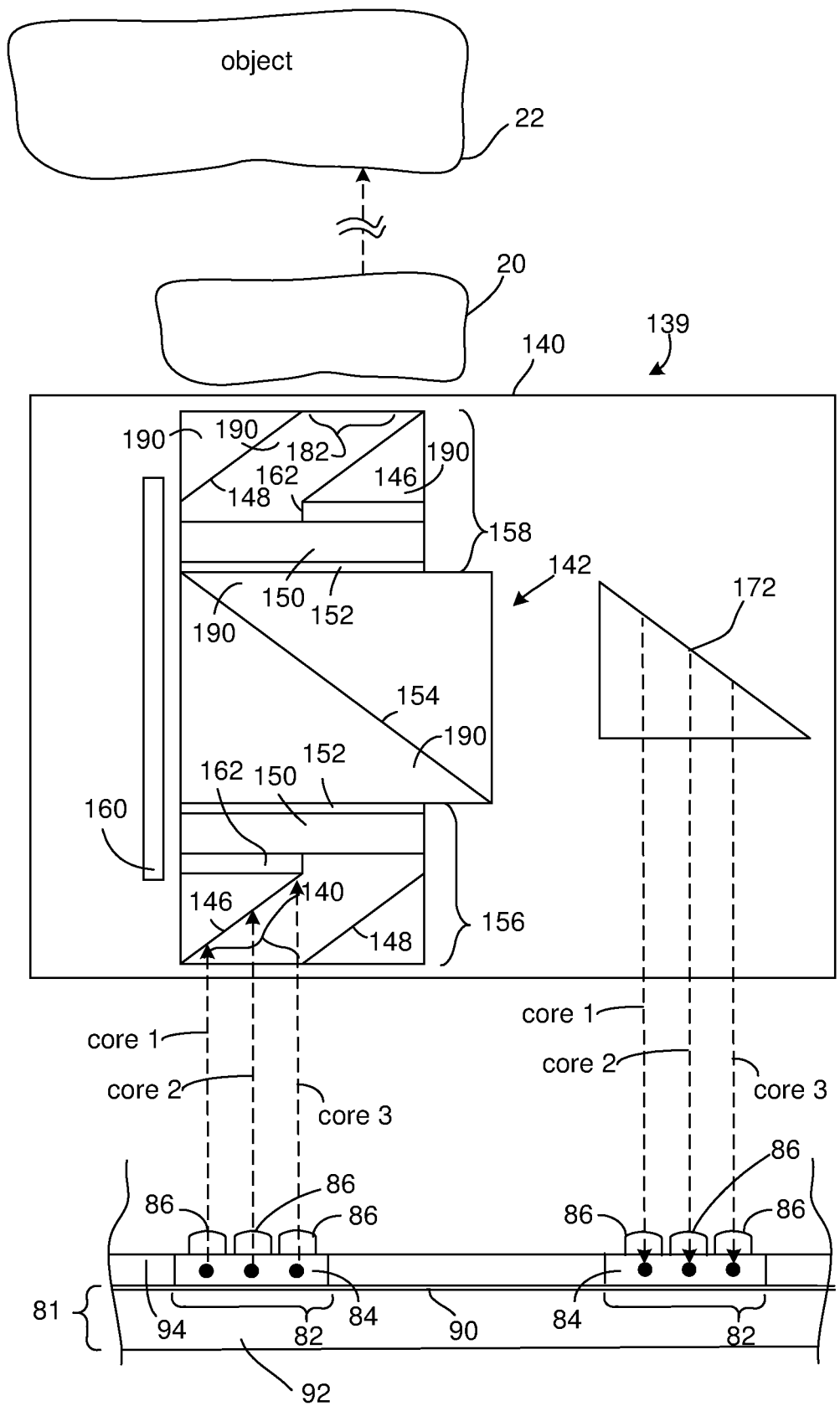
FIG. 15 illustrates another embodiment of an imaging system having optical components that exchange light signals with multiple different cores on a photonic circuit chip.

FIG. 7 and FIG. 8 illustrate the optical components 20 exchanging light signals with a single one of the cores. However, when a LIDAR chip includes multiple cores, the one or more optical components 20 can exchange light signals with all or a portion of the cores. As an example, FIG. 14 illustrates FIG. 7 modified such that the beam shaper 134, collimator 136, and one or more beam steering components 138 exchange light signals with multiple different cores on a LIDAR chip. As another example, FIG. 15 illustrates FIG. 8 modified such that the adapter exchanges light signals with all or a portion of the cores on a LIDAR chip. As a result, the one or more optical components 20 can exchange light signals with ports 18 arranged in a one-dimensional or two-dimensional array and/or with input ports 74 arranged in a one-dimensional or two-dimensional array.

When a LIDAR chip includes multiple cores, each of the different cores can have a different redirection component 82. Alternately, the LIDAR chip can include one or more redirection components 82 that receives light signals from different cores and/or receives light signals for different cores. For instance, FIG. 14 and FIG. 15 illustrate two redirection component 82 that each receives light signals from different cores and/or receives light signals for different cores. For instance, FIG. 15 illustrates a LIDAR chip that includes a redirection component 82 that receives outgoing LIDAR signal from different cores and a redirection component 82 that receives incoming LIDAR signal for different cores.

FIG. 16A through FIG. 16E illustrate an example of a suitable construction for an interface between a redirection component and a waveguide taper. The illustrated interface would be suitable for use as an interface between a redirection component 82 and a taper 112 of as disclosed in the context of FIG. 5A through FIG. 5C.

Figure 16A:
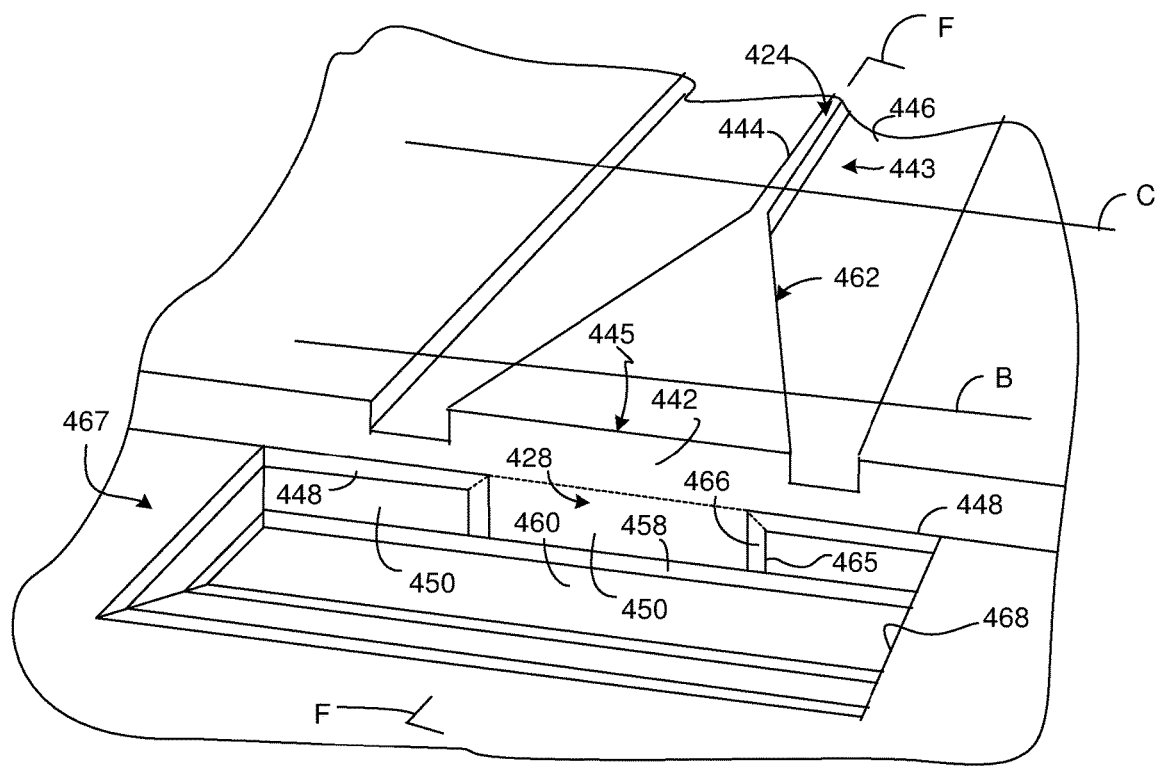
FIG. 16A through FIG. 16E illustrate an example of a suitable construction for an interface between a redirection component and a waveguide taper.
Figure 16B:
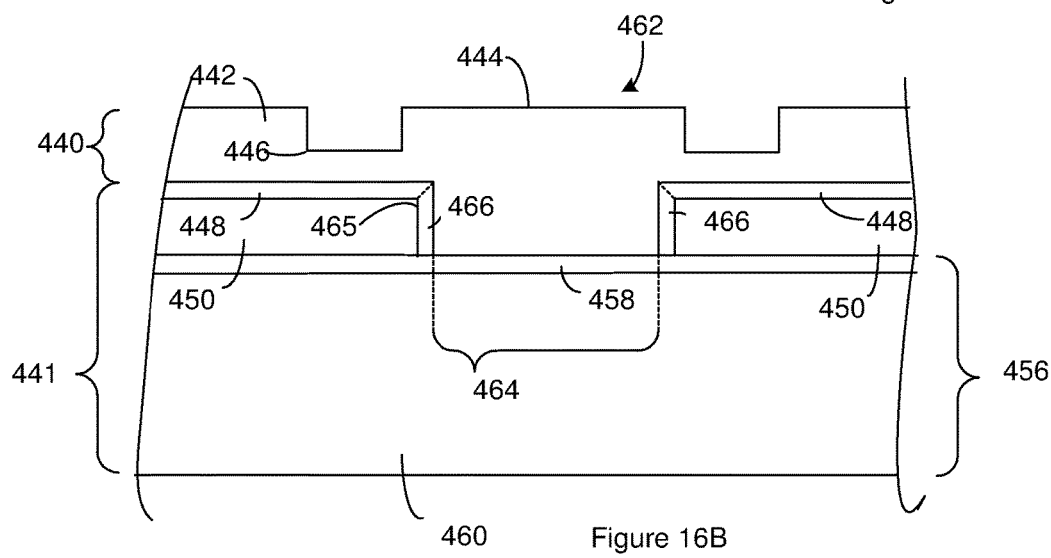
Figure 16C:
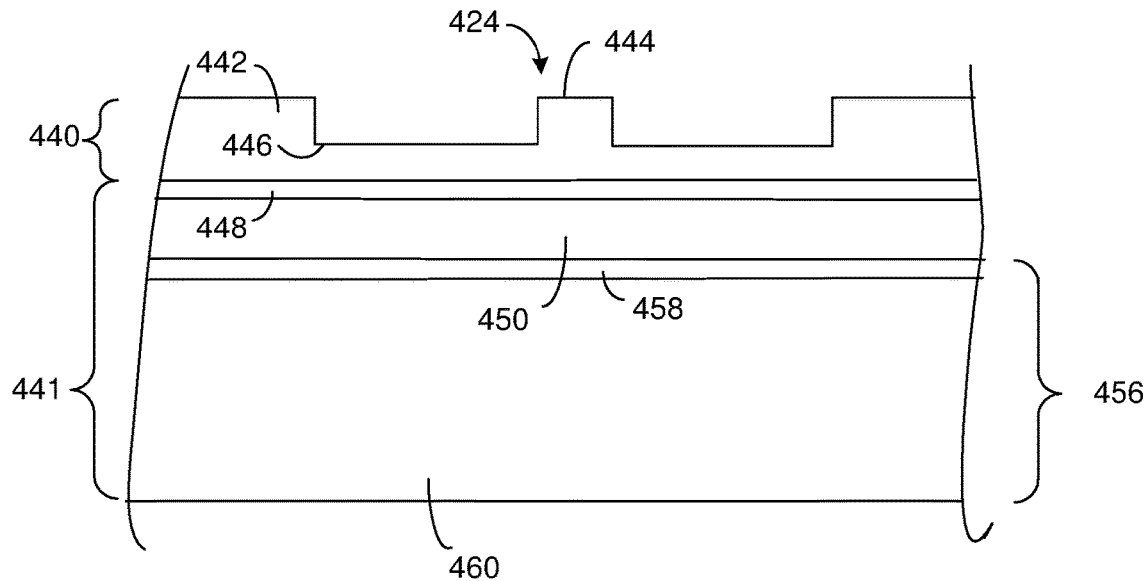
Figure 16D:
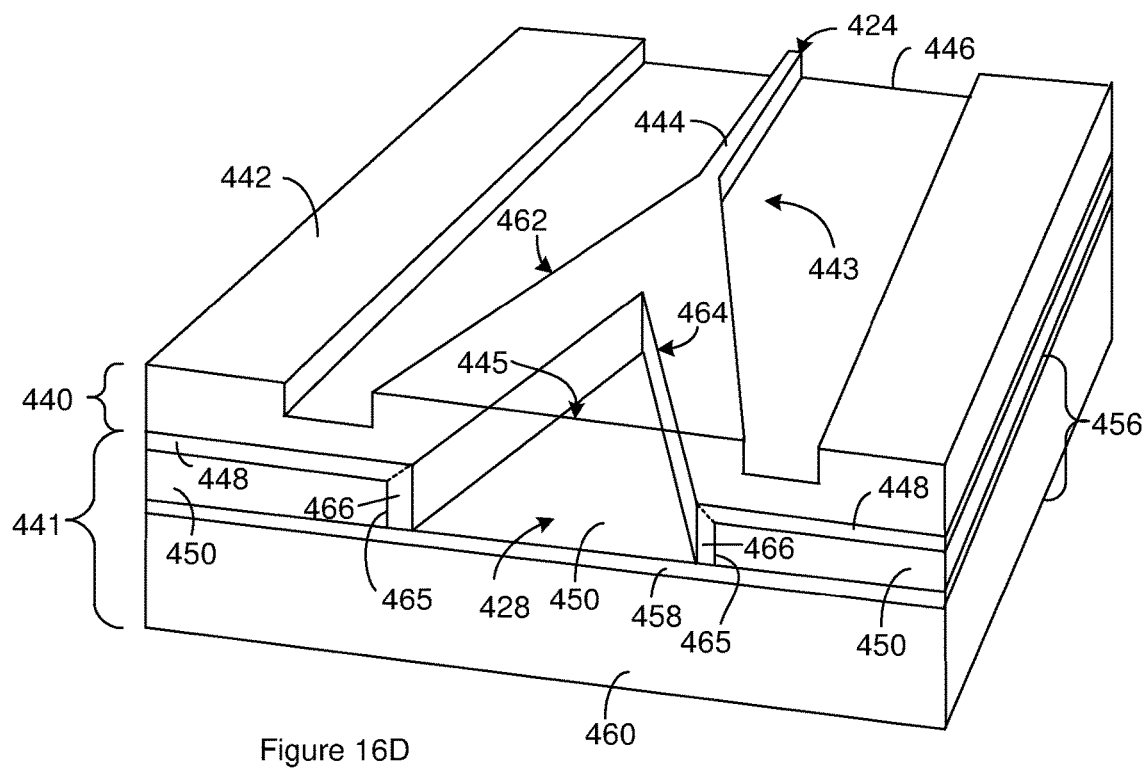
Figure 16E:
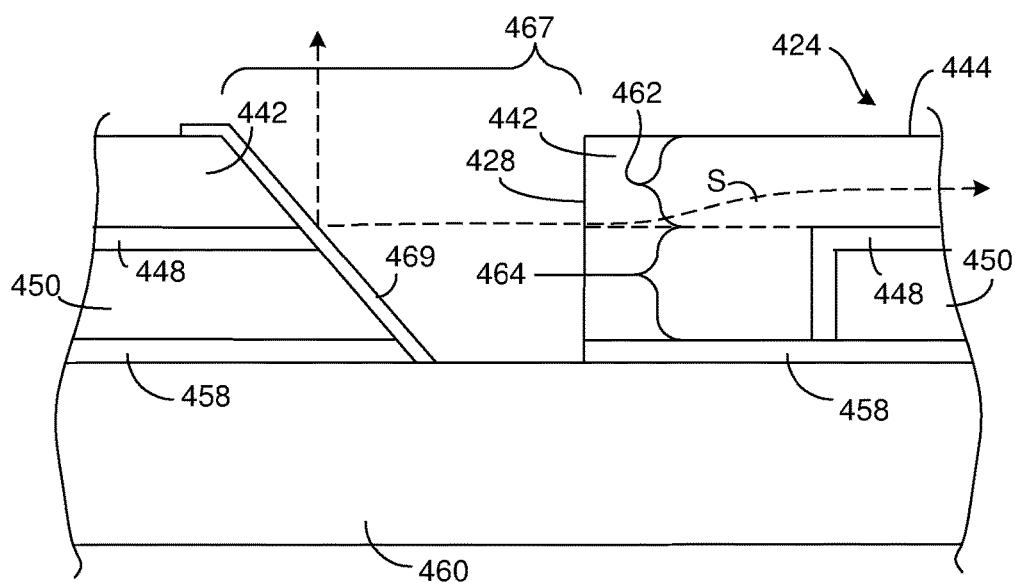

FIG. 16A is a perspective view of the portion of a semiconductor chip having the interface between a redirection component and a tapered waveguide. FIG. 16B is a cross section of the semiconductor chip shown in FIG. 16A taken along the line labeled B in FIG. 16A. FIG. 16C is a cross section of the semiconductor chip shown in FIG. 16A taken along the line labeled C in FIG. 16A. FIG. 16D is the perspective view of the Semiconductor chip shown in FIG. 16A. In particular, the FIG. 16D is the perspective view of the portion of the semiconductor chip that includes a buried waveguide taper. In FIG. 16D, a portion of the device is treated as transparent so the relationship between underlying features is visible. FIG. 16E is the cross section of the semiconductor chip shown in FIG. 16A taken along a line extending between the brackets labeled E.

The semiconductor chip includes a waveguide layer 440 on a device platform 441. In FIG. 16D, the waveguide layer 440 is treated as transparent in order to show the underlying parts of the device. The waveguide layer 440 includes or consists of a light-transmitting medium 442. The waveguide layer 440 includes a ridge that at least partially defines a waveguide 424 that is configured to guide light signals through the light-transmitting medium 442.

The ridge 444 extends upward from a slab region of the light-transmitting medium 442 as is most evident in FIG. 16C. In some instances, the top of the slab region is defined by the bottom of trenches 446 extending partially into the light-transmitting medium 442 or through the light-transmitting medium 442. Suitable light-transmitting media include, but are not limited to, silicon, polymers, silica, SiN, GaAs, InP and LiNbO$_3$. One or more cladding layers (not shown) are optionally positioned on the light-transmitting medium 442. The one or more cladding layers can serve as a cladding for the waveguide and/or for the semiconductor chip. When the light-transmitting medium 442 is silicon, suitable cladding layers include, but are not limited to, silicon, polymers, silica, SiN, GaAs, InP and LiNbO$_3$.

The illustrated waveguide 424 includes a first portion 443 and a second portion 445. The first portion of the waveguide 424 is positioned on the device platform 441 and can be in contact with the device platform 441. The portion of the device platform 441 adjacent to the light-transmitting medium 442 can act as a cladding for the waveguide 424. For instance, a portion of the device platform 441 can be in contact with the bottom of the light-transmitting medium 442 and can be configured to reflect light signals from the waveguide 424 back into the waveguide 424 in order to constrain light signals in the waveguide 424. For instance, the portion of the device platform 441 adjacent to the light-transmitting medium 442 can be a lower waveguide cladding 448 with a lower index of refraction than the light-transmitting medium 442. The drop in the index of refraction can cause reflection of a light signal from the light-transmitting medium 442 back into the light-transmitting medium 442.

The device platform 441 can include an intermediate medium 450 positioned such that at least a portion of the lower waveguide cladding 448 is between the intermediate medium 450 and the light-transmitting medium 442. In some instances, the lower waveguide cladding 448 is in direct contact with the intermediate medium 450. The light-transmitting medium 442 and the intermediate medium 450 can be the same material or different materials. In some instances, the light-transmitting medium 442 and the intermediate medium 450 are silicon.

The intermediate medium 450 is positioned on a base 456. The base 456 can include a lower taper cladding 458 positioned on a substrate 460. In some instances, the lower taper cladding 458 is in direct contact with the intermediate medium 450. The lower taper cladding 458 can have a lower index of refraction than the light-transmitting medium 442. The lower taper cladding 458 can be the same material or a different material from the lower waveguide cladding 448.

In one example, the device platform 441 has the structure of a silicon-on-insulator wafer. As noted above, a silicon-on-insulator (SOI) wafer includes a buried layer between a substrate and a light-transmitting medium. In a silicon-on-insulator wafer, the buried layer is silica while the substrate and the light-transmitting medium are silicon. For instance, the silicon layer can serve as the intermediate medium 450. The layer of silica can serve as the lower taper cladding 458 and the silicon substrate can serve as the substrate 460.

The waveguide 424 includes a taper that provides a transition between the first portion of the waveguide 444 and the second portion 445 of the waveguide. The second portion of the waveguide terminates at a facet 428. In the embodiment shown in FIG. 16A through FIG. 16E, the expanded end of the waveguide taper serves as the second portion 445 of the waveguide. As a result, the taper terminates at the facet 428 and the facet 428 serves as the second portion 445 of the waveguide. In some instances, the second portion of the waveguide can extend beyond the expanded end of the taper as shown in FIG. 5A through FIG. 5C. Although not illustrated, the facet 428 can include an anti-reflective coating.

As discussed above, FIG. 16D treats the waveguide layer 440 as transparent. As a result, the interior features of the taper are evident in FIG. 16D. The illustrated taper includes a waveguide taper 462 stacked on a platform taper 464 such that the combination forms a buried taper. A portion of the ridge 444 of light-transmitting medium 442 is tapered and can serve to define the waveguide taper 462. The waveguide taper 462 is positioned over the device platform 441. As a result, a portion of the taper can be positioned over the device platform 441. A portion of the intermediate medium 450 is tapered and can serve to define the platform taper 464. As a result, the waveguide taper 462 is an inverted taper that extends below the first portion 443 of the waveguide 424 into the device platform 441. As a result, a portion of the taper can extend into the device platform 441.

The taper is configured such that the second portion 445 of the waveguide has a larger cross sectional area than the first portion 443 of the waveguide where the cross section is taken perpendicular to a direction of propagation of a light signal through the waveguide. In some instances, the waveguide taper 462 is configured such that a ratio of the cross sectional area of the second portion 445 of the waveguide: the cross sectional area of the first portion 443 of the waveguide is greater than 2:1 or 5:1 and less than 10:1 or 15:1. Additionally, in some instances, the dimensions of the first portion 443 of the waveguide can be as disclosed in the context of FIG. 3.

Although two taper structures are illustrated, the taper can include a different number of taper structures. The waveguide taper 462 and the platform taper 464 can have one or two features selected from a group consisting of a horizontal taper and a lateral taper. As a result, the taper can be horizontally and/or vertically tapered. The illustrated waveguide taper 462 has a horizontal taper but does not have a vertical taper. The illustrated platform taper 464 has a horizontal taper but does not have a vertical taper. The tapers in different taper structures can be different as is most evident from FIG. 16D. For instance, FIG. 16D shows the platform taper having a faster taper rate than the waveguide taper 462. Additional examples of taper differences that can be evident in adjacent taper structures include, but are not limited to, different shapes such as straight and curved. The different taper structures in a taper can be constructed such that the combination of taper structures provided the taper with one or more features that are not present in any of the individual taper structures. For instance, the taper structures shown in FIG. 16A through FIG. 16E are constructed such that the taper has a vertical taper even though each of the taper structures is not vertically tapered. In some instances, the taper structures are selected so as to provide the taper with an adiabatic taper.

The light-transmitting medium 442 included in the waveguide taper 462 includes an upper facet surface and the light-transmitting medium 442 included in the platform taper 464 includes a lower facet surface. The upper facet surface and the lower facet surface combine to form the facet 428.

FIG. 16A through FIG. 16D show the platform taper 464 positioned within the footprint of the waveguide taper 462. In this arrangement, the light-transmitting medium 442 included in the waveguide taper 462 includes a shelf 465 that extends past the lateral sides of the platform taper 464. The shelf 465 can be positioned on the lower waveguide cladding 448. In some instances, the shelf 465 is in contact with the lower waveguide cladding 448. As a result, the lower waveguide cladding 448 can prevent optical loss from the bottom of the waveguide taper 462. In the illustrated arrangement, the taper is butt-coupled with the waveguide 424 rather than having one or more taper structures that push the lights signal into the waveguide from above or below the waveguide 424. Butt coupling between the taper and the waveguide 424 provides a more efficient transfer of optical energy between the taper and the waveguide 424. However, the taper can have other structures. For instance, the platform taper 464 can extend past the waveguide taper 462 and under the waveguide 424 and/or the waveguide taper 462 can be positioned within the footprint of the platform taper 464.

As is most evident from FIG. 16C and FIG. 16D, lateral claddings 466 are located in a recess 465 in the light-transmitting medium 442 and are located on the lateral sides of the platform taper 464. In some instances, the lateral cladding(s) 466 are perpendicular or substantially perpendicular to the base 456. The lower taper cladding 458 can contact the lateral cladding 466 and/or be positioned between different regions of the lateral cladding 466. In some instances, the lower taper cladding 458 spans a gap between different regions of the lateral cladding 466. The lateral cladding 466 and the lower taper cladding 458 can act as a cladding for the platform taper 464. For instance, the lower taper cladding 458 and the lateral cladding 466 can be configured to reflect light signals from the platform taper 464 back into the platform taper 464 in order to constrain light signals in the platform taper 464. For instance, lateral cladding 466 and the lower taper cladding 458 can contact the light-transmitting medium 442 in the platform taper 464 and can each have a lower index of refraction than the light-transmitting medium 442. The drop in the index of refraction can cause reflection of a light signal from the intermediate medium 450 back into the intermediate medium 450. In some instances, the lateral cladding 466 and the lower taper cladding 458 are the same material. In some instances, the lower waveguide cladding 448, the lateral cladding 466 and the lower taper cladding 458 are the same material. In one example, the lateral cladding 466 and the lower taper cladding 458 are each silica and the light-transmitting medium 442 is silicon.

As is most evident in FIG. 16A and FIG. 16E, a port recess 467 extends through the lower waveguide cladding 448 and the intermediate medium 450 in front of the facet 428. In FIG. 16A and FIG. 16D, the port recess 467 extends through the lower taper cladding 458 so as to leave portion of the substrate 460 exposed at the bottom of the port recess 467. The port recess includes multiple lateral sides. A first one of the lateral sides is a waveguide side that includes the facet 428 and/or can serve as the facet 428. A second one of the lateral sides can serve as the reflecting side.

A reflecting material 469 can optionally be positioned on a reflecting side of the port recess 467 as shown in FIG. 16E. A surface of the reflecting material can serve as a reflecting surface on the reflecting side. The reflecting material 469 is not shown in FIG. 16A so the underlying structures are visible in the image. Suitable reflecting materials include, but are not limited to, reflective metals such as Al and Au. As an alternative to a reflecting material, reflection at the reflecting side of the port recess 467 can be a result of Total Internal Reflection (TIR). For instance, the reflection can be a result of a change in index of refraction at the reflecting side of the port recess 467 and/or of the angle between the light signal and the reflecting side of the port recess 467. Accordingly, the intermediate medium 450 and light-transmitting medium 450 can be chosen to provide a particular change in the index of refraction at the reflecting side of the port recess 467.

FIG. 16E includes an arrow labeled S that illustrates the path of a light signal through the taper. The light signal is illustrated traveling along the waveguide 424 toward the facet 428. The light signal enters the waveguide taper 462 and at least a portion of the light signal is pushed into the platform taper 464. The light signal exits the taper through the facet 428.

The light signal exits the second portion of the waveguide through the facet and travels through the port recess 467 toward the reflecting side of the port recess 467. The light signal is reflected at the reflecting side of the port recess 467 by a reflecting surface on the reflecting side. For instance, the light signal can be reflected by a surface of the reflecting material 469 on the reflecting side as shown in FIG. 16E. Alternately, the light signal can be reflected by Total Internal Reflection (TIR) as described above. In these instances, a surface of the reflecting side can serve as the reflecting surface. As shown in FIG. 16E, the light signal is reflected traveling toward a location that is above the semiconductor chip. Alternately, the light signal can travel in the opposite direction. For instance, the reflecting side can receive the light signal from above the semiconductor chip and reflect the light signal such that it is received by the facet. Although not evident from FIG. 16E, the reflecting side can be angled in the opposite direction. As a result, the reflecting side can reflect a light signal received from the facet toward a location that is below the semiconductor chip or can reflect a light signal received from a location that is below the semiconductor chip toward the facet.

Figure 17A:
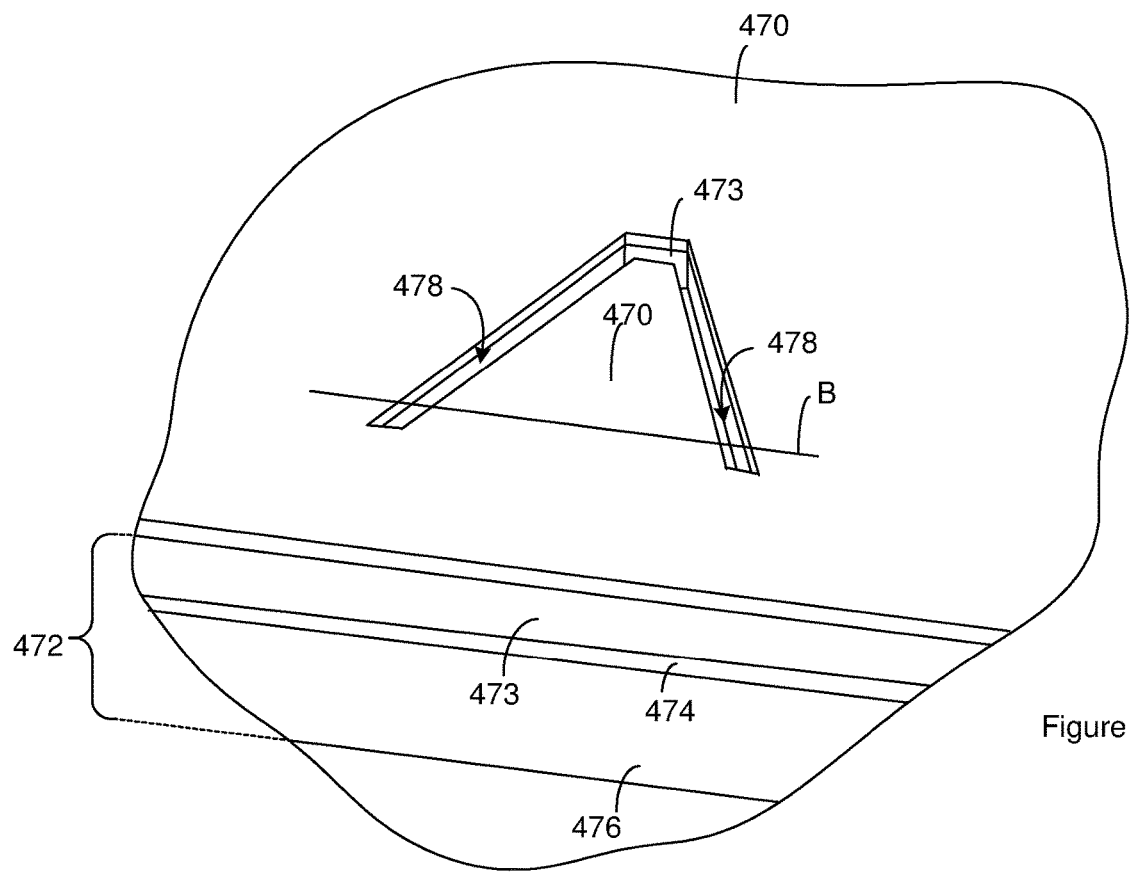
FIG. 17A through FIG. 17O illustrate a method of forming an optical device having an integrated taper according to FIG. 16A through FIG. 16E.

FIG. 17A through FIG. 17I illustrate a method of forming an optical device having an integrated taper according to FIG. 16A through FIG. 16E. FIG. 17A is a perspective view of a portion of a device precursor where the platform taper and a port recess will be fabricated. The illustrated device precursor includes a first mask 470 on a wafer 472. The wafer includes a first light-transmitting medium 473 on one or more sacrificial layers. As will become evident below, a portion of the light-transmitting medium 473 will become the intermediate medium 450 disclosed in the context of FIG. 16A through FIG. 16E. The one or more sacrificial layers are present in the wafer but are removed during fabrication and not present in the final optical device. When the wafer includes more than one sacrificial layer, the sacrificial layers can combine to form a sacrificial base for the wafer. The illustrated wafer includes a first light-transmitting medium 473 on a sacrificial layer 474 and a sacrificial substrate 476. The sacrificial layer 474 and sacrificial substrate 476 combine to form a sacrificial base for the wafer. The illustrated portion of the wafer 472 can be a portion of a silicon-on-insulator wafer or chip. Accordingly, the sacrificial layer 474 can be a silica insulator or silica optical cladding between silicon layers that serve as the sacrificial substrate 476 and first light-transmitting medium 473.

The first mask 470 is formed on the first light-transmitting medium 473. The first mask 470 is patterned so the first mask 470 protects the regions of the device precursor where the platform taper will be formed. Additionally, the first mask 470 is patterned such that regions of the first light-transmitting medium 473 where the lateral claddings are to be formed remain exposed. Accordingly, the pattern of the first mask 470 can substantially match the pattern that is desired for the lateral cladding(s). As will become evident below, the first mask 470 will define the platform taper. Accordingly, the first mask 470 is patterned so as to provide the platform taper with the desired geometry. A suitable first mask 470 includes, but is not limited to, a hard mask such as silica, polymers and SiN and silicon oxynitride.

A first etch is performed so as to form the device precursor of FIG. 17A. The first etch can etch proceed from a first side of the first light-transmitting medium toward a second side of the first light-transmitting medium and be stopped before or after reaching the second side of the first light-transmitting medium. As a result, the first etch can form one or more cladding trenches 478 that extend through the first light-transmitting medium 473 or that do not extend to the sacrificial layer 474. However, forming the one or more cladding trenches 478 so the bottom of the one or more cladding trenches 478 is spaced apart from the sacrificial layer 474 as shown in FIG. 17A prevents mushrooming of the cladding trenches 478 at the sacrificial layer 474. Further, as will become evident below, the portion of the first light-transmitting medium 473 between the bottom of the one or more cladding trenches 478 and the sacrificial layer 474 can serve as a seed layer for growth of additional light-transmitting medium. Suitable first etches include, but are not limited to, a dry etch.

Figure 17B:
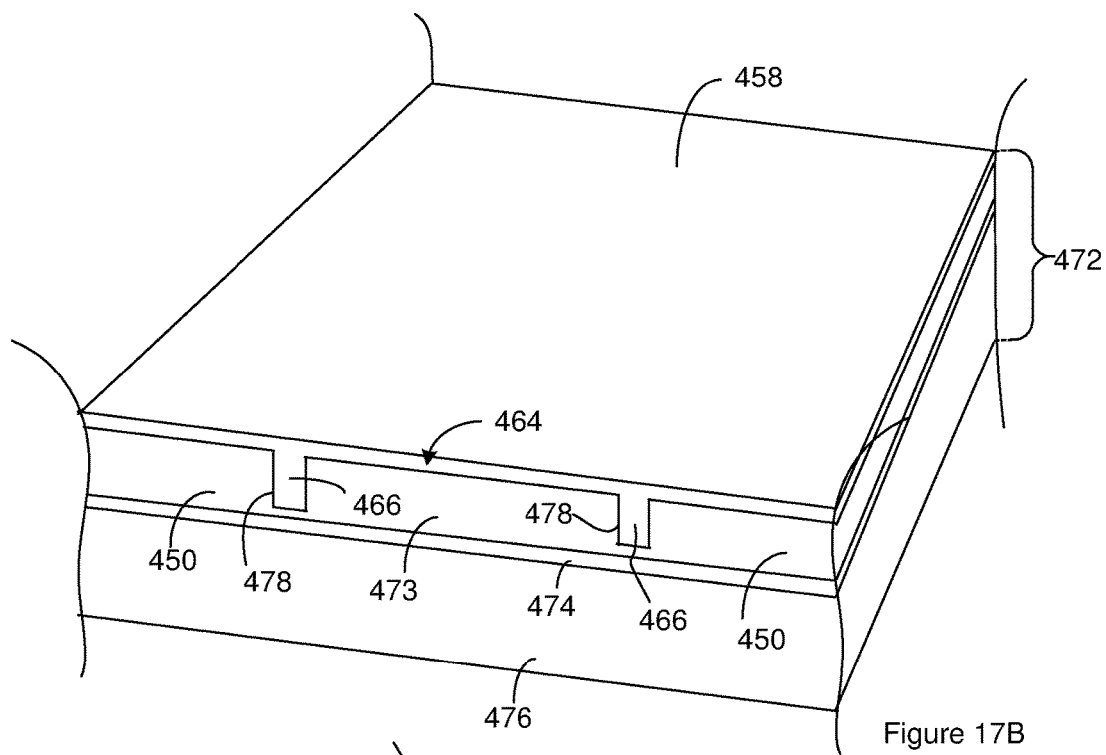
FIG. 17B is a perspective view of a portion of the device precursor shown in FIG. 17A. Lateral cladding is formed in the cladding trenches.

The first mask 470 is removed from the device precursor shown in FIG. 17A and the lateral cladding 466 formed in the cladding trenches 478 so as to provide the device precursor of FIG. 17B. The device precursor shown in FIG. 17B shows a portion of the device precursor shown in FIG. 17A. For instance, the front side of the device precursor shown in FIG. 17B can represent a cross section of the device precursor shown in FIG. 17A taken along the line labeled B in FIG. 17A. Forming the lateral cladding 466 in the cladding trenches 478 can be performed so as to concurrently form the lower taper cladding 458 on an upper surface of the first light-transmitting medium 473. Rather than forming the lateral cladding 466 concurrently with the lower taper cladding 458, the lateral cladding 466 and the lower taper cladding 458 can be formed sequentially. For instance, the lower taper cladding 458 can be deposited on the upper surface of the first light-transmitting medium 473 after the lateral cladding 466 formed in the cladding trenches 478. Suitable materials for the lateral cladding 466 and/or the lower taper cladding 458 include, but are not limited to, TEOS (tetra-ethyl-ortho-silane) and oxides such as silica.

A suitable method of forming the lateral cladding 466 in the cladding trenches 478 and/or the lower taper cladding 458 on an upper surface of the first light-transmitting medium 473 includes, but is not limited to, depositions and thermal oxide processes where the device precursor is heated in the presence of oxygen. When the first light-transmitting medium 473 is silicon and a thermal oxide process is performed, exposed silicon reacts with oxygen to form silicon dioxide that can act as the lateral cladding 466 and the lower taper cladding 458. The resulting oxide occupies more volume than the portion of the first light-transmitting medium 473 that was converted to the oxide. As a result, the cladding trenches 478 can be formed with a width that results in filling of the cladding trenches 478 with oxide during the thermal oxide treatment.

Figure 17C:
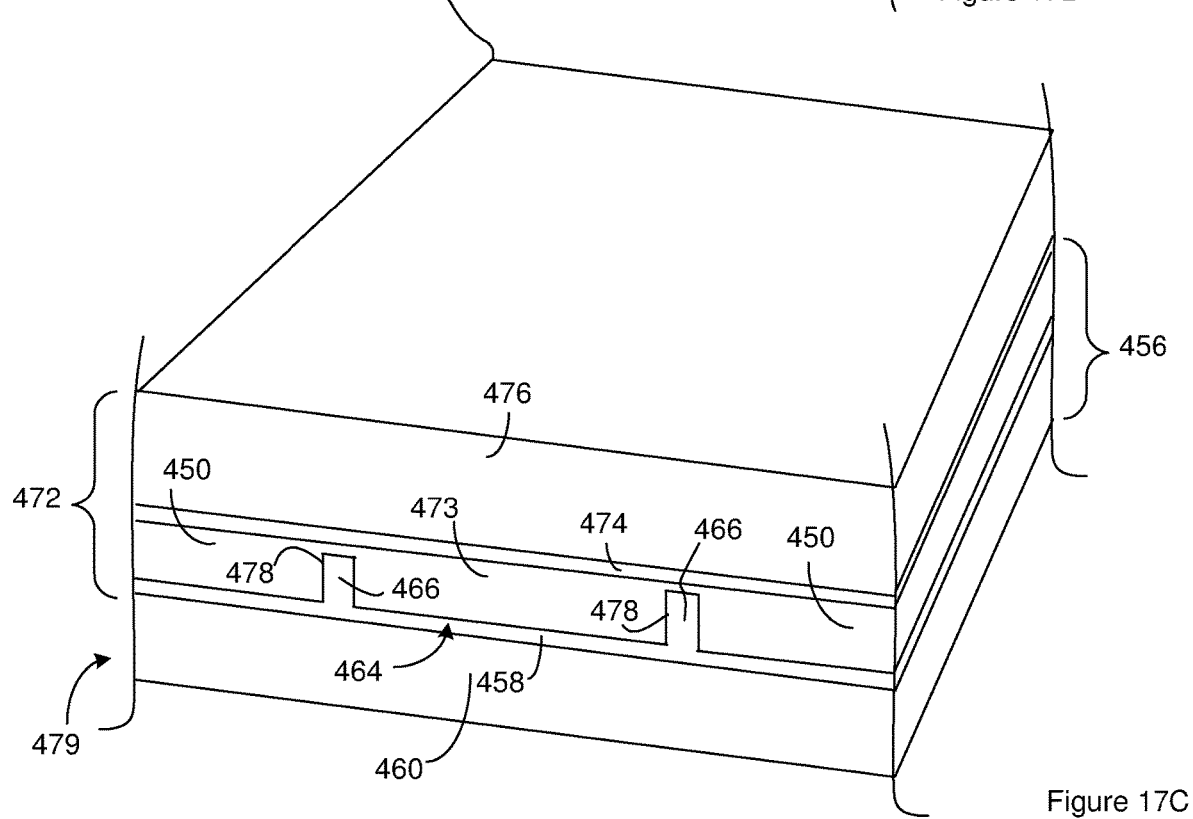
FIG. 17C is a perspective view of a portion of the device precursor shown in FIG. 17B after attaching a wafer to the device precursor and inverting the device precursor.

The lower taper cladding(s) 458 can be attached to a second wafer 479 that includes or consists of the substrate 460 and the result inverted so as to provide the device precursor of FIG. 17C. In some instances, the second wafer 479 is attached to the device precursor so the substrate 460 contacts the lower taper cladding 458 as shown in FIG. 17C. Additionally, the addition of the substrate 460 to the device precursor can form the base 41 of the optical device as shown in FIG. 17C. Suitable methods of attaching the second wafer 479 and the device precursor include, but are not limited to, direct bonding, plasma activated bonding, and surface activated bonding. Since two flat surfaces are being attached, wafer-bonding techniques provides high quality bonding results. Suitable second wafers for attaching to the lower taper cladding 458 include, but are not limited to, silicon wafers. Although the second wafer 479 in FIG. 17C is shown as having a single layer of material, the second wafer can include more than one layer of material.

Figure 17D:
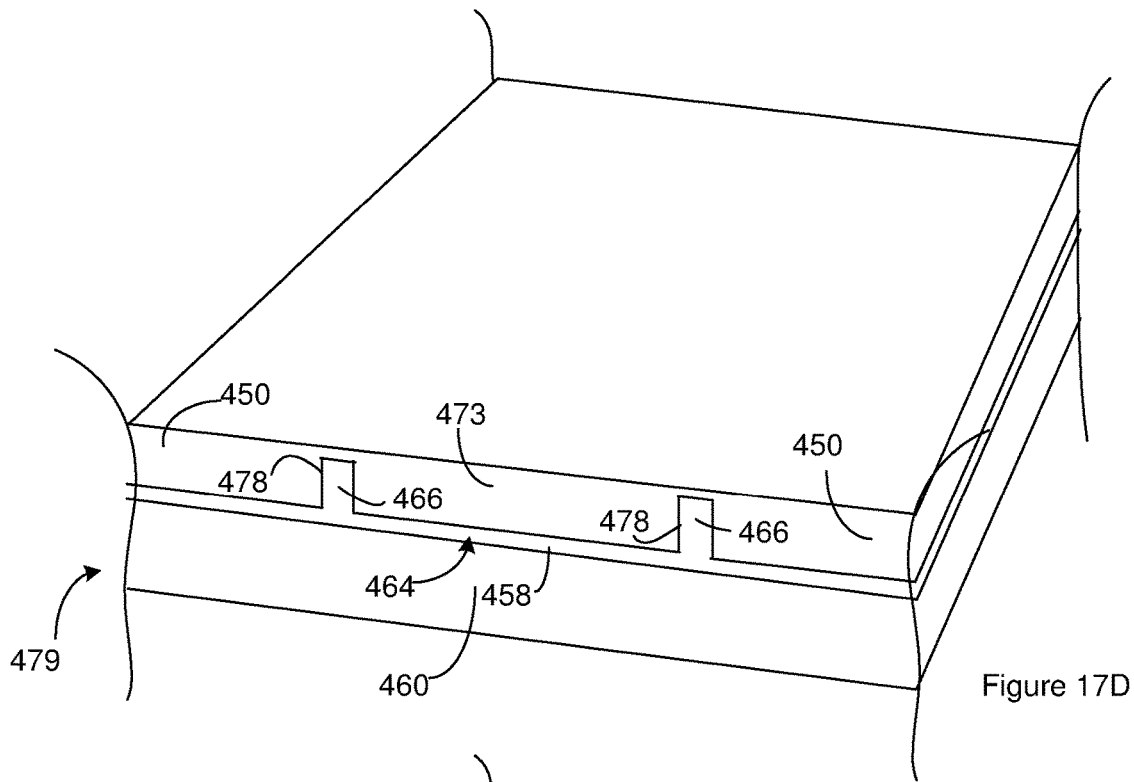
FIG. 17D is a perspective view of a portion of the device precursor shown in FIG. 17C after removal of sacrificial layers from the device precursor.

The sacrificial layer 474 and the sacrificial substrate 476 are removed from the device precursor of FIG. 17C so as to provide the device precursor of FIG. 17D. Suitable methods for removing the sacrificial substrate 476 include, but are not limited to, grinding and polishing. The method for removing the sacrificial substrate 476 can be stopped at the sacrificial layer 474. As a result, all or a portion of the sacrificial layer 474 can be present on the device precursor after removing the sacrificial substrate 476.

Suitable methods for removing the sacrificial layer 474 include, but are not limited to, wet etching and dry etching. Techniques for removing the sacrificial layer 474 such as etching can be selected such that the lower taper cladding 458 acts as an etch stop. Additionally or alternately, techniques such as etching can leave a smooth surface of the first light-transmitting medium 473 as the upper surface of the device precursor.

Figure 17E:
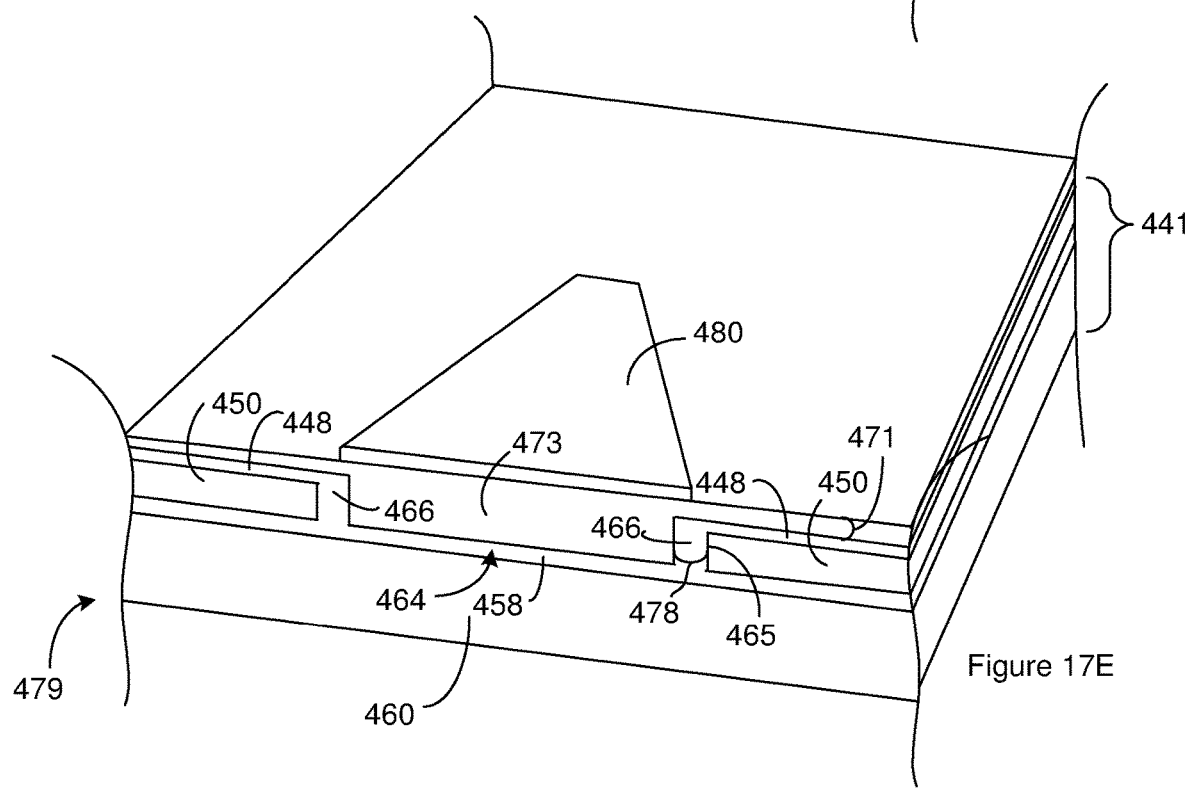
FIG. 17E is a perspective view of a portion of the device precursor shown in FIG. 17D after formation of a lower waveguide cladding on the device precursor.

As shown in FIG. 17E, a second mask 480 is formed on the device precursor of FIG. 17D. The second mask 480 is formed on the upper surface of the device precursor and over the location where the platform taper 464 was formed. The second mask 480 can also fully or partially overlap the lateral cladding 466. The one or more lower waveguide claddings 448 are then formed in the first light-transmitting medium 473 so as to provide the device precursor of FIG. 17E. The formation of the one or more lower waveguide claddings 448 defines the location of the intermediate medium 450 disclosed in the context of FIG. 16A through FIG. 16E.

As shown in FIG. 17E the one or more lower waveguide claddings 448 can contact the lateral cladding 466. The one or more lower waveguide claddings 448 are formed such that a layer of the first light-transmitting medium 473 is positioned over the one or more lower waveguide claddings 448. Accordingly, the one or more lower waveguide claddings 448 can be between different regions of the first light-transmitting medium 473. During formation of the one or more lower waveguide claddings 448, the second mask 480 can reduce or prevent formation of the lower waveguide cladding 448 within the platform taper 464. A suitable first mask 470 includes, but is not limited to, a hard mask such as silica, SiN, polymers, and silicon oxynitride.

A suitable method for forming the one or more lower waveguide claddings 448 includes, but is not limited to, implantation processes such as oxygen implantation. An example of suitable oxygen implantation processes includes, but is not limited to, the separation by implantation of oxygen process (SIMOX). When the first light-transmitting medium 473 is silicon, the implanted oxygen is converted to silicon oxide by a high temperature annealing process. As a result, the implantation forms one or more silica lower waveguide claddings 448 in the device precursor.

Figure 17F:
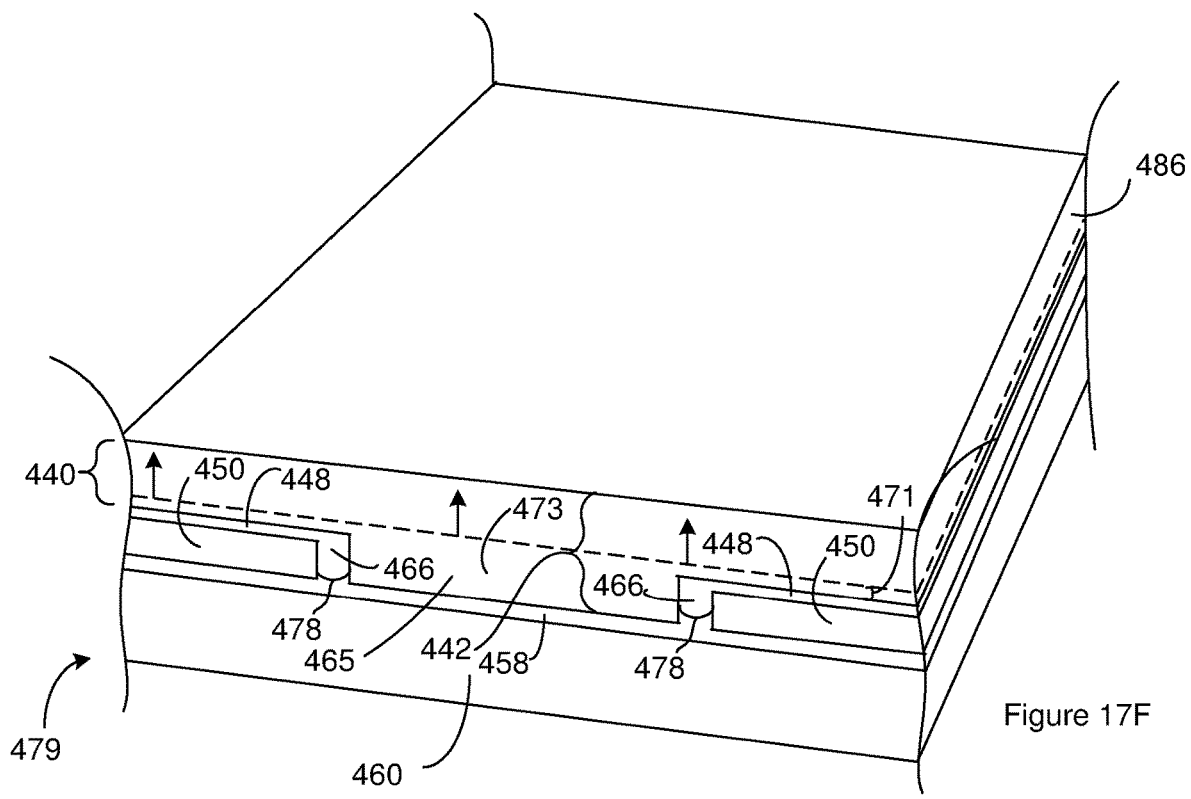
FIG. 17F is a perspective view of a portion of the device precursor shown in FIG. 17E after a second light-transmitting medium is grown on a first light-transmitting medium that is present on the device precursor.
Figure 17G:
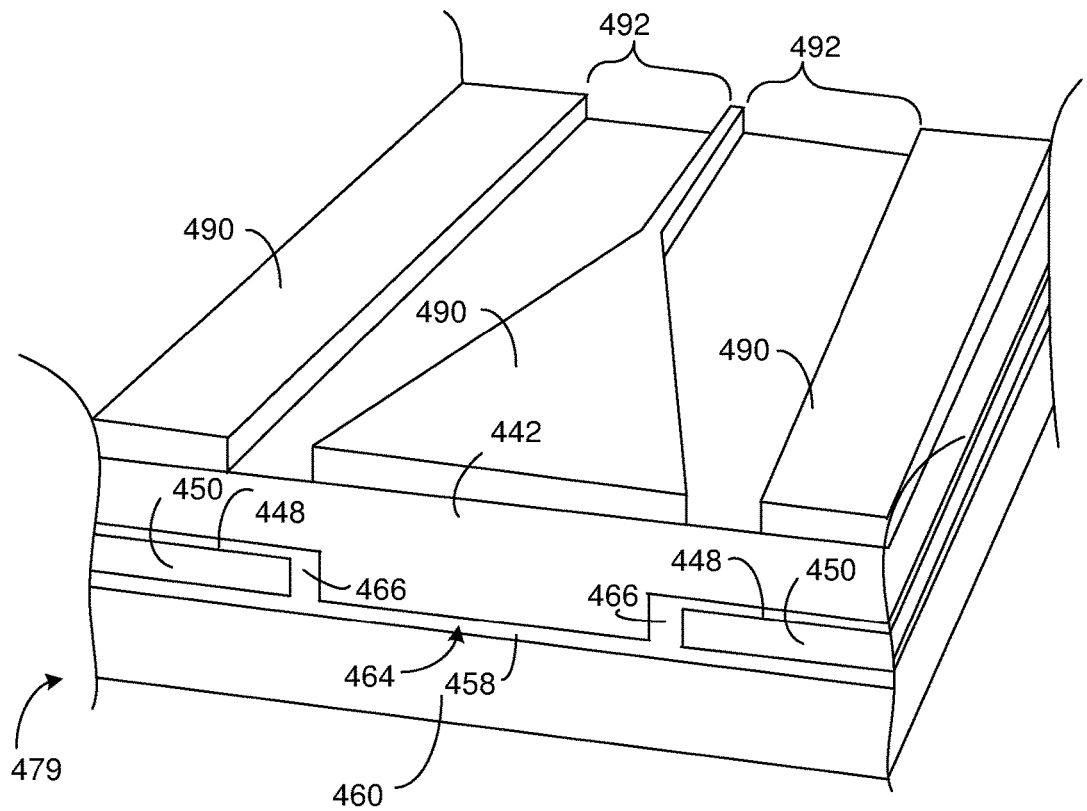
FIG. 17G is a perspective view of a portion of the device precursor shown in FIG. 17F after formation of a mask protects a region of the device precursor where a waveguide will be formed.

The second mask 480 is removed from the device precursor of FIG. 17E and a second light-transmitting medium 486 grown on the first light-transmitting medium 473 of FIG. 17E so as to provide the device precursor of FIG. 17F. FIG. 17F shows the second light-transmitting medium formed on the wafer such that a portion of the first light-transmitting medium is between a bottom of the cladding trench and the second light-transmitting medium. The combination of the first light-transmitting medium 473 and the second light-transmitting medium 486 serve as the light-transmitting medium 442 disclosed in the context of FIG. 16A through FIG. 16E. The second light-transmitting medium 486 and the first light-transmitting medium 473 serve as the light-transmitting medium 442. Accordingly, the second light-transmitting medium 486 can be formed on the first light-transmitting medium 473 so as to form a waveguide layer with the desired thickness. The second light-transmitting medium 486 and the first light-transmitting medium 473 can be the same material or different materials. In some instances, the second light-transmitting medium 486 and the first light-transmitting medium 473 are silicon.

Suitable methods of forming the second light-transmitting medium 486 on the first light-transmitting medium 473 include, but are not limited to, growing the second light-transmitting medium 486 on the first light-transmitting medium 473 as indicated by the arrows in FIG. 17F. Suitable methods for growing the second light-transmitting medium 486 on the first light-transmitting medium 473 include, growth techniques that can use the upper surface of the first light-transmitting medium 473 as a seed layer such as epitaxial growth techniques. When the second light-transmitting medium 486 and the first light-transmitting medium 473 are the same material, epitaxial growth can provide a high quality interface between the second light-transmitting medium 486 and the first light-transmitting medium 473.

An alternative method of forming the device precursor of FIG. 17F can include the use of a DSOI wafer (Double Silicon-on-Insulator). A DSOI wafer includes a SOI wafer having layers that serve as the substrate 460, the lower taper cladding 458, and the intermediate medium 450. The DSOI wafer can include a second wafer bonded to the SOI wafer. The second wafer has a layer that serve as the lower waveguide cladding 448 and a seed layer 471. The seed layer 471 becomes the portion of the first light-transmitting medium 473 located over and in contact with the lower waveguide cladding 448. One or more initial etches can be performed through the seed layer 471, through the layer that serves as lower waveguide cladding 448 and into or through the layer that serves as the intermediate medium 450 so as to form the one or more cladding trenches 478 in the layer that serves as the intermediate medium 450. Accordingly, in some instances, the one or more initial etches are performed down to the lower taper cladding 458. The lateral claddings 466 can be formed in the cladding trenches 478 as discussed in the context of FIG. 17B. The layer that serves as the intermediate medium 450 also serves as the platform taper 464. One or more secondary etches are performed so as to remove the portion of the seed layer 471 located over the first light-transmitting medium 473 and between the one or more cladding trenches 478 and also so as to remove the portion of the lower waveguide cladding 448 located over the first light-transmitting medium 473 and between the one or more cladding trenches 478. As a result, after the one or more secondary etches, a surface of the intermediate medium 450 located over the platform taper 464 is exposed while the surface of the intermediate medium 450 located outside of the one or more cladding trenches 478 remains protected by the seed layer 471 and the lower waveguide cladding 448. The second light-transmitting medium 486 is grown on the exposed portion of the intermediate medium 450 and the remaining seed layer 471 as disclosed in the context of FIG. 17F. As a result, the second light-transmitting medium 486 can be grown so as to provide the device precursor of FIG. 17F.

In some instances, the upper surface of a device precursor of FIG. 17F is smoothed. Suitable methods for smoothing the upper surface include, but are not limited to, grinding and polishing.

The flat and/or smooth upper surface of the device precursor shown in FIG. 17F makes the device precursor highly suitable for additional processing. In particular, starting component with fabrication with a smooth and continuous upper surface permits more complex structures to be built on the device precursor. As an example of additional processing, the waveguide 424, the waveguide taper 462, and other components can be readily formed on the device precursor of FIG. 17F. For instance, a third mask 490 can be patterned on the device precursor of FIG. 17F so as to provide the device precursor of FIG. 17G. The third mask 490 is patterned so as to protect the regions of the light-transmitting medium 442 where the ridge of the waveguide 424 and the waveguide taper 462 will be formed while leaving the adjacent regions of the light-transmitting medium 442 exposed. For instance, the third mask 490 includes trench openings 492 that extend through the third mask 490 so as to expose the light-transmitting medium 442 under the trench openings. Suitable materials for the third mask 490 include, but are not limited to, polymers, photoresists, silica, SiN, silicon, and oxynitride. Suitable methods for patterning the second mask 480 include, but are not limited to, wet chemical etches and plasma dry etches.

The light-transmitting medium 442 that is exposed in the trench openings 492 can be removed so as to define a ridge of a waveguide 424 and the waveguide taper 462. For instance, a third etch can be performed on the device precursor of FIG. 17G and the remaining portions of the third mask 490 removed so as to form the optical device of FIG. 17H. As is evident from FIG. 17H, the third etch forms the trenches 46 that define the waveguide 424 and the waveguide taper 462 on waveguide layer 40. As a result, the third etch can be performed for a duration that is sufficient to provide the ridge of the waveguide and the waveguide taper 462 with the desired height. A suitable third etch includes, but is not limited to, wet chemical etches and plasma dry etches.

Figure 17H:
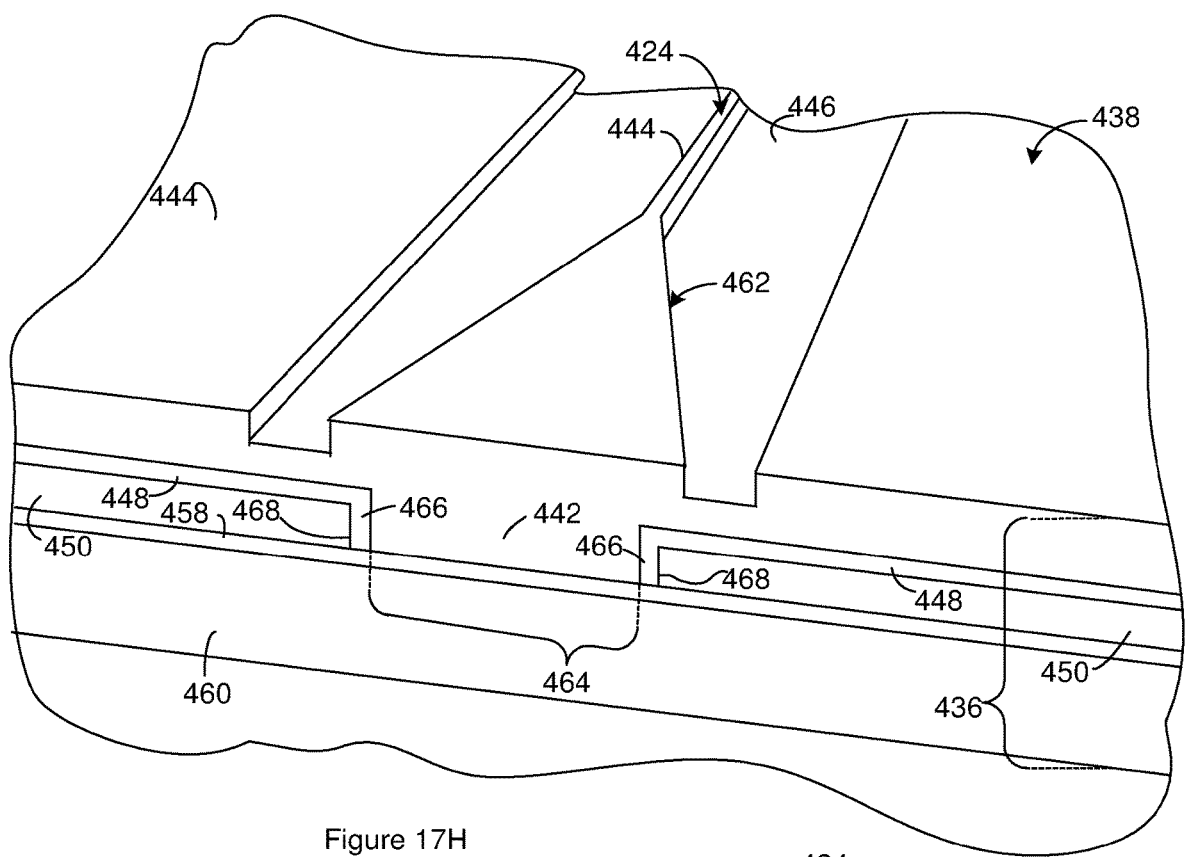
FIG. 17H is a perspective view of a portion of the device precursor shown in FIG. 17G after formation the waveguide on the device precursor.
Figure 17I:
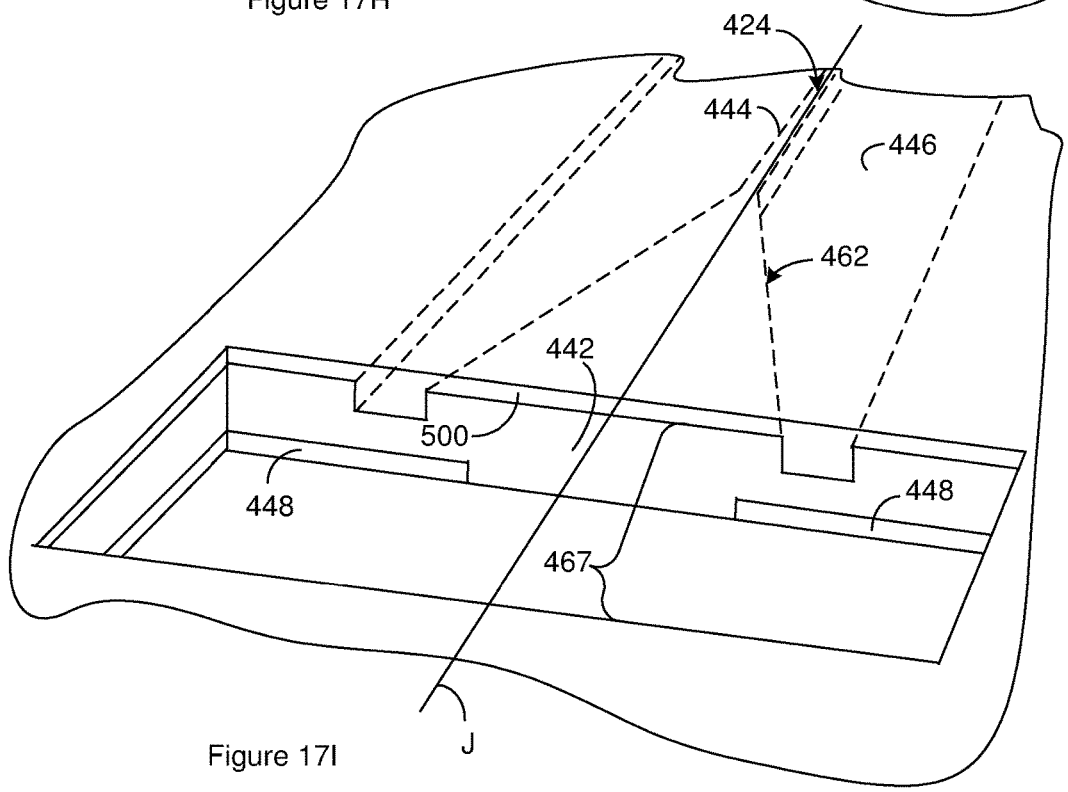
FIG. 17I is a perspective view of a portion of the device precursor shown in FIG. 17H after a first portion of a port recess is formed on the device precursor.

A fourth mask 500 is formed on the device precursor of FIG. 17H so as to provide the device precursor of FIG. 17I. The portion of the device precursor shown in FIG. 17I is larger than the portions of the device precursor shown in FIG. 17B through FIG. 17H. For instance, the portions of the device precursor shown in FIG. 17B through FIG. 17H illustrate formation of the taper, however, the portion of the device precursor shown FIG. 17I illustrates the portion of the device precursor that will have the port recess and the taper.

The fourth mask 500 is formed on upper surface of the light-transmitting medium 442 such that the region of the device precursor where the port recess 467 (FIG. 16A) is desired remains exposed. A fourth etch can be performed on the device precursor of FIG. 17I so as to form a first portion of the port recess 467 to the desired depth. In FIG. 17I, the first portion of the port recess 467 extends through the light-transmitting medium 442 and the lower waveguide cladding 448 in front of the facet 428. The first portion of the port recess 467 can extend to the intermediate medium 450 or can extend partially into the intermediate medium 450. A suitable fourth etch includes, but is not limited to, plasma dry etches such as Deep Reactive Ion Etches (DRIE), Inductively Coupled Plasma (ICP) etches, Enhanced Cathode Coupling Plasma (ECCP) etches and Reactive Ion Etches (RIE), or wet etches using solutions such as tetramethylammonium hydroxide (TMAH), potassium hydroxide (KOH), hydrofluoric acid (HF) nitric acid or phosphoric acid. A suitable fourth mask 500 includes, but is not limited to, a hard mask. An example of a suitable hard mask includes, but is not limited to, a SiN and/or TEOS (tetraethyl-ortho-silane) mask patterned by etching in the presence of a photoresist.

Figure 17J:
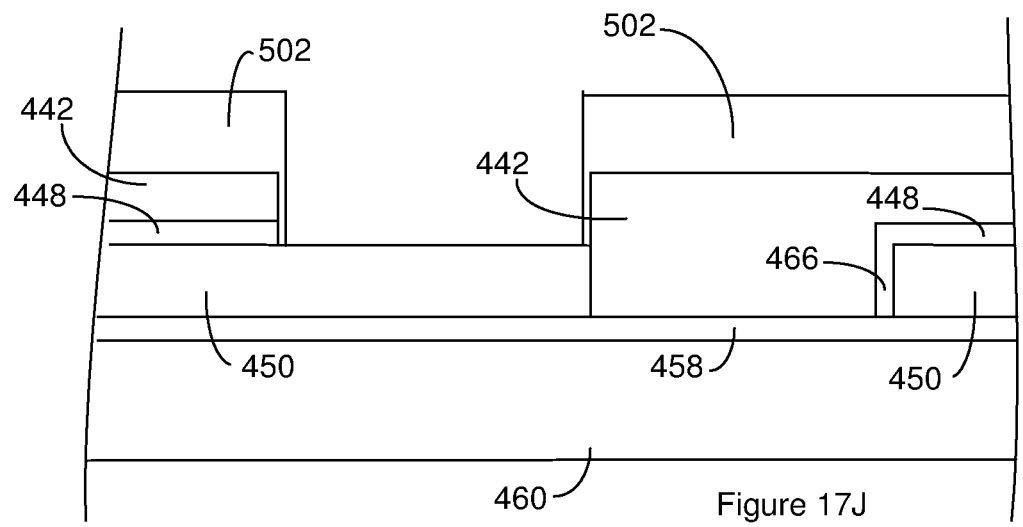
FIG. 17J is a perspective view of a portion of the device precursor shown in FIG. 17I after formation of a mask on the device precursor.

FIG. 17J is a cross section of the device precursor shown in FIG. 17I taken along the line labeled J in FIG. 17I. The cross section of FIG. 17J is after removal of the fourth mask 500 from the device precursor. In FIG. 17J, a fifth mask 502 is formed on upper surface of the light-transmitting medium 442. Additionally, the fifth mask 502 is formed over lateral sides of the light-transmitting medium 442 that are formed by the fourth etch. As a result, the fifth mask 502 can protect portions of the facet that were formed by the fourth etch. The fifth mask 502 is formed such that a region of the device precursor remains exposed through at a location where a second portion of the port recess 467 (FIG. 16A) is to be formed.

Figure 17K:
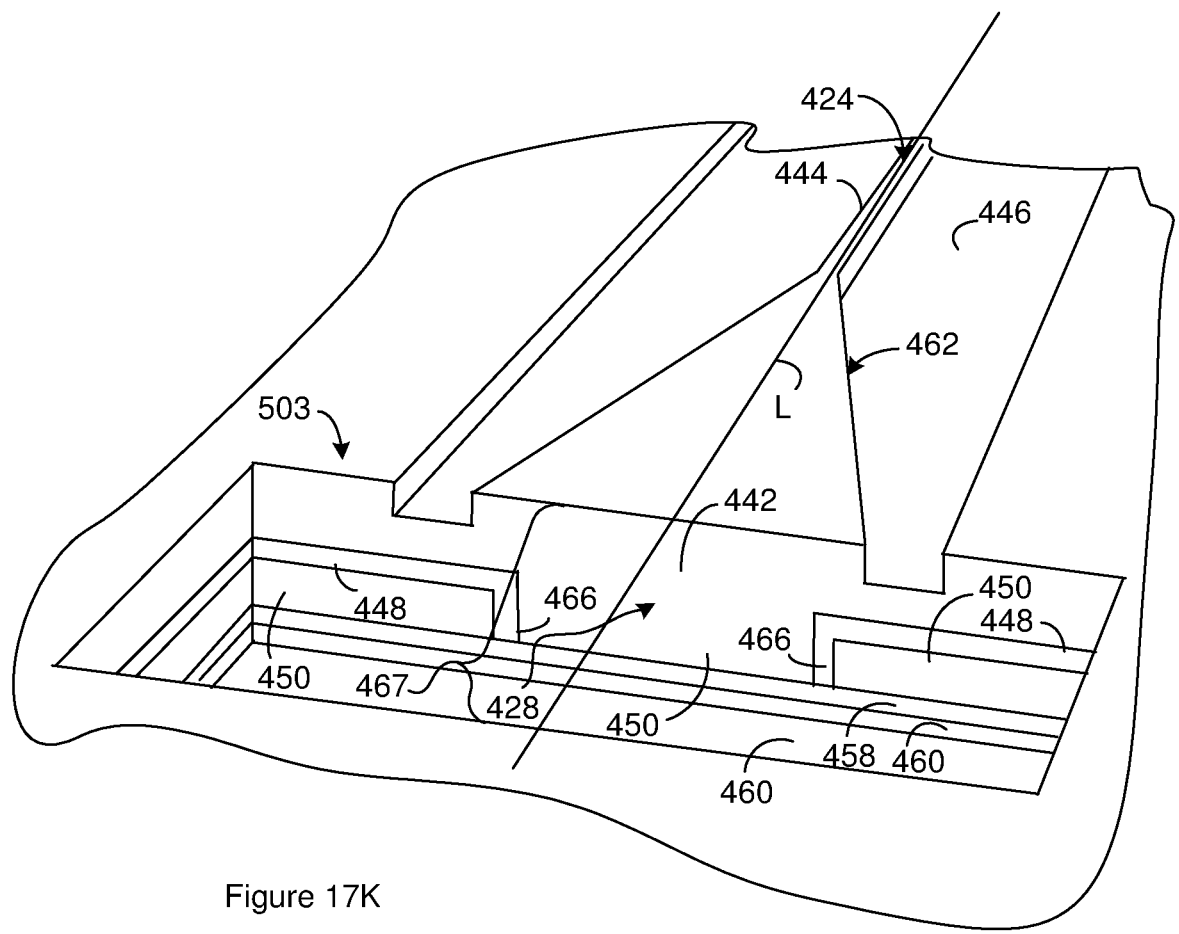
FIG. 17K is a perspective view of a portion of the device precursor shown in FIG. 17J after a second portion of a port recess is formed on the device precursor.

A fifth etch is performed on the device precursor of FIG. 17J so as to form a second portion of the port recess to the desired depth and the fifth mask removed so as to provide the device precursor of FIG. 17K. The portion of the port recess and the second portion of the port recess can combine to form a precursor recess 503. FIG. 17K is a perspective view the device precursor shown in FIG. 17J after the fifth etch and removal of the fifth mask 502 from the device precursor. The second portion of the port recess 467 extends through the intermediate medium 450 and the lower taper cladding 458 and can extend into the substrate 460 so as to form a recess in the substrate 460. As a result, the lower taper cladding 458 and the substrate 460 are exposed at the bottom of the port recess 467. A suitable fifth etch includes, but is not limited to, plasma dry etches such as Deep Reactive Ion Etching (DRIE), Inductively Coupled Plasma (ICP) etches, Enhanced Cathode Coupling Plasma (ECCP) etches and Reactive Ion Etches (RIE), or wet etches using solutions such as tetramethylammonium hydroxide (TMAH), potassium hydroxide (KOH), and hydrofluoric acid (HF) nitric acid or phosphoric acid. A suitable fifth mask 502 includes, but is not limited to, a hard mask. An example of a suitable hard mask includes, but is not limited to, a SiN and/or TEOS mask patterned by etching in the presence of a photoresist.

As is evident by the progression from FIG. 17H to FIG. 17K, the fourth etch and the fifth etch combine to form the facet. Multiple etches may be needed to form the facet as a result of the thickness of the light-transmitting medium 442 and the intermediate medium 450. In some instances, it may be possible to form the facet with a single etch. In some instances, it may be desirable to form the facet with more than two etches.

Figure 17L:
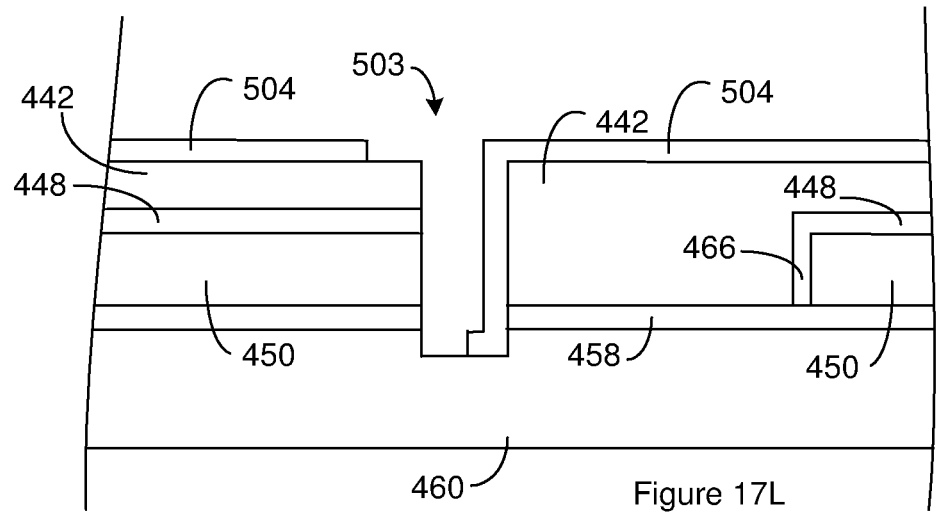
FIG. 17L is a cross section of the device precursor shown in FIG. 17K after formation of a mask on the device precursor.

A sixth mask 504 is added to the device precursor FIG. 17K so as to provide the device precursor of FIG. 17L. FIG. 17L includes a cross section of the device precursor shown in FIG. 17K taken along the line labeled L in FIG. 17K. The sixth mask 504 is formed on an upper surface of the light-transmitting medium 442 and on an upper surface of the intermediate medium 450. A portion of the light-transmitting medium 442 is exposed. Additionally, a portion of the substrate 460 within the substrate recess is exposed. A portion of a lateral side of the precursor recess 503 that extends between the exposed substrate 460 and the exposed light-transmitting medium 442 is also exposed. The exposed portions of the light-transmitting medium 442 include an upper surface of the light-transmitting medium 442.

Figure 17M:
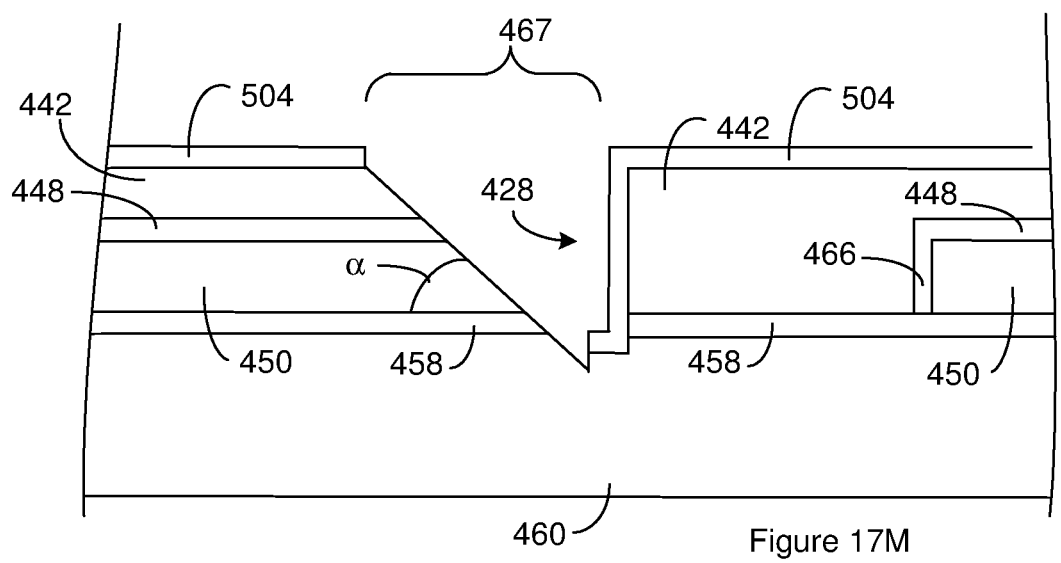
FIG. 17M is a cross section of the device precursor shown in FIG. 17L after being etched so as to form a reflecting surface in a port recess.

A sixth etch is performed on the device precursor of FIG. 17L so as to provide the device precursor of FIG. 17M. The sixth etch can be performed so as to form the port recess 467. Accordingly, the sixth etch forms the reflecting side of the port recess 467. As shown in FIG. 17M, the reflecting side of the port recess 467 can extend into the lower taper cladding 458 or can extend through the lower taper cladding 458 and into the substrate 460. The sixth etch can include a series of multiple etch steps. For instance, a light-transmitting medium etch can be performed to etch the exposed light-transmitting medium 442, followed by a cladding etch that etches exposed lower waveguide cladding 448, followed by the light-transmitting medium etch performed so as to etch exposed intermediate medium 450. When the reflecting side of the port recess 467 is to extend into or through the lower taper cladding 458, the light-transmitting medium etch that etches exposed intermediate medium 450 can be followed by a cladding etch that etches exposed lower waveguide cladding 448. When the reflecting side of the port recess 467 is to extend into the substrate 460, the cladding etch that etches exposed lower waveguide cladding 448 can be followed by a light-transmitting medium etch that etches exposed substrate 460.

Suitable light-transmitting medium etches include, but are not limited to, plasma dry etches such as Deep Reactive Ion Etches (DRIE), Inductively Coupled Plasma (ICP) etches, Enhanced Cathode Coupling Plasma (ECCP) etches and Reactive Ion Etches (RIE), or wet etches using solutions such as tetramethylammonium hydroxide (TMAH), potassium hydroxide (KOH), hydrofluoric acid (HF) nitric acid or phosphoric acid. Suitable cladding etches include, but are not limited to, plasma dry etches such as Deep Reactive Ion Etches (DRIE), Inductively Coupled Plasma (ICP) etches, Enhanced Cathode Coupling Plasma (ECCP) etches and Reactive Ion Etches (RIE), or wet etches using solutions such as tetramethylammonium hydroxide (TMAH), potassium hydroxide (KOH), hydrofluoric acid (HF) nitric acid or phosphoric acid. A suitable sixth mask 504 includes, but is not limited to, a hard mask. An example of a suitable hard mask includes, but is not limited to, a layer of SiN over a layer of TEOS and patterned by etching in the presence of a photoresist.

A seventh mask (not shown) can be added to the device precursor of FIG. 17M and a seventh etch performed so as to remove the portion of the sixth mask over the facet 428 and expose the facet 428. The seventh mask can then be removed from the device precursor so as to provide the device precursor of FIG. 17N. A suitable seventh mask includes, but is not limited to, a photoresist.

Figure 17N:
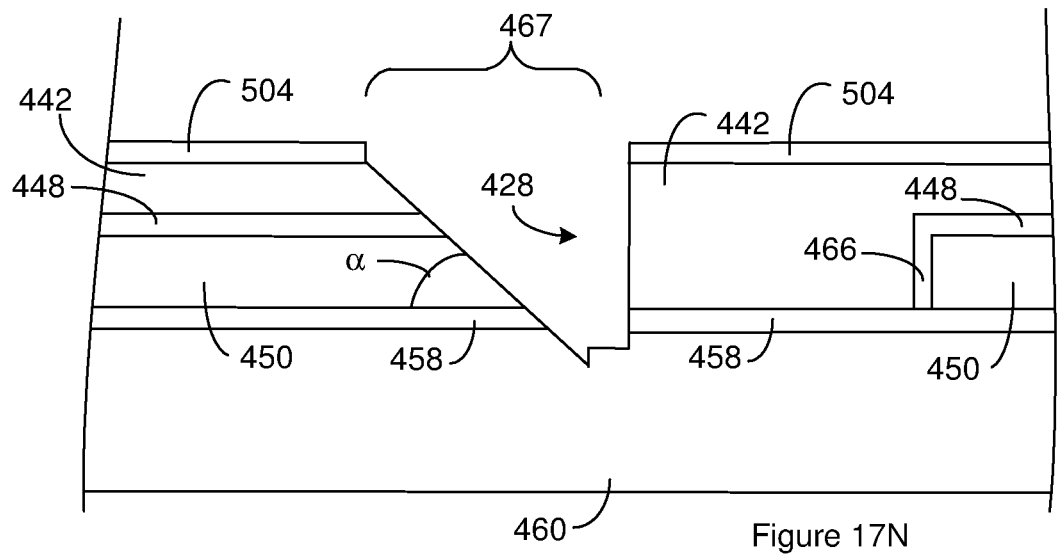
FIG. 17N is a cross section of the device precursor shown in FIG. 17M after being etched so as to expose the facet.
Figure 17O:
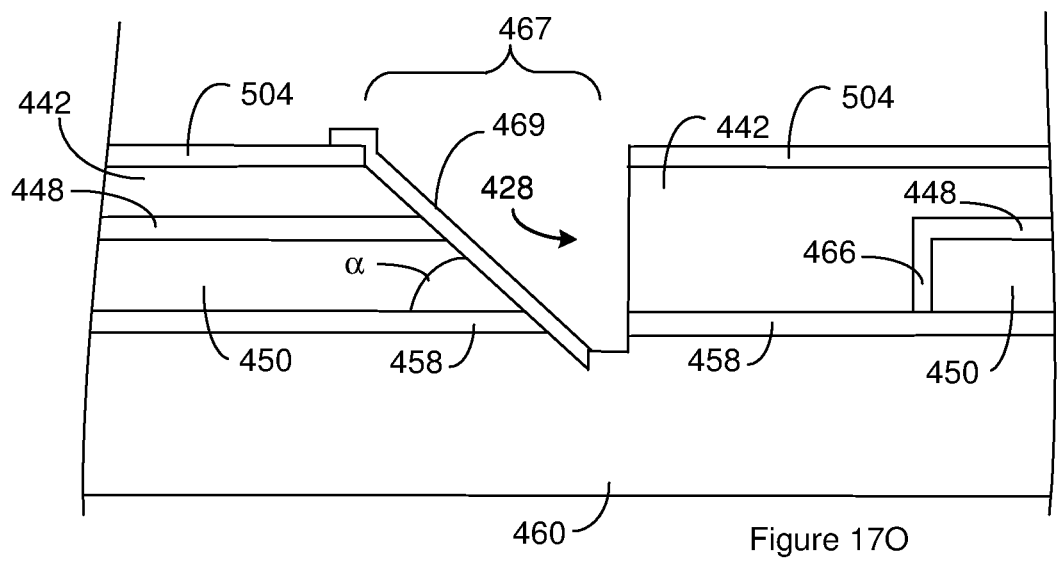

A reflecting layer 469 can optionally be formed on the reflecting side of the port recess 467 in the device precursor of FIG. 17N so as to generate the device precursor of FIG. 17O. Suitable materials for the reflecting layer 469 include, but are not limited to, reflective metals such as Al and Au. Suitable methods of forming the reflecting layer 469 on the reflecting side of the port recess 467 include, but are not limited to, evaporation, and sputtering.

When the light-transmitting medium 442 and the exposed intermediate medium 450 are silicon and are etched by a wet etch, the reflecting side of the port recess 467 and the reflecting layer 469 slants away from the facet is formed at a reflecting side angle ($\alpha$) of 54.7° or 45. The angle can be measure relative to an upper or lower surface of the base and/or relative to an upper or lower surface of the light-transmitting medium 442. Other suitable reflecting side angles ($\alpha$) include, but are not limited to, angles greater than 20°, 30°, or 40°, and less than 50°, 60°, or 70°.

FIG. 16A through FIG. 17O disclose an interface between a redirection component and an inverted taper. The illustrated interface would be suitable for use as the interface between the redirection component 82 and second portion of the waveguide disclosed in the context of FIG. 5A through FIG. 5C. For instance, the device platform 441 of FIG. 16A through FIG. 17O can serve as the base 81 of FIG. 5A through FIG. 5C; the reflecting layer 469 can serve as the reflecting material 110 of FIG. 5A through FIG. 5C; and the port recess 467 can serve as the port recess 100 of the redirection component 82. Further, the light-transmitting medium 442 of FIG. 16A through FIG. 17O can serve as the first light-transmitting medium 94 of FIG. 5A through FIG. 5C. Accordingly, other waveguides in the photonic circuit can also be formed light-transmitting medium 442 similar to the first portion of the waveguide of FIG. 16A through FIG. 17O.

Light sensors that are interfaced with waveguides on a LIDAR chip can be a component that is separate from the chip and then attached to the chip. For instance, the light sensor can be a photodiode, or an avalanche photodiode. Examples of suitable light sensor components include, but are not limited to, InGaAs PIN photodiodes manufactured by Hamamatsu located in Hamamatsu City, Japan, or an InGaAs APD (Avalanche Photo Diode) manufactured by Hamamatsu located in Hamamatsu City, Japan. These light sensors can be centrally located on the LIDAR chip. Alternately, all or a portion the waveguides that terminate at a light sensor can terminate at a facet located at an edge of the chip and the light sensor can be attached to the edge of the chip over the facet such that the light sensor receives light that passes through the facet. The use of light sensors that are a separate component from the chip is suitable for all or a portion of the light sensors selected from the group consisting of the first light sensor and the second light sensor.

As an alternative to a light sensor that is a separate component, all or a portion of the light sensors can be integrated with the chip. For instance, examples of light sensors that are interfaced with ridge waveguides on a chip constructed from a silicon-on-insulator wafer can be found in Optics Express Vol. 15, No. 21, 13965-13971 (2007); U.S. Pat. No. 8,093,080, issued on Jan. 10, 2012; U.S. Pat. No. 8,242,432, issued Aug. 14, 2012; and U.S. Pat. No. 6,108,8472, issued on Aug. 22, 2000 each of which is incorporated herein in its entirety. The use of light sensors that are integrated with the chip are suitable for all or a portion of the light sensors selected from the group consisting of the first light sensor and the second light sensor.

A variety of optical switches that are suitable for use as one of the optical switches disclosed above can be constructed on planar device optical platforms such as silicon-on-insulator platforms. Examples of suitable optical switches for integration into a silicon-on-insulator platform include, but are not limited to, Mach-Zehnder interferometers, and cascaded Mach-Zehnder interferometers.

Suitable electronics 62 for use in the LIDAR system can include, but are not limited to, a controller that includes or consists of analog electrical circuits, digital electrical circuits, processors, microprocessors, digital signal processors (DSPs), Application Specific Integrated Circuits (ASICs), computers, microcomputers, or combinations suitable for performing the operation, monitoring and control functions described above. In some instances, the controller has access to a memory that includes instructions to be executed by the controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

Components on the LIDAR chip can be fully or partially integrated with the LIDAR chip. For instance, the integrated optical components can include or consist of a portion of the wafer from which the LIDAR chip is fabricated. A wafer that can serve as a platform for a LIDAR chip can include multiple layers of material. At least a portion of the different layers can be different materials. As an example, a silicon-on-insulator wafer that includes the buried layer 90 between the substrate 92 and the light-transmitting medium 94 as shown in FIG. 3. The integrated on-chip components can be formed by using etching and masking techniques to define the features of the component in the light-transmitting medium 94. For instance, the slab 318 that define the waveguides and the stop recess can be formed in the desired regions of the wafer using different etches of the wafer. As a result, the LIDAR chip includes a portion of the wafer and the integrated on-chip components can each include or consist of a portion of the wafer. Further, the integrated on-chip components can be configured such that light signals traveling through the component travel through one or more of the layers that were originally included in the wafer. For instance, the waveguide of FIG. 3 guides light signal through the light-transmitting medium 94 from the wafer. The integrated components can optionally include materials in addition to the materials that were present on the wafer. For instance, the integrated components can include reflective materials and/or a cladding.

The components on the LIDAR adapter need not be integrated. For instance, the components on the LIDAR adapter need not include materials from the base 100 and/or from the common mount. In some instances, all of the components on the LIDAR adapter and/or the isolator adapter are separate from the base 140. For instance, the components on the LIDAR adapter can be constructed such that the light signals processed by the LIDAR adapter and/or the isolator adapter do not travel through any portion of the base 140.

Numeric labels such as first, second, third, etc. are used to distinguish different features and components and do not indicate sequence or existence of lower numbered features. For instance, a second component can exist without the presence of a first component and/or a third step can be performed before a first step.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An optical device, comprising:
a semiconductor chip having a photonic circuit that includes a waveguide having a first portion and a second portion,
a cross sectional area of the second portion of the waveguide being larger than a cross sectional area of the first portion of the waveguide,
the first portion of the waveguide being positioned over a device platform,
the waveguide including a taper that provides a transition between the first portion of the waveguide and the second portion of the waveguide, the taper being an inverted taper that extends below the first portion of the waveguide and into the device platform,
the second portion of the waveguide terminating at a facet; and
a recess extending into the chip, the recess having lateral sides,
a first one of the lateral sides serving as the facet and a second one of the lateral sides being positioned such that light signals that exit the waveguide through the facet travel across the recess to be received at the second lateral side,
the second lateral side being configured to reflect the received light signals toward a location that is above the chip or below the chip.

2. The device of claim 1, wherein the first portion of the waveguide is defined in a waveguide layer on the device platform and a portion of the taper is located between the waveguide layer and a bottom of the device.

3. The device of claim 1, wherein a surface of a reflecting material serves as the second lateral side.

4. The device of claim 3, wherein the reflecting material is positioned on a reflecting side,
the reflecting side being defined by a surface of a light-transmitting medium, a surface of a waveguide cladding, and a surface of an intermediate medium,
the waveguide cladding being between the light-transmitting medium and the intermediate medium.

5. The device of claim 4, wherein the light-transmitting medium contacts the intermediate medium in the taper.

6. The device of claim 4, wherein the first portion of the waveguide guides the light signals through the light-transmitting medium.

7. The device of claim 1, wherein a reflecting side serves as the second lateral side,
the reflecting side being defined by a surface of a light-transmitting medium, a surface of a waveguide cladding, and a surface of an intermediate medium, the waveguide cladding being between the light-transmitting medium and the intermediate medium.

8. An optical device, comprising:
a semiconductor chip having a photonic circuit that includes a waveguide a waveguide having a first portion and a second portion,
    a cross sectional area of the second portion of the waveguide being larger than a cross sectional area of the first portion of the waveguide,
    the waveguide including a taper that provides a transition between the first portion of the waveguide and the second portion of the waveguide, the taper being an inverted taper that extends below the first portion of the waveguide into the device platform,
    the second portion of the waveguide terminating at a facet; and
a recess extending into the chip, the recess having lateral sides,
a first one of the lateral sides serving as the facet and a second one of the lateral sides being configured to reflect light signals that the second lateral side receives from a location that is above the chip or below the chip,
    the second lateral side being configured such that after reflection by the second lateral side the light signals travel across the recess to be received at the facet.

9. A method of forming an optical device, comprising:
forming a waveguide in a semiconductor chip, the waveguide having a first portion and a second portion,
    a cross sectional area of the second portion of the waveguide being larger than a cross sectional area of the first portion of the waveguide,
    the first portion of the waveguide being positioned over a device platform,
    a taper provides a transition between the first portion of the waveguide and the second portion of the waveguide, the taper being an inverted taper that extends below the first portion of the waveguide into the device platform; and
forming a recess that extends into the chip and has lateral sides,
    the second portion of the waveguide terminating at a first one of the lateral sides,
    a second one of the lateral sides being positioned such that light signals that exit the waveguide through the first lateral side travel across the recess to be received at the second lateral side,
    the recess being formed such that the second lateral side is configured to reflect the received light signals toward a location that is above the chip or below the chip.

10. The method of claim 9, wherein the first portion of the waveguide is defined in a waveguide layer on the device platform and a portion of the taper is located between the waveguide layer and a bottom of the device.

11. The method of claim 9, wherein forming the recess includes forming a reflecting material on the semiconductor chip such that a surface of the reflecting material serves as the second lateral side.

12. The method of claim 9, wherein forming the recess includes etching the semiconductor chip so as to form the first lateral side.

13. The method of claim 11, wherein the reflecting material is positioned on a reflecting side,
    the reflecting side being defined by a surface of a light-transmitting medium, a surface of a waveguide cladding, and a surface of an intermediate medium,
    the waveguide cladding being between the light-transmitting medium and the intermediate medium.

14. The method of claim 9, wherein forming the recess includes performing one or more etches so as to etch through a light-transmitting medium, through a waveguide cladding, and at least part way into an intermediate medium,
    the waveguide cladding being between the light-transmitting medium and the intermediate medium.

15. The device of claim 14, wherein the light-transmitting medium contacts the intermediate medium in the taper.

16. The device of claim 14, wherein the first portion of the waveguide guides the light signals through the light-transmitting medium.

* * * * *